(12) United States Patent
Yoshida et al.

(10) Patent No.: US 7,280,711 B2
(45) Date of Patent: Oct. 9, 2007

(54) INFORMATION PROCESSING APPARATUS, INFORMATION PROCESSING METHOD, INFORMATION PROCESSING SYSTEM AND PROGRAM THEREOF

(75) Inventors: Kazushi Yoshida, Tokyo (JP); Tsunetake Noma, Tokyo (JP); Shinichi Kanai, Saitama (JP); Jun Kaneko, Kanagawa (JP); Tsunenobu Narahara, Tokyo (JP); Yutaka Hasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 10/654,065

(22) Filed: Sep. 4, 2003

(65) Prior Publication Data

US 2004/0131282 A1 Jul. 8, 2004

(30) Foreign Application Priority Data

Sep. 6, 2002 (JP) ............................. 2002-262175

(51) Int. Cl.
*G06K 9/60* (2006.01)
*G06K 7/00* (2006.01)

(52) U.S. Cl. .................................... 382/305; 707/104.1

(58) Field of Classification Search ................ 382/305, 382/312; 707/1, 104.1; 370/395.4; 709/206, 709/219; 715/517; 725/58, 80, 112, 133
See application file for complete search history.

(56) References Cited

U.S. PATENT DOCUMENTS 6,671,855 B1 * 12/2003 Hayashi et al. ............. 715/530
7,046,275 B1 * 5/2006 Yamada et al. ........... 348/220.1
7,143,429 B2 * 11/2006 Mineyama .................... 725/58
2002/0052929 A1 * 5/2002 Walker et al. .............. 709/218
2002/0055959 A1 * 5/2002 Hayashi ...................... 707/517
2002/0143629 A1 * 10/2002 Mineyama et al. ........... 705/14
2003/0025933 A1 * 2/2003 Kimura et al. ............. 358/1.15
2003/0068160 A1 * 4/2003 Wei ............................ 386/111

FOREIGN PATENT DOCUMENTS

| JP | 2001-313932 | 11/2001 |
|----|-------------|---------|
| JP | 2001-346173 | 12/2001 |
| JP | 2002-112249 | 4/2002 |
| JP | 2002-165210 | 6/2002 |
| JP | 2002-199386 | 7/2002 |

* cited by examiner

*Primary Examiner*—Kanjibhai Patel
(74) *Attorney, Agent, or Firm*—Oblon, Spivak, McClelland, Maier & Neustadt, P.C.

(57) ABSTRACT

Notification of upload of a fixed point observation image to a server. A response program captures a fixed point observation image upon controlling a camera through a camera control program. An image analysis program analyzes the captured image and sends the result of analysis to the response program that, then, makes the camera control program control and make the camera capture image based on setup data and under timing set in response to the result of analysis; the captured image is then uploaded to an image management server. A response program of the image management server acquires the uploaded image and stores the image in an image database (image DB) while reading out a transmission destination from a setup DB, then controls a mailing program so as to transmit notification of upload of the fixed point observation image to the PC. The present invention may be applied to an image management system.

7 Claims, 57 Drawing Sheets

FIG. 34

```
1:  <?xml version="1.0" ?>
2:  <nagara application= "AA PROGRAM"
3:      version="1.0 (VERSION OF AA PROGRAM)"
4:      type="IMAGING MODE (still, movie, ttk)"
5:      id=" SEQUENTIAL NUMBER FOR IMAGE MANAGEMENT FILES" >
6:  <caption/>
7:  <objects>
8:      <object id =" SEQUENTIAL NUMBER FOR STILL IMAGE AND MOVING IMAGE
                     FILES AT CAPTURING UNIT">
9:          <file> PATH TO CAPTURED STILL IMAGE AND MOVING IMAGE FILES</file>
10:         <type> FILE TYPE (image, movie) </type>
11:         <format> FILE FORMAT (jpeg, mpeg etc.) </format>
12:         <date> CAPTURED DATE </date>
13:         <time> CAPTURED TIME </time>
14:     </object>
15: </objects>
16: <thumbnail>
17:     <file>PATH TO IMAGE FILE DISPLAYED ON THUMBNAIL IMAGE LIST</file>
18: </thumbnail>
19: </nagara>
```

FIG. 35

```
1: <?xml version="1.0" ?>
2: <ngrManager>
3:    <next id> (USED FOR NUMBERING SEQUENTIAL NUMBER OF IMAGE MANAGEMENT FILE) </next id>
4:    <ngrlist path="PATH TO SAVE DESTINATION DIRECTORY OF IMAGE MANAGEMENT FILE" >
5:       <ngr href= "IMAGE MANAGEMENT FILE NAME"
6:          type="TYPE OF IMAGE FILE MANAGED BY IMAGE MANAGEMENT FILE (image, movie)"
7:          create="CREATION DATE & TIME OF IMAGE MANAGEMENT FILE"
8:          id="SEQUENTIAL NUMBER OF IMAGE MANAGEMENT FILE" />
9:    </ngrlist >
10: </ngrMangager>
```

FIG. 36

```
 1: <?xml version="1.0" ?>
 2: <nagara application="AA PROGRAM" version="1.0" type="ttk" id="3" >
 3:   <caption/>
 4:   <objects>
 5:     <object id="0" >
 6:       <file>C:¥xxx¥AA PROGRAM¥FP0¥FP000000.jpg</file>
 7:       <type>image</type>
 8:       <format>jpeg</format>
 9:       <date>2002/08/06</date>
10:       <time>10:53:05</time>
11:     </object>
12:       .
        .
13:     <object id="100" >
14:       <file>C:¥xxx¥AA PROGRAM¥FP0¥FP000000.jpg</file>
15:       <type>image</type>
16:       <format>jpeg</format>
17:       <date>2002/08/06</date>
18:       <time>10:53:45</time>
19:     </object>
20:   </objects>
21:   <thumbnail>
22:     <file>C:¥xxx¥AA PROGRAM¥Data¥thumbnail¥00000001.jpg</file>
23:   </thumbnail>
24: </nagara>
```

FIG. 45

| TYPE OF EVENT | MAIL TRANSMISSION DESTINATION |
|---|---|
| GIVEN TIME ELAPSED | UserA, UserB |
| MOVED | UserB, UserC |
| BRIGHTNESS SUDDENLY CHANGED | UserA, UserC |
| RED OBJECT CAME INTO SIGHT | UserD, UserE |
| OBJECT MOVED FROM RIGHT TO LEFT | UserB, UserC, UserD |
|  |  |

FIG. 48

ALBUM NAME
TOTAL NUMBER
OF IMAGES 52
(PAGE 1/6)

COVER

501a — 1. IMAGE NAME
501b — 2. IMAGE NAME
501c — 3. IMAGE NAME
501d — 4. IMAGE NAME
501e — 5. IMAGE NAME
501f — 6. IMAGE NAME
501g — 7. IMAGE NAME
501h — 8. IMAGE NAME
501i — 9. IMAGE NAME

< G  TO LAST  HISTORY  NEXT >

| 11-20 | ✓ | (DISPLAY) |

GUEST BOOK (23)

INVITE TO ALBUM

UPLOAD

EDIT ALBUM INFORMATION

DELETE ALBUM

NEXT BACK TO ALBUM LIST

IMAGE NAME (54/54)

511

<G PREVIOUS  HISTORY  BACK COVER>

[    ] PAGE [DISPLAY]

GUEST BOOK (23)

SEND E-CARD
UPLOAD
MOVE IMAGE
CHANGE IMAGE NAME
DELETE IMAGE

NEXT  BACK TO IMAGE LIST

INFORMATION PROCESSING APPARATUS, INFORMATION PROCESSING METHOD, INFORMATION PROCESSING SYSTEM AND PROGRAM THEREOF

CROSS REFERENCE TO RELATED APPLICATIONS

The present document is based on Japanese Priority Application JP2002-262175, filed in the Japanese Patent Office on Sep. 6, 2002, the contents of which being incorporated herein by reference to the extent permitted by law.

BACKGROUND OF THE INVENTION

1. Field of the Invention

The present invention relates to an information processing apparatus and method, an information processing system and a program, and in particular to an information processing apparatus and method, an information processing system and a program which may upload a fixed point observation image under a predetermined condition, transmit mail notifying that the image has been uploaded, and distribute the image, when the uploaded image is requested to be distributed, by converting the image corresponding to a type of information processing apparatus which requested the image.

2. Description of the Related Art

Services in which images are continuously captured from a predetermined viewpoint and made available to the public as fixed point observation images (a fixed point observation image designates a group of multiple static images captured within a given period of time) by uploading such images to a predetermined WWW (World Wide Web) server (hereinafter referred to simply as "web server") have become popular.

In a service of making image data of fixed point observation images (including static and moving images or pictures) public, a service provider notifies a user of the uploading of the fixed point observation images, along with uploading the data to a predetermined web server. The user accesses a predetermined web server based on the notification, downloads the image data of the fixed point observation images and reproduces the data upon carrying out an appropriate processing on the static images, moving images or the fixed point observation images.

In addition, there is related art in which a fixed point observation image is verified and timing for image capture is controlled based on a result of the result of the verification. Such related art may be found in Japanese Patent Laid Open 2000-324436 (Page 6 and FIG. 9, for example).

SUMMARY OF THE INVENTION

However, as for the above-mentioned services, there are disadvantages that a service provider may provide service only in an environment where an image data of the fixed point observation image can be uploaded to a web server, and that whenever the service provider uploads the fixed point observation image image, a notification mail has to be sent to the user, which takes time and effort.

In addition, there is another disadvantage that since a mail notifying the upload of the fixed point observation image data is sent to the user for every upload, the notice of the upload is sent even for any change in an image which does not interest the user, consequently the notice itself may be felt as troublesome.

In addition, in the above case, as for the image data of the fixed point observation, the user can only view an fixed point observation image that has already been uploaded to the web server, so that there is still another disadvantage that image data of the fixed point observation cannot be viewed at time of capture, consequently the latest image data of the fixed point observation cannot be viewed.

In view of the above, the present invention has been conceived so as to upload the fixed point observation image under a predetermined condition, transmit the notification mail that the image has been uploaded, and distribute the image, when the uploaded image is requested to be distributed, by converting the image corresponding to the type of information processing apparatus which has requested the image.

A first information processing apparatus according to a preferred embodiment of the present invention includes an imaging means for image capturing; storage means for storing image captured by the imaging means as a fixed point observation image; transmission means for transmitting the fixed point observation image to a server; transmission commanding means for commanding transmission of the fixed point observation image to the server by means of the transmission means; setting means for setting a distribution condition for distributing information related to the transmission of the fixed point observation image to the server; and controlling means for performing control based on a command from the transmission commanding means so as to transmit, along with the fixed point observation image, commanding information for distributing the information related to transmission of the fixed point observation image to the server if the distribution condition is fulfilled, when the transmission means transmits the fixed point observation image to the server.

The information processing apparatus according to the present preferred embodiment of the invention may have the information related to transmission of the fixed point observation image to the server by the transmission means including information indicating that the fixed point observation image has been transmitted to the server, information forecasting that the fixed point observation image will be transmitted to the server, information on a URL of the server to which the fixed point observation image is transmitted, or information on time on which the fixed point observation image will be transmitted to the server.

In addition, the distribution condition may include a transmission of the fixed point observation image captured at an occurrence of a predetermined event to the server or starting of a fixed point observation.

The predetermined event may include lapse of a period of time, movement of a fixed point observation image, subtle change in brightness of a fixed point observation image, a red object entering a field of view within a fixed point observation image, or a subject of a fixed point observation image moving leftwards, for example.

Furthermore, an information processing method according to another preferred embodiment of the present invention includes the steps of: image capturing; storing image captured through the image capturing step as a fixed point observation image; transmitting the fixed point observation image to a server; commanding transmission of the fixed point observation image to the server by means of the transmitting step; setting a distribution condition for distributing information related to the transmission of the fixed point observation image to the server; and performing control based on a command from the commanding step so as to transmit commanding information for distributing the information related to transmission of the fixed point observation image to the server if the distribution condition is fulfilled, when the transmitting step transmits the fixed point observation image to the server.

Another preferred embodiment of the present invention includes a program for causing a computer to execute the steps of commanding transmission of a fixed point observation image to a server; setting a distribution condition for distributing information related to the transmission of the fixed point observation image to the server; and performing control based on a command from the commanding step so as to transmit, along with the fixed point observation image, commanding information for distributing the information related to transmission of the fixed point observation image to the server if the distribution condition is fulfilled, when the transmitting step transmits the fixed point observation image to the server.

An information processing system according to still another preferred embodiment of the present invention includes an information processing apparatus for transmitting a fixed point observation image and a server for receiving the fixed point observation image, wherein: the information processing apparatus includes imaging means for image capturing; storage means for storing image captured by the imaging means as a fixed point observation image, transmission means for transmitting the fixed point observation image to a server, transmission commanding means for commanding transmission of the fixed point observation image to the server by means of the transmission means; setting means for setting a distribution condition for distributing information related to transmission of the fixed point observation image to the server; and controlling means for performing control based on a command from the transmission commanding means so as to transmit, along with the fixed point observation image, commanding information for distributing the information related to transmission of the fixed point observation image to the server if the distribution condition is fulfilled, when the transmission means transmits the fixed point observation image to the server; the server includes: receiving means for receiving a distribution condition at event of distribution of the information related to transmission of the fixed point observation image; and distribution means for distributing the information related to transmission of the fixed point observation image based on the distribution condition.

A second information processing apparatus according to another preferred embodiment of the present invention includes: connecting means for establishing connection with another information processing apparatus by means of instant messaging; imaging means for image capturing; storage means for storing image captured by the imaging means as a fixed point observation image; transmission means for transmitting the fixed point observation image to a server; and transmission commanding means for commanding transmission of the fixed point observation image to the server by means of the transmission means.

A second information processing method according to another preferred embodiment of the present invent includes the steps of: connecting with another information processing apparatus by means of instant messaging; image capturing; storing image captured through the image capturing step as a fixed point observation image; transmitting the fixed point observation image to a server; and commanding transmission of the fixed point observation image to the server by means of the transmitting step.

A second information processing program according to another preferred embodiment of the present invent causes a computer to execute the steps of: connecting with another information processing apparatus by means of instant messaging; image capturing; storing image captured through the image capturing step as a fixed point observation image; transmitting the fixed point observation image to a server; and commanding transmission of the fixed point observation image to the server by means of the transmitting step.

As mentioned above, in the information processing apparatus, the method and the program according to the first preferred embodiment of the present invention, image is captured, the captured image is stored as a fixed point observation image, the fixed point observation image is transmitted to a predetermined server, transmission of the fixed point observation image to the server is commanded, a condition is set for the distribution of information related to the transmission of the fixed point observation image by the server and control is performed based on the command for transmitting commanding information for distributing the information related to transmission of the fixed point observation image to the server along with the fixed point observation image if the distribution condition is fulfilled, when transmitting the fixed point observation image to the server.

In the first information processing system according to the first preferred embodiment of the present invention, image is captured, the captured image is stored as a fixed point observation image, the fixed point observation image is transmitted to a predetermined server, transmission of the fixed point observation image to the server is commanded, a condition is set for the distribution of information related to the transmission of the fixed point observation image by the server and control is performed based on the command for transmitting commanding information for distributing the information related to transmission of the fixed point observation image to the server along with the fixed point observation image if the distribution condition is fulfilled, when transmitting the fixed point observation image to the server; also, the server receives the distribution condition of distribution of the information related to transmission of the fixed point observation image and distributes the information related to transmission of the fixed point observation image based on the distribution condition In the information processing apparatus, the method and the program according to the second preferred embodiment of the present invention connection is performed with another information processing apparatus by means of instant messaging; image capturing; image captured through the image capturing step is stored as a fixed point observation image; the fixed point observation image is transmitted to a server; and transmission of the fixed point observation image to the server is commanded.

BRIEF DESCRIPTION OF THE DRAWINGS

The above and other features and advantages of the present invention will become more apparent to those skilled in the art through the following description of the presently preferred exemplary preferred embodiments of the invention taken in conjunction with the accompanying drawings, in which:

FIG. 34 shows a xml description of an image management file among the data image management files;

FIG. 35 shows a xml description of a unified management file among the data image management files;

FIG. 36 shows a xml description of an image management file among the data management files for fixed point observation images;

FIG. 45 describes a setup database according to a preferred embodiment of the present invention;

FIG. 48 shows an example of image display according to a preferred embodiment of the present invention;

DESCRIPTION OF THE PREFERRED EMBODIMENTS OF THE PRESENT INVENTION

Preferred embodiments of the present invention will be described below with reference to the accompanying drawings.

Figure 1:
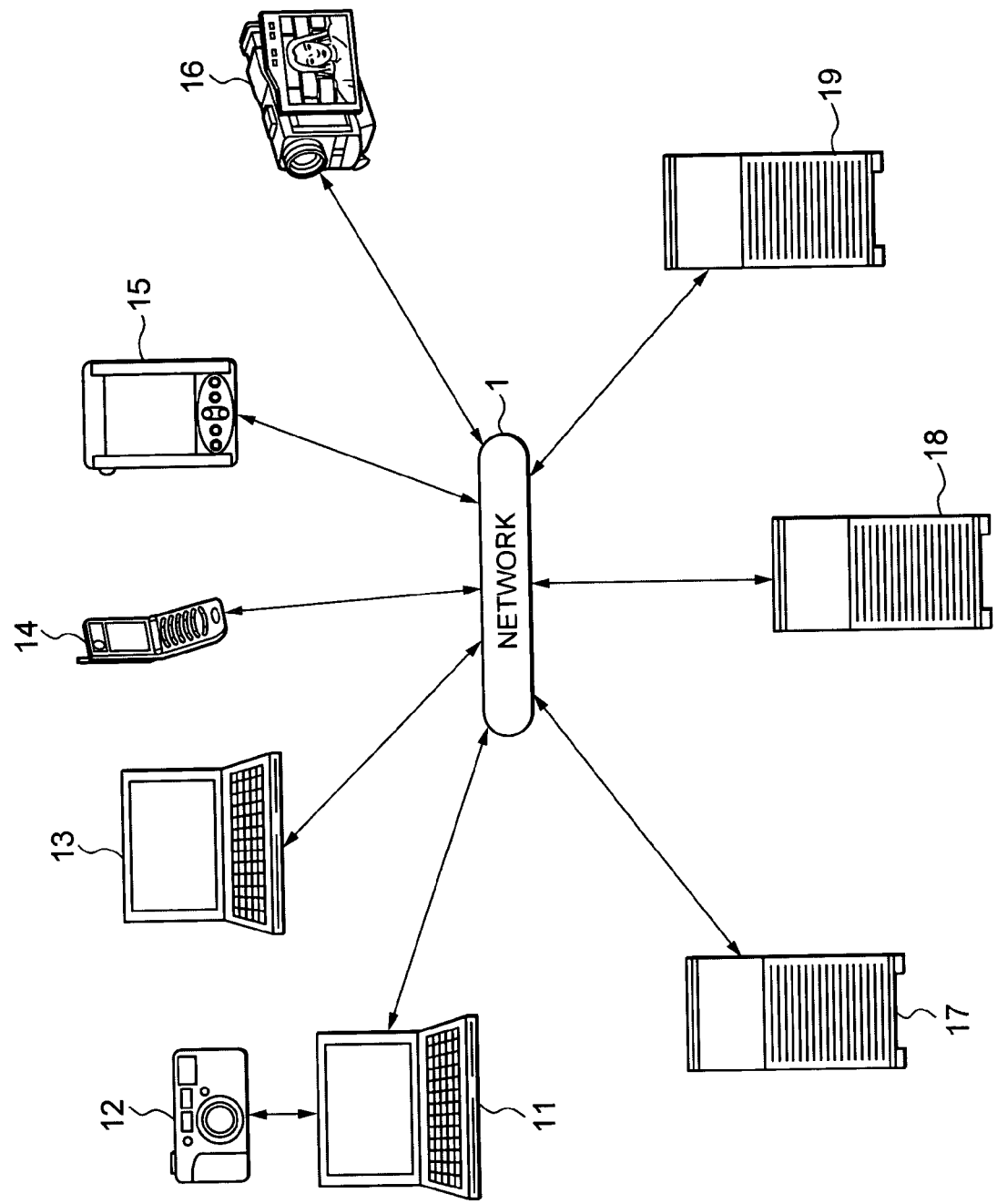
FIG. 1 shows a schematic block diagram of an image distribution system according to a preferred embodiment of the present invention.

FIG. 1 is a schematic view showing a construction of an image distribution system according to a preferred embodiment of the present invention.

The image distribution system according to the present invention comprises a PC (Personal Computer) 11, a PC 13, a mobile phone 14, a PDA (Personal Digital (Data) Assistants) 15, a network camcorder 16, an image management server 17, a web server 18, and an FTP server 19 which are connected to the network 1, such as the Internet, and each can mutually transmit and receive data. In addition, in FIG. 1 the PC 11, the PC 13, the mobile phone 14, the PDA 15, the network camcorder 16, the image management server 17, the web server 18, and the FTP server 19 have the construction in which each is connected to the network 1, however, there may be plural sets of the same type of unit.

The PC 11 is operated by a user who is going to make an image (including a still image, a moving image, or a fixed point observation image) captured by himself open to other users so as to upload the image captured by a camera 12 to the image management server 17 or the FTP server 19. In addition, the image uploaded to the FTP server 19 may be acquired from the web server 18 as link information. The image uploaded by the PC 11 may be a still image, a moving image, or a fixed point observation image.

The PC 13 accesses the image management server 17 or the web server 18, and requests to download the image uploaded by the PC 11 so as to acquire and display the downloaded image based on the request.

The mobile phone 14 communicates with other mobile phones etc. through a wireless mobile-phone network. Moreover, as with the PC 13, the mobile phone 14 accesses the image management server 17 or the web server 18, requests to download the image uploaded by the PC 11 so as to acquire and display the downloaded image based on the request.

The PDA (Personal Digital (Data) Assistant) 15 is an information terminal device for personal use having been developed with emphasis on portability. In general, the size of the PDA 15 is so as to fit on the palm of the hand, is equipped with different functions, such as a liquid crystal display function, a pen input function, or a terminal function for utilizing data from the outside, and is driven by a battery (or a dry cell). Moreover, the PDA 15 has a communication function, so that, in a similar way as the PC 13 or the mobile terminal 14, accesses the image management server 17 or the web server 18 and requests to download the image uploaded by the PC 11 so as to acquire and display the downloaded image based on the request.

The network camcorder 16 is a portable type video imaging apparatus, which captures a moving image or a still image so as to be recorded on a recording medium and reproduces the moving image or the still image recorded on the recording medium. Moreover, the network camcorder 16 has a communication function, so that, in a similar way as the PC 13, the mobile terminal 14, or the PDA 15, it accesses the image management server 17 or the web server 18, requests to download the image uploaded by the PC 11 so as to acquire and display the downloaded image based on the request.

The image management server 17 stores the image uploaded from the PC 11. When the download is requested by the PC 13, the mobile phone 14, the PDA 15, or the network camcorder 16, the image management server 17 converts the stored image according to the type of apparatus and allows the apparatus to download the image. Moreover, when an image is uploaded through the PC 11, the image management server 17 transmits mail to the PC 13, the mobile phone 14, the PDA 15, or the network camcorder 16 notifying that the image has been uploaded. The image management server 17 may be, for example, an Image Station (a trademark) server provided by Sony Corporation.

The web server 18 has stored therein the link information of the image uploaded to the FTP server 19, accesses the FTP server 19 of a link place so as to allow downloading the image when the download is requested by the PC 13, the mobile phone 14, the PDA 15, or the network camcorder 16 which has accessed the web server 18.

Figure 2:
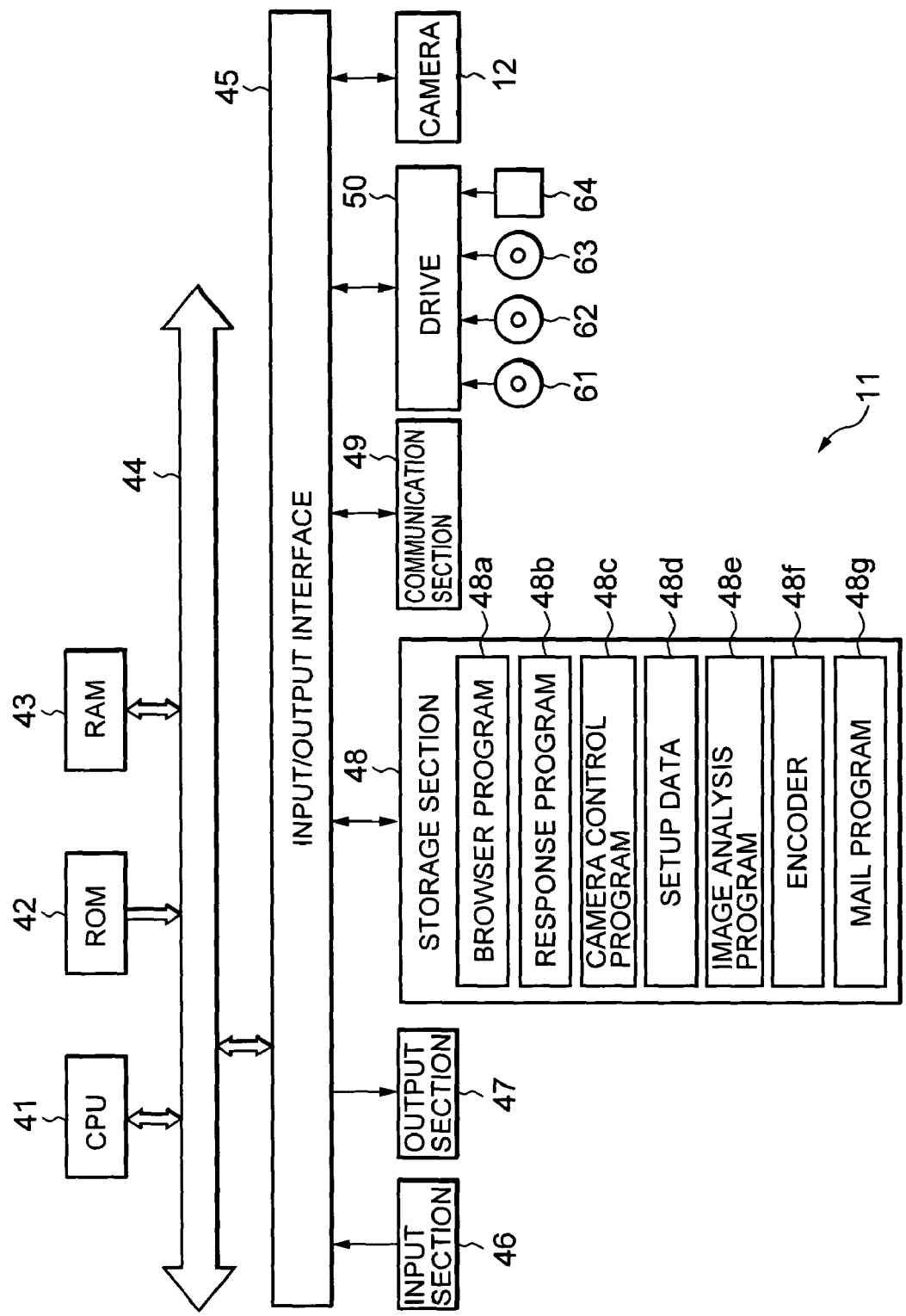
FIG. 2 shows a schematic block diagram of a structure of PC 11 of FIG. 1.

FIG. 2 is a figure schematically showing a structure of the PC11 according to a preferred embodiment of the present invention. A CPU (Central Processing Unit) 41 performs various types of processes according to a program stored in a ROM (Read Only Memory) 42 or a storage section 48. The program, data, etc. performed by the CPU 41 are suitably stored in a RAM (Random Access Memory) 43. The CPU 41, the ROM 42, and the RAM 43 are mutually connected by means of a bus 44.

An input/output interface 45 is also connected to the CPU 41 through the bus 44. An input section 46 including a keyboard, a mouse, a microphone, etc., and an output section 47 including a display, a speaker, etc. are connected to the input/output interface 45. The CPU 41 performs various types of processes corresponding to instructions inputted through the input section 46. The CPU 41 outputs the resulting image, sound, etc. obtained by means of the processes to the output section 47.

The storage section 48 connected to the input/output interface 45 comprises hard disks etc., for example, and stores the program and various types of data to be performed by the CPU 41. A communication section 49 communicates with external equipment through the Internet or other networks as shown by a network 1 in FIG. 1, for example.

Moreover, the storage section 48 has stored therein programs, such as a browser program 48a, a response program 48b, a camera control program 48c, a setup data 48d, an image analysis program 48e, an encoder 48f, and a mail program 48g, and the CPU 41 reads the programs so as to perform corresponding processes. In addition, functions of the various types of programs will be described later with reference to FIG. 5.

Further, as for programs stored in the storage section 48, a program other than those mentioned above may be acquired through the communication section 49, and stored in the storage section 48.

When equipped with a magnetic disk 61, an optical disc 62, a magneto-optical disc 63, or a semiconductor memory 64, a drive 50 connected to the input/output interface 45 drives them, and acquires a program, data, etc. recorded therein. If necessary, the acquired program and data are transferred to the storage section 48 so as to be stored.

The camera 12 is a so-called digital still camera, and controlled by the camera control program 48c so as to capture still image and also pick up moving image. Moreover, although the camera 12 can also capture the fixed point observation image, the fixed point observation image is a group of plural still image data captured plural times within a predetermined period of time, and substantially generated by capturing the still images a plurality of times.

In addition, in the case of FIG. 1, the camera 12 is constructed to be removable from a main body of the PC 11 by means of a USB (Universal Serial Bus) terminal, an IEEE (Institute of Electrical and Electronic Engineers) 1394 terminal, etc., for example, however, it may only be constructed to acquire the captured still image or the picked-up moving image, and may be included in the main body of the PC 11, for example. Moreover, the camera 12 and the PC 11 may be wirelessly connected under a standard like Bluetooth, for example.

Next, with reference to FIG. 3, the construction of the PC 13 will be described as follows. The PC 13 has basically the same construction as that of the PC 11 as described with reference to FIG. 2. In other words, a CPU 71, a ROM 72, a RAM 73, a bus 74, an input/output interface 75, an input section 76, an output section 77, a storage section 78, a communication section 79, a drive 80, a magnetic disk 81, an optical disc 82, a magneto-optical disc 83, and a semiconductor memory 84 of the PC 13 respectively correspond to the CPU 41, the ROM 42 and the RAM 43, the bus 44, the input/output interface 45, the input section 46, the output section 47, the storage section 48, the communication section 49, the drive 50, the magnetic disk 61, the optical disc 62, the magneto-optical disc 63, and the semiconductor memory 64 of the PC 11, to thereby have similar functions.

However, the program stored in the storage section 78 differs from the program stored in the storage section 48 of the PC 11 of FIG. 2. The storage section 78 has stored therein a browser program 78a, a response program 78b, and a mail program 78c, so that the CPU 71 reads the programs to execute them accordingly.

In addition, since the mobile terminal 14, the PDA 15, and the network camcorder 16 have substantially the same functions as those of the PC 13, the description of the construction thereof will be omitted.

Next, the construction of the image management server 17 will be described with reference to FIG. 4. The image management server 17 has a construction basically similar to those of the PC 11 and the PC 13, which have been described with reference to FIG. 2 and FIG. 3. In other words, a CPU 101, a ROM 102, a RAM 103, a bus 104, an input/output interface 105, an input section 106, an output section 107, a storage section 108, a communication section 109, a drive 110, a magnetic disk 121, an optical disc 122, a magneto-optical disc 123, and a semiconductor memory 124 of the image management server 17 respectively correspond to the CPU 41, the ROM 42, the RAM 43, the bus 44, the input/output interface 45, the input section 46, the output section 47, the storage section 48, the communication section 49, the drive 50, the magnetic disk 61, the optical disc 62, the magneto-optical disc 63, and the semiconductor memory 64 of the PC 11 of FIG. 2, or the CPU 71, the ROM 72 and the RAM 73, the bus 74, the input/output interface 75, the input section 76, the output section 77, the storage section 78, the communication section 79, the drive 80, the magnetic disk 81, the optical disc 82, the magneto-optical disc 83, the semiconductor memory 84 of the PC 13 of FIG. 3, to thereby have similar functions.

Figure 3:
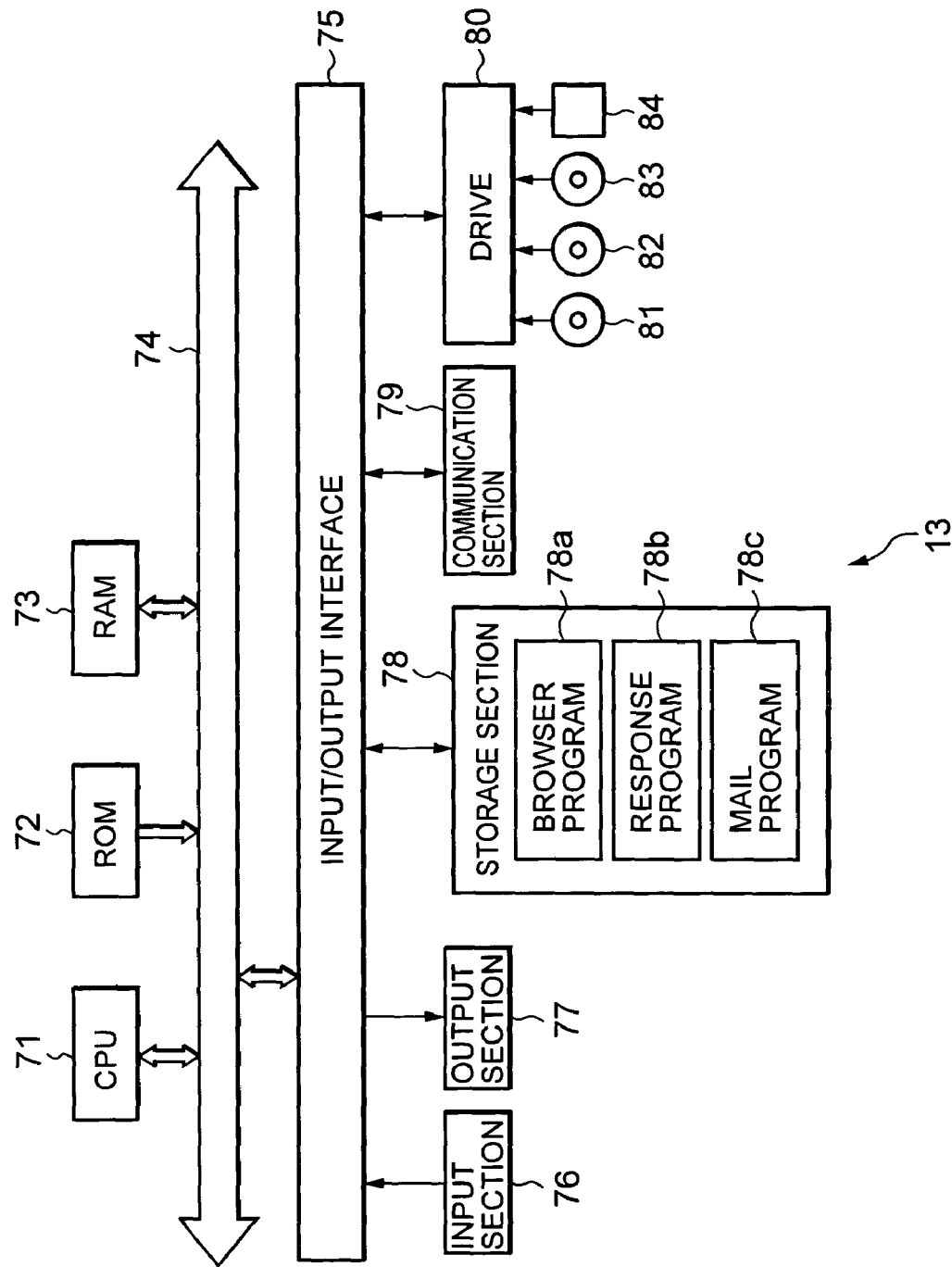
FIG. 3 shows a schematic block diagram of a structure of PC 13 of FIG. 1.

However, the program stored in the storage section 108 differs from the program stored in the storage section 48 of the PC 11 of FIG. 2, or the storage section 78 of the PC 13 of FIG. 3. The storage section 108 has stored therein a response program 108a, a setup DB (Database) 108b, an image DB 108c, an image conversion program 108d and a mail program 108e so that the CPU 101 suitably reads and executes these programs.

It should be noted that since the fundamental constructions of the web server 18 and the FTP server 19 are similar to that of the image management server 17, further description thereof is omitted. The web server 18 stores an HP management program 18a (FIG. 5) in the storage section, while the FTP server 19 stores an image DB 19a (FIG. 5), which stores image (still image, moving image, or fixed point observation image) uploaded through the PC 11.

Figure 5:
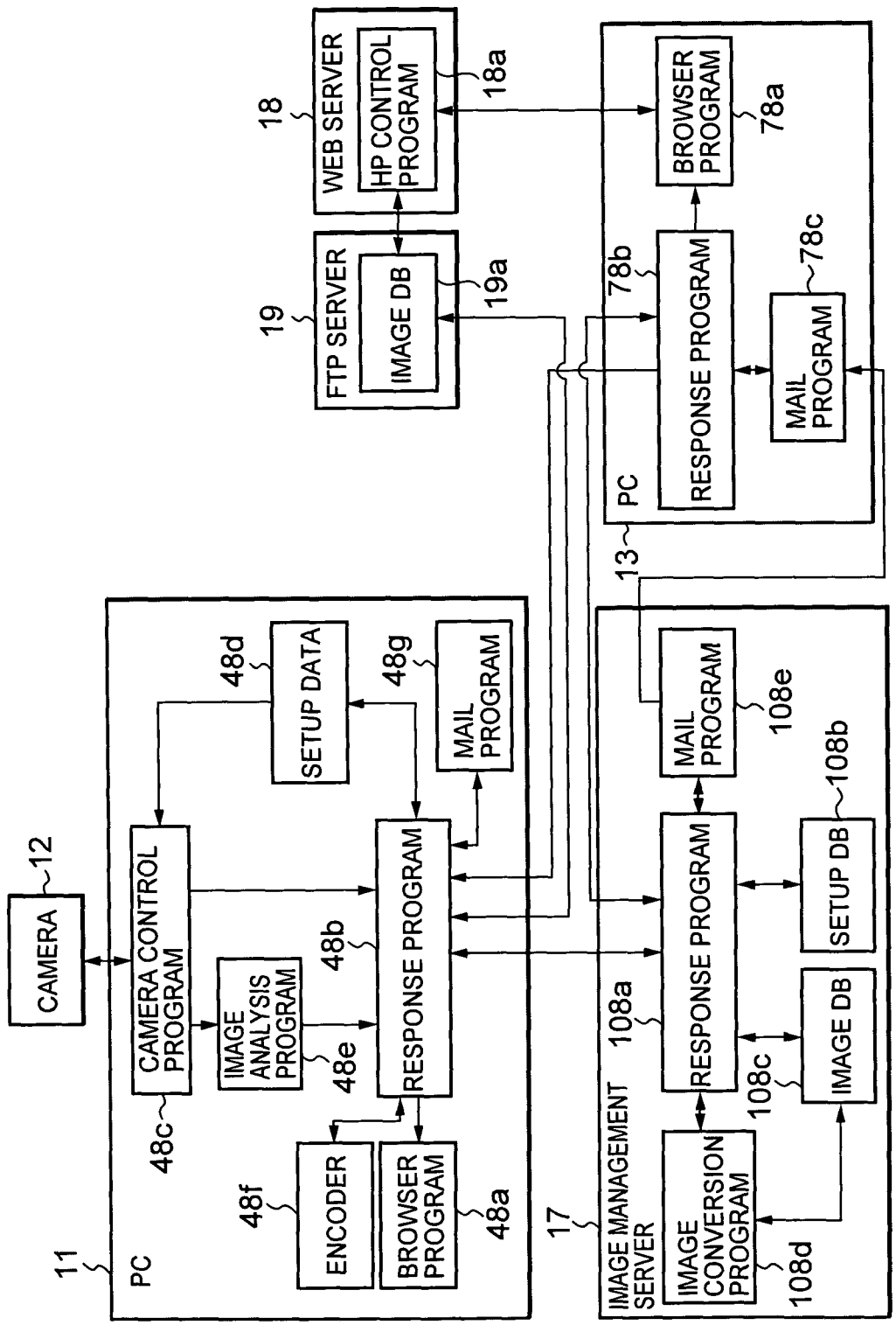
FIG. 5 shows a functional block diagram of the functions realized by the image distribution system of FIG. 1.

Next, with reference to a functional block diagram of FIG. 5, the functions realized by the PCs 11 and 13, the image management server 17, the web server 18, and the FTP server 19 will be described. In addition, the functions may be established by hardware allowing functions equivalent to those realized by respective programs of FIG. 5. Therefore, the functional block diagram of FIG. 5 may be considered as a hardware construction, or may be considered as a software construction.

Through the response program 48b, the browser program 48a of the PC 11 accesses a predetermined URL (Universal Resource Locator) on the Internet 1, downloads and displays a file in html (Hyper Text Markup Language) form, for example.

The browser program 48a includes, for example, Internet Explorer (a trademark) from Microsoft Corp., Netscape (a trademark) available from Netscape, etc.

The response program 48b is a program that controls the total operation of the PC 11, and also communicates with the PC 13, the image management server 17, the FTP server 19, or the web server 18 so as to exchange data, via network 1. Moreover, the response program 48b controls a display of a GUI (Graphical User Interface), receives the instructions from the user, and generates the setup data 48d so as to be transmitted to the image management server 17, thus outputting control information for controlling the camera 12 to the camera control program 48c.

Moreover, the response program 48b outputs the captured image data inputted through the camera control program 48c to the image management server 17 or the FTP server 19. Further, the camera control program 48c is controlled based on the results of analysis of the image of the camera 12 inputted through the camera control program 48c inputted from the image analysis program 48e.

The camera control program 48c is a program that controls an operation of the camera 12, and is controlled by the response program 48b. Image capturing modes of a camera 12 include three modes, a moving image mode, a still image mode, and the fixed point observation mode. When the GUI controlled by the response program 48b is operated by the user so as to switch the mode, the camera control program 48c controls the camera 12 corresponding to the mode. In addition, operation of each mode will be described later.

The setup data 48d may include information such as operation setup information required for the operation of the camera 12, the start time of the fixed point observation and end time, an interval of image capturing (timing for imaging) in the case of the fixed point observation, information that the captured image is uploaded to which of the image management server 17 and the FTP server 19, information on a setup when uploading it to the image management server 17, information on a setup when uploading it to the FTP server 19, information on a transmission setup of the mail notifying that the uploaded has been completed, and size of an image to be captured and information on a setup of image quality, etc.

The image analysis program 48e analyzes the image inputted from the camera 12 through camera control program 48c, and outputs an analysis result to the response program 48b. More particularly, the image analysis program 48e detects events such as the case where an inputted image has moved (there is a change); the case where brightness changes suddenly; the case where a red object comes into sight (when the red object appears in an image); or the case where any subject moves to the left, etc., by analyzing the image, to thereby output the detection result as the analysis result to the response program 48b.

The encoder 48*f* encodes the fixed point observation image comprising a plurality of still images into a moving image. The mail program 48*g* is a program which functions as a so-called mailer, and transmits mail to other information processing apparatuses through the network 1. The response program 108*a* of the image management server 17 acquires the setup information (information stored in the setup data 48*d*) received from the PC 11 so as to store it in the setup DB 108*b*. Further, the response program 108*a* acquires image (a still image, a moving image, or a fixed point observation image) uploaded from the PC 11 so as to store it in the image DB 108*c*. In addition, the response program 108*a* receives a distribution request for the image from the PC 13, the mobile phone 14, the PDA 15, or the network camcorder 16, controls the image conversion program 108*d* according to a signal (User-Argent of HTTP (Hyper Text Transfer Protocol)) which identifies a type of terminal device contained in the request information, so as to convert the image into an image of a size which can be displayed on the terminal device and distribute it. Moreover, the response program 108*a* controls the mail program 108*e* based on the information of the setup DB 108*b* so as to transmit the mail (this mail is hereafter referred to as "notice mail") which shows that the image has been uploaded and notifies the uploaded URL to a predetermined destination (the PC 13, the mobile phone 14, the PDA 15, or the network camcorder 16). In addition, only when the fixed point observation is started, this notice mail may be transmitted, for example, with a URL to be uploaded such as "fixed point observation started; see //www.picture-image-management-server.jp/XXX/", and can also be transmitted at a timing when the fixed point observation is reserved, such as "fixed point observation starts at A:B; see //www.picture-image-management-server.jp/XXX/", together with the URL to be uploaded and information (or the uploaded time) on the time when the fixed point observation is started (scheduled time to upload). In addition to this, the notice mail may be transmitted only at a predetermined time, or transmitted only to a predetermined destination.

Based on the input information from the user, the response program 78*b* of the PC 13 accesses the image management server 17, requests and acquires an image (a still image, a moving image, or a fixed point observation image), and provides the image to the browser program 78*a* so as to be displayed. Further, the response program 78*b* controls the browser program 78*a* so as to access the web server 18 according to an input request from the user, and acquires and the still image, the moving image, or the fixed point observation image uploaded to the FTP server 19 so as to be displayed. The web server 18 has stored therein the HP management program 18*a*, reads the image (the still image, the moving image, or the fixed point observation image) stored in the image DB 19*a* of the FTP server 19 as link information, and outputs it to the PC 13.

Now, with reference to flowcharts of FIG. 6 and FIG. 7, an image processing by means of the PC 11 will be described.

Figure 8:
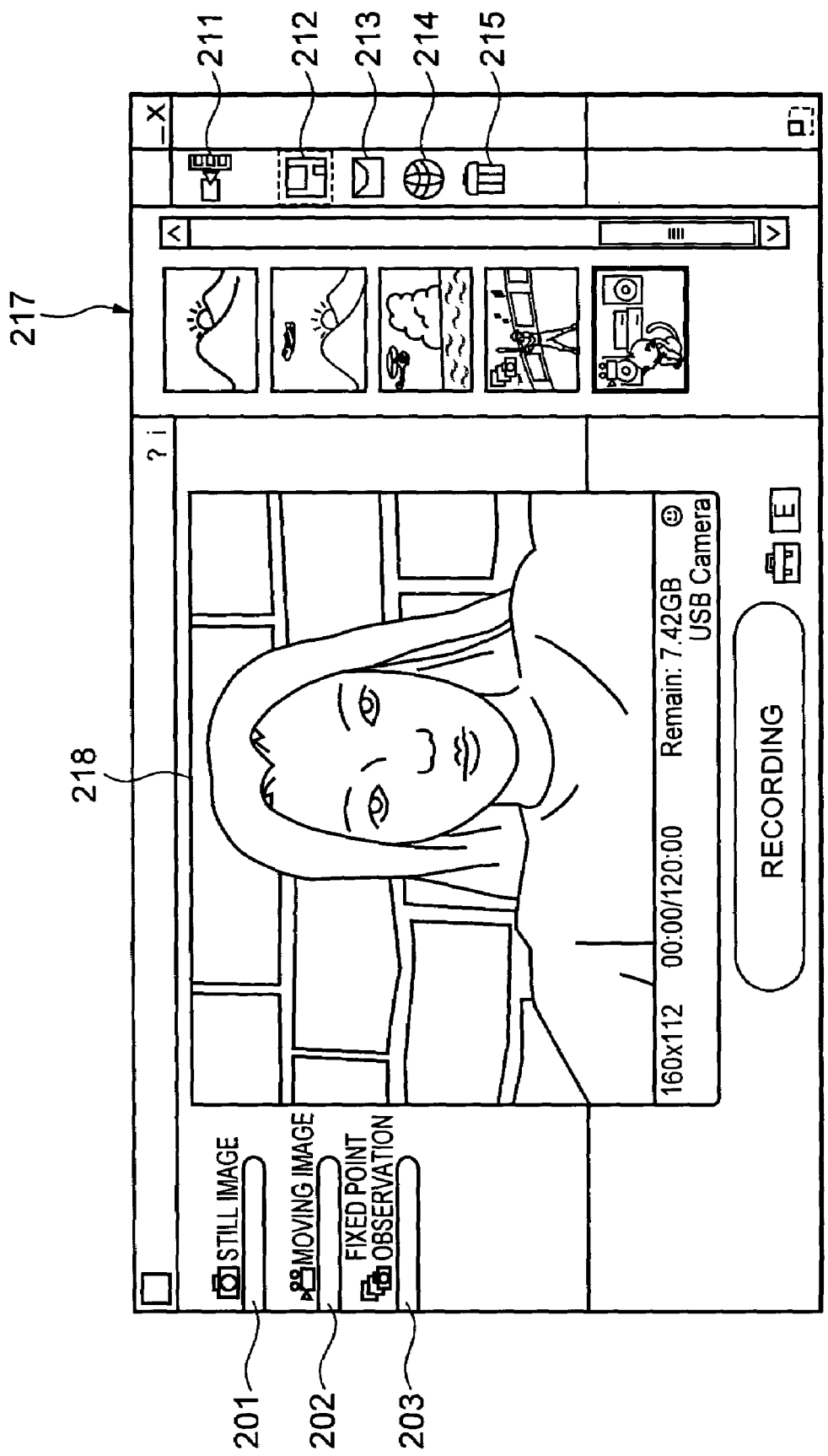
FIG. 8 shows an example of image display according to a preferred embodiment of the present invention.

In step S1, the response program 48*b* displays a screen as shown in FIG. 8 on an LCD (Liquid Crystal Display) of the output section 47, for example. The still image, the moving image, or the fixed point observation image is displayed on the display section 218, and a still image mode button 201, a moving image mode button 202, and a fixed point observation mode button 203 are displayed on the left hand side. In addition, a thumbnail image list 217 is provided on the right hand side of the display section 218, and a mode change button 211, a save button 212, a mail button 213, an upload button 214, and a trash box button 215 are further provided on the right hand side from the top.

The still image mode button 201 is activated when the user selects the still image mode. The moving image mode button 202 is activated when the user selects the moving image mode. The fixed point observation mode button 203 is activated when the user selects the fixed point observation mode.

On the thumbnail image list 217 there is shown a thumbnail image displaying either the still image, the moving image or the fixed point observation image which is not currently saved (in the state where it is not saved as a file and in a state where the captured image is temporarily stored in a predetermined area of the storage section 48). As for the thumbnail image, the thumbnail image of the still image itself is displayed in the case of the still image; the thumbnail image of the image at the time of starting video recording (image captured at first) is displayed in the case of the moving image; and either of plural still images captured as the fixed point observation images is displayed as a thumbnail image in the case of the fixed point observation image. When the fixed point observation is started as a default, the still image captured at first is displayed as the thumbnail image, and may be replaced with another still image captured henceforth. Moreover, when a number of the images temporarily stored exceeds a predetermined number or an area having stored therein the images exceeds a predetermined capacity, any further still images cannot be captured, or video recording (image capturing) is interrupted in the case of the moving image and the fixed point observation image. In addition, when the predetermined number is exceeded or the area with the images stored exceeds the predetermined capacity, the oldest image may be deleted and the latest image may be stored. Further, each thumbnail image may be specified (selected) by clicking such that a pointer is moved to a position of a desired thumbnail image, and the specified thumbnail image is displayed with borders thereon. In the case of FIG. 8, the thumbnail image located in the bottom among the thumbnail images displayed in the thumbnail image list 217 is specified.

In addition, the image displayed on the thumbnail image list 217 may be double-clicked in a specified state so as to issue instructions to display it. In the case of the still image, the still image is displayed on the display section 218. In the case of the moving image or the fixed point observation image, it is displayed on the display section 218 as a moving image (in the case of the fixed point observation image, still images are continuously displayed).

The mode change button 211 is a button to be activated when the mode is switched by the user. Whenever the button is activated, the still image mode, the moving image mode, and the fixed point observation mode are switched in turn. Therefore, the modes may be switched by either the still image mode button 201, the moving image mode button 202, the fixed point observation mode button 203, or the mode change button 211.

The save button 212 is a button to be activated when saving the specified image (when saving it as a file) among the thumbnail images displayed on the thumbnail image list 217.

The mail button 213 is a button to be activated when transmitting, by mail, the specified image among the thumbnail images displayed on the thumbnail image list 217.

The upload button 214 is a button to be activated when uploading (the specified image) to either the image management server 17 or the FTP server 19, the specified image among the thumbnail images being displayed on the thumbnail image list 217.

The trash box button 215 is a button to be activated when deleting the thumbnail image displayed on the thumbnail image list 217 (when deleting the image temporarily stored in the predetermined area of the storage section 48).

Figure 6:
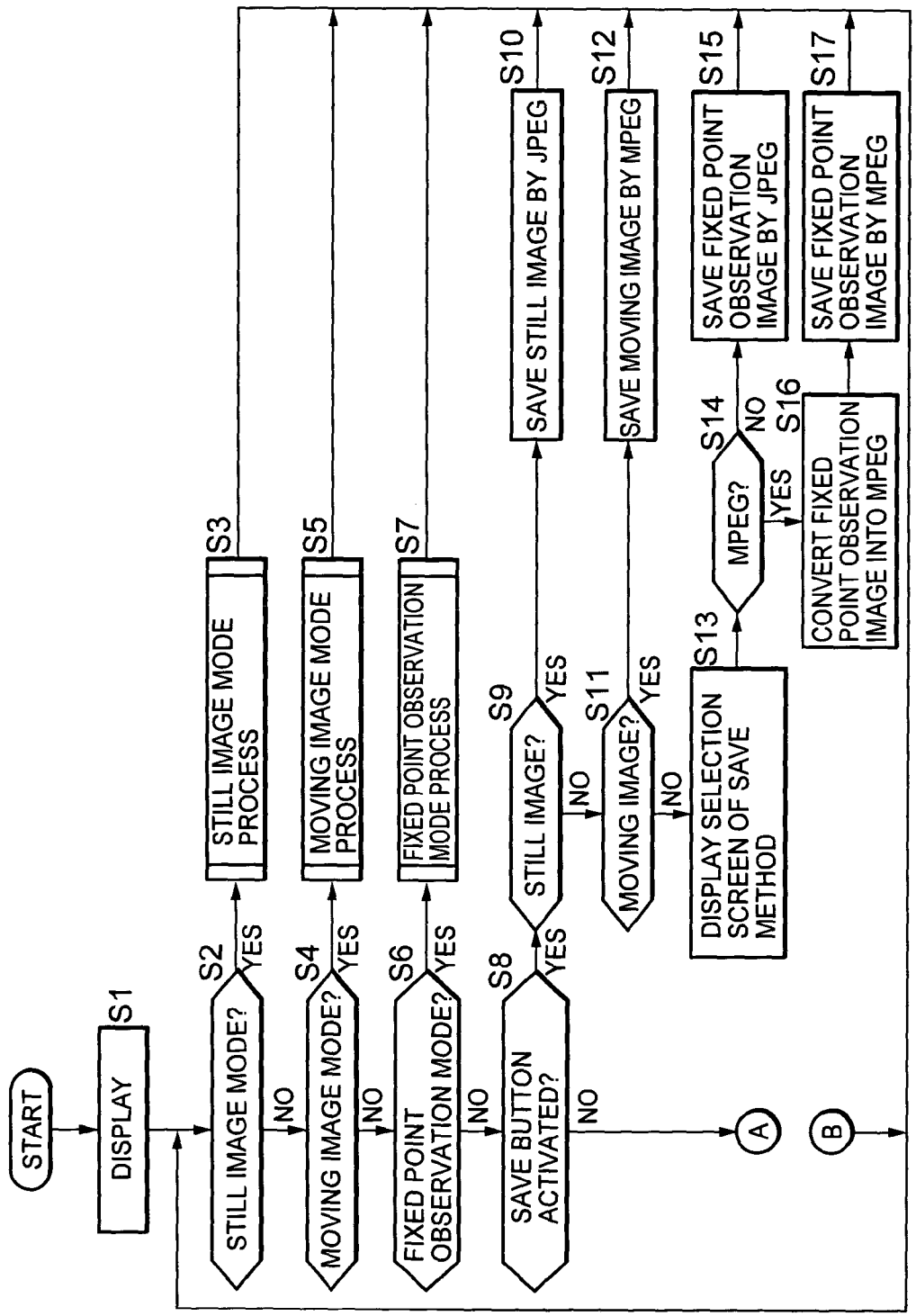
FIG. 6 shows a flowchart describing the image processing of the PC of FIG. 2.

Now, the description returns to the flowchart of FIG. 6. In step S2, the response program 48*b* determines whether or not the still image mode has been selected. For example, when the pointer is operated by the user and the still image mode button 201 is activated, the response program 48*b* determines that the still image mode has been selected, and the process goes to step S3.

In step S3, the response program 48*b* performs a still image mode process.

Figure 9:
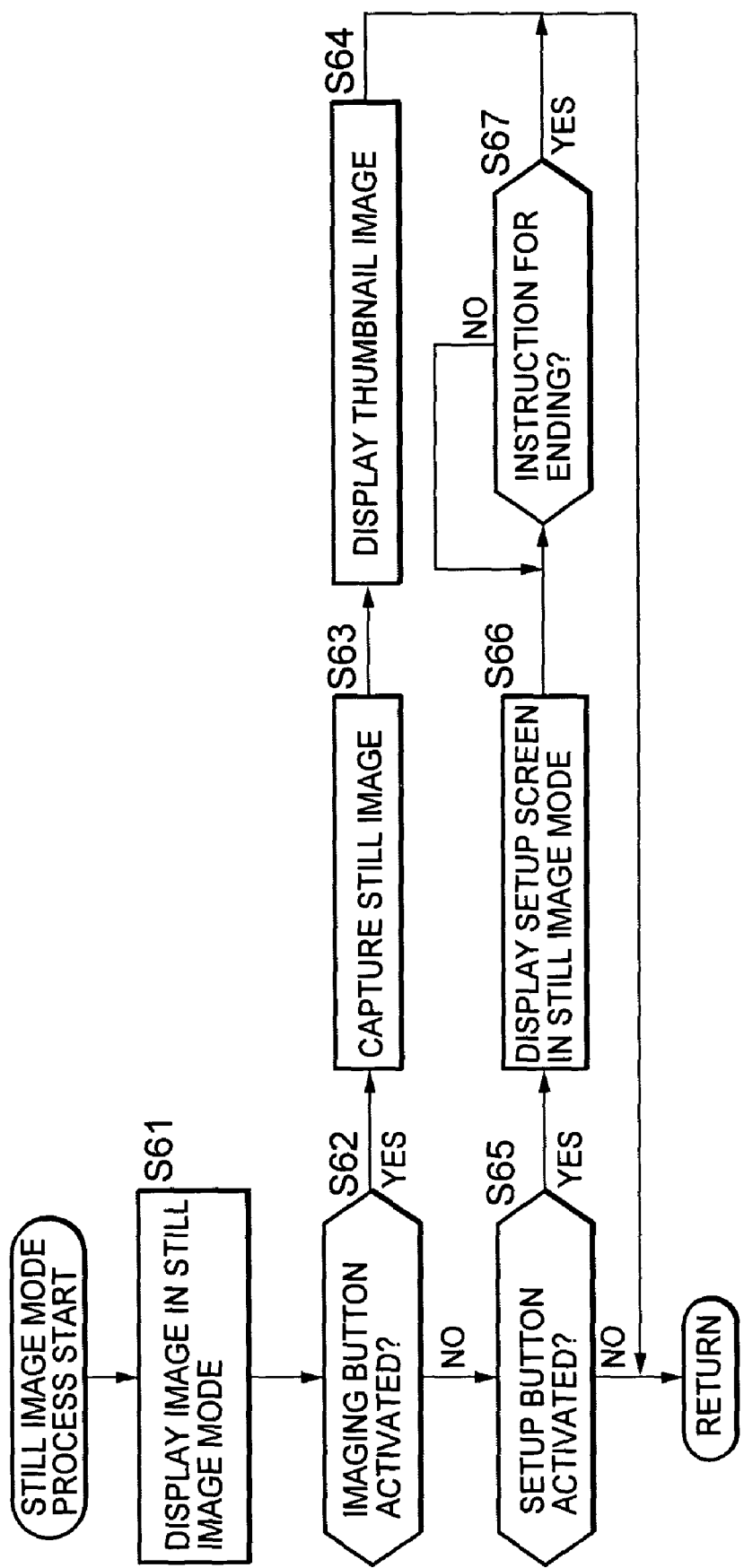
FIG. 9 shows a flowchart describing the processing of the still image mode according to a preferred embodiment of the present invention.

Now, the still image mode process will be described with reference to a flow chart of FIG. 9.

Figure 10:
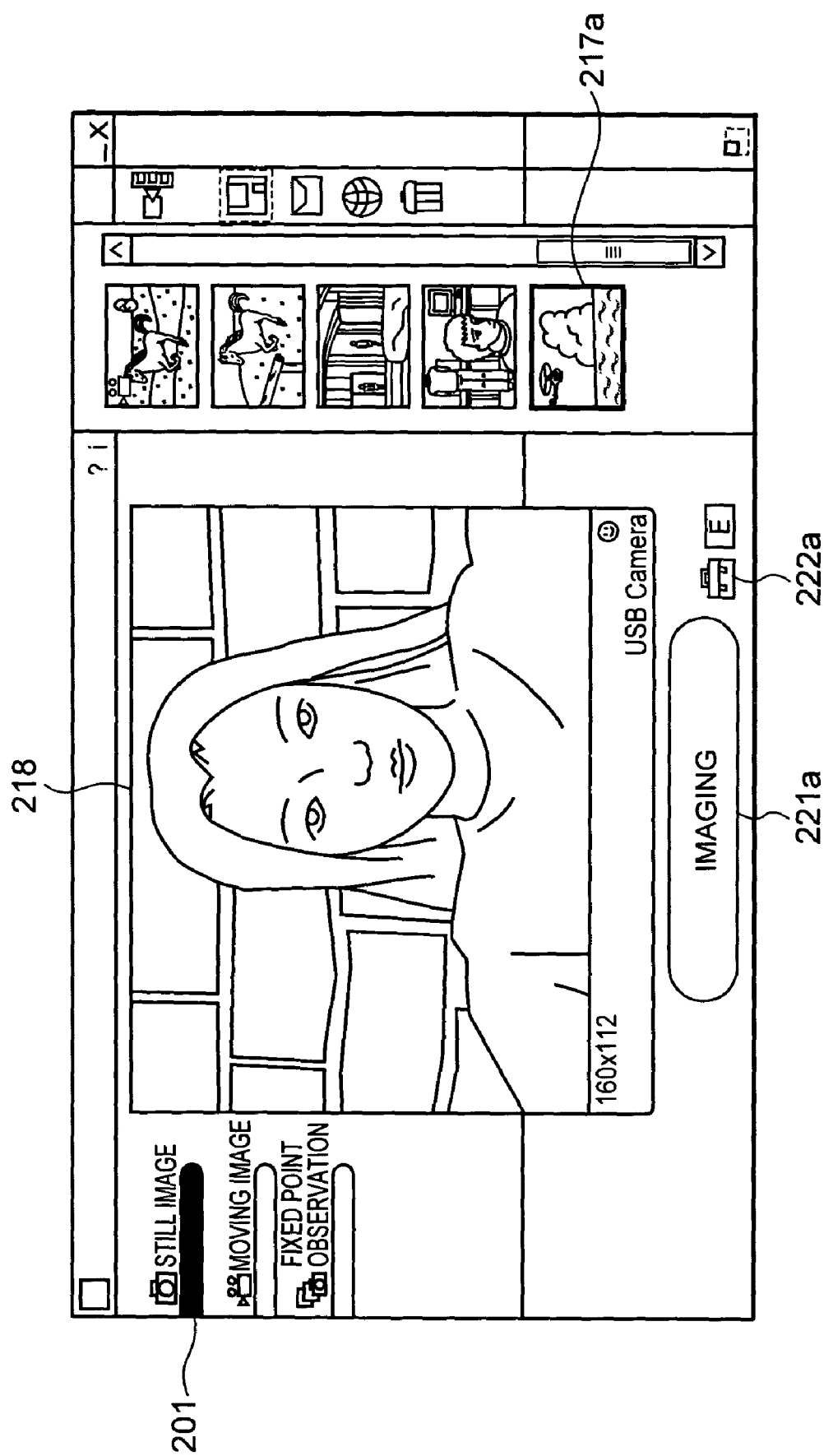
FIG. 10 shows an example of image display according to a preferred embodiment of the present invention.

In step S61, the response program 48*b* displays a screen in the still image mode as shown in the display section 218 in FIG. 10. In the still image mode, as shown in FIG. 10, a displayed color of the still image mode button 201 changes, and an image capturing button 221*a* is further displayed under the display section 218. In addition, a setup button 222*a*, for example, is displayed on the right hand side of the image capturing button 221*a*. At this time, the response program 48*b* displays on the display section 218 the image acquired by means of the camera 12 and inputted through camera control program 48*c*. The image capturing button 221*a* is a button to be activated when the user issues instructions to capture an image currently displayed on the display section 218. The setup button 222*a* is a button to be activated when performing various types of setups in the still image mode. When this button is activated, a setup screen in the still image mode is displayed and various types of setups may be carried out.

In step S62, the response program 48*b* determines whether or not the image capturing button 221*a* has been activated. When it is determined that the image capturing button 221*a* has been activated, the process goes to step S63.

Figure 11:
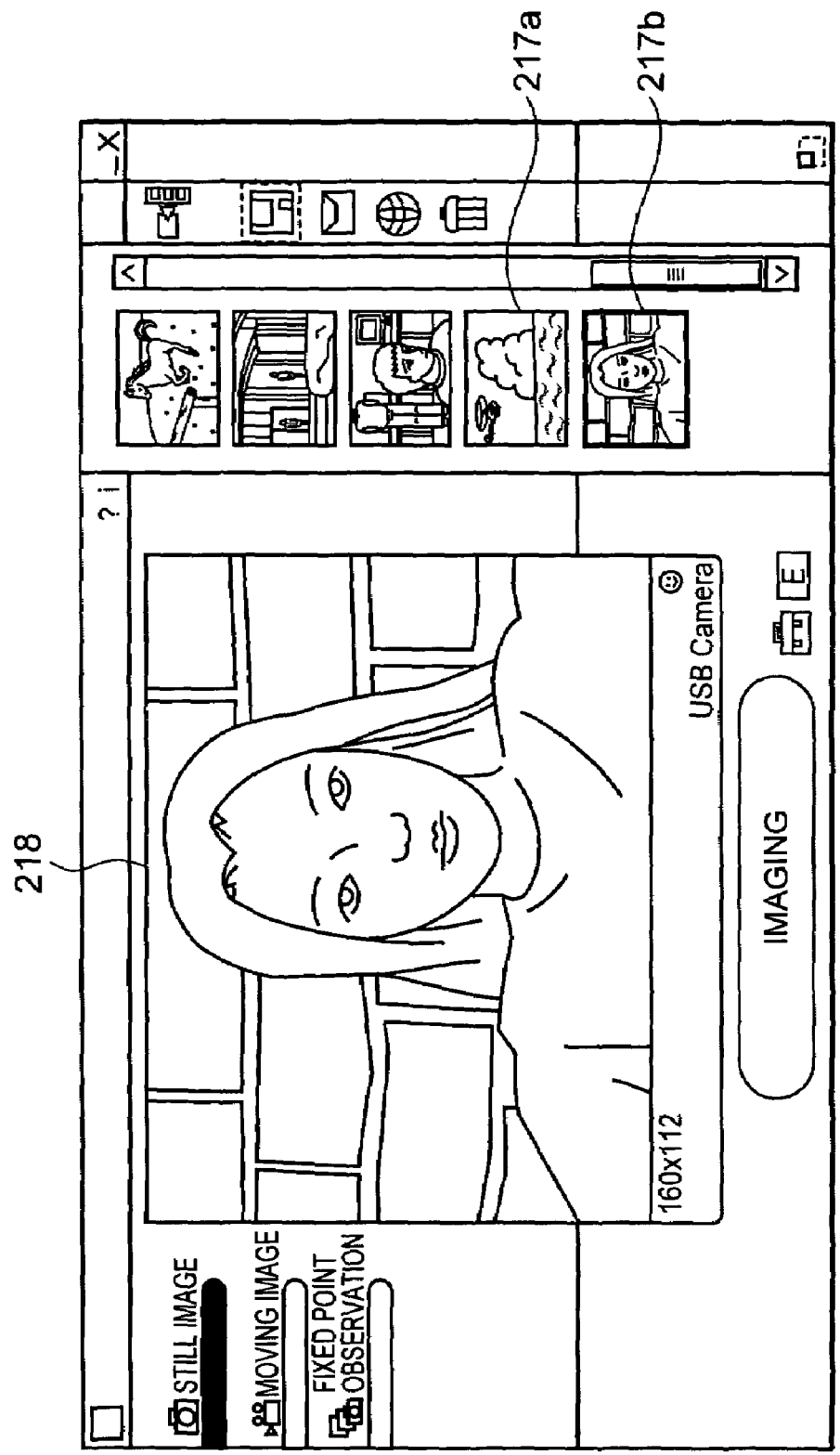
FIG. 11 shows an example of image display according to a preferred embodiment of the present invention.

In step S63, the response program 48*b* controls the camera control program 48*c*, and captures an image within a field of view of the camera 12 so as to be temporarily stored in the predetermined area within the storage section 48. In step S64, the response program 48*b* displays a new thumbnail image 217*b* corresponding to a currently captured image (still image) under a thumbnail image 217*a* which has been the latest image as shown in FIG. 11 on the thumbnail image list 217 in FIG. 11.

In step S62, when it is determined that the image capturing button 221*a* has not been activated, it is determined in step S65 whether or not the setup button 222*a* has been activated. In step S65, when it is determined that the setup button 222*a* has been activated, the response program 48*b* displays, in step S66, the setup screen in the still image mode. In step S67, the response program 48*b* determines whether or not the setup in the still image mode has been ended, and the process is repeated until it is determined that the setup has ended. When it is determined that the setup has ended, or when it is determined, in step S65, that the setup button 222*a* has not been activated, the still image mode process has ended and the process returns to the process of the flow chart of FIG. 6.

Now, the description returns to the flow chart of FIG. 6.

In step S2, when it is determined not to be in the still image mode, the response program 48*b* determines, in step S4, whether or not the moving image mode has been selected, that is, whether or not the moving image mode button 202 has been activated. In step S4, when it is determined that the moving image mode button 202 has been activated, the response program 48*b* performs a moving image mode process in step S5.

Figure 12:
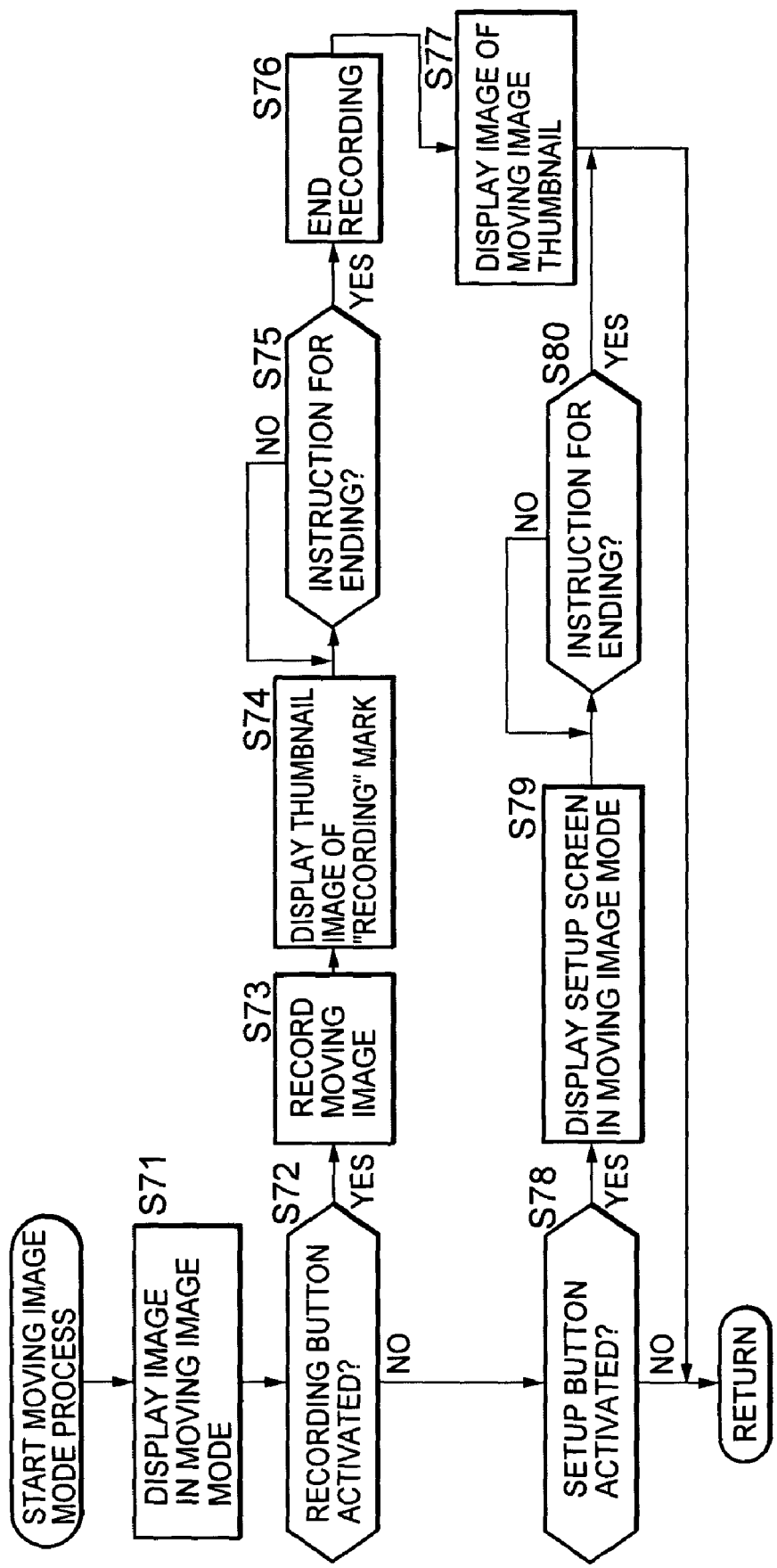
FIG. 12 shows a flowchart describing the processing of the moving image mode according to a preferred embodiment of the present invention.

Referring now to a flow chart in FIG. 12, the moving image mode process will be described.

Figure 13:
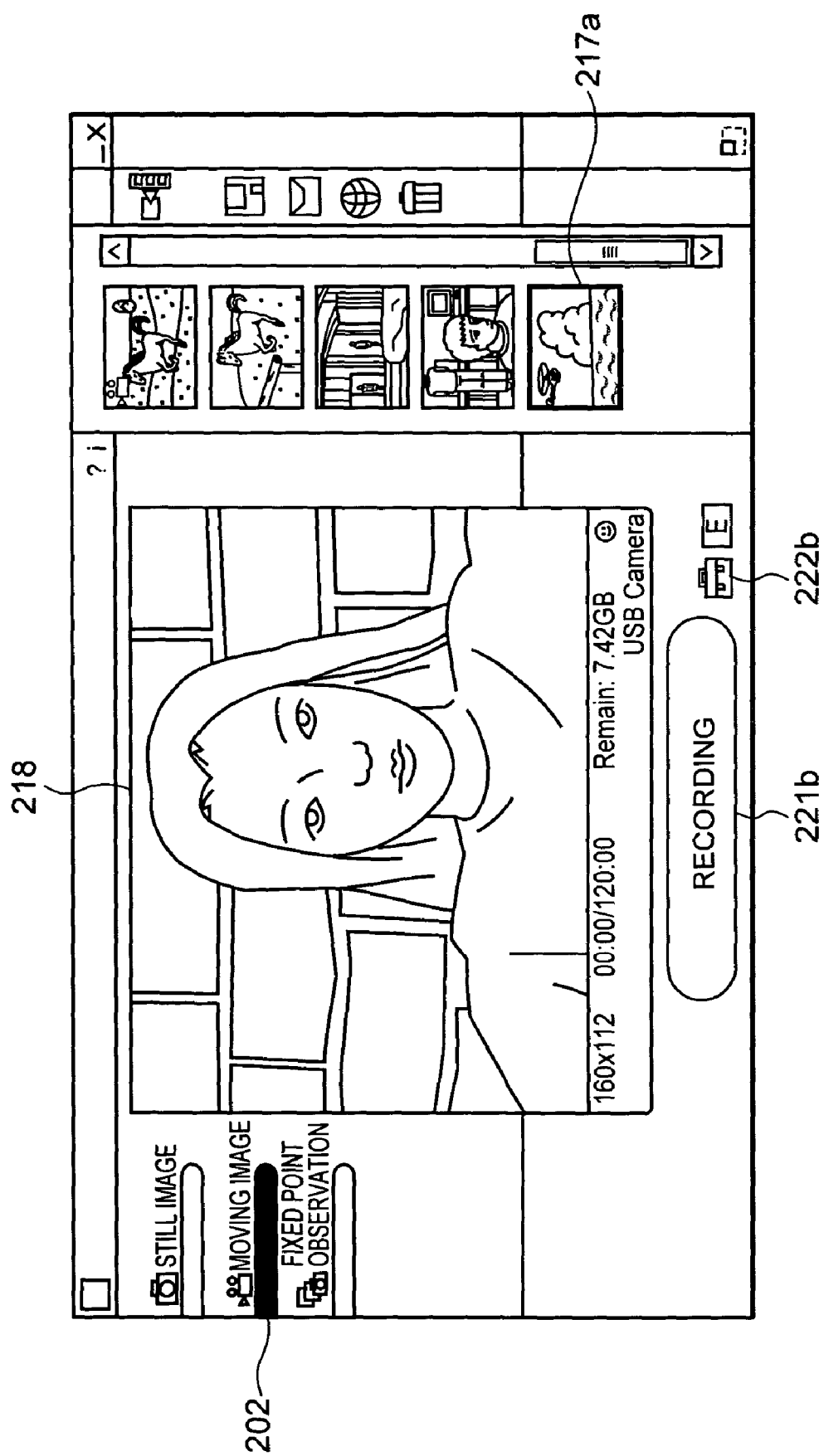
FIG. 13 shows an example of image display according to a preferred embodiment of the present invention.

In step S71, the response program 48*b* displays a screen in the moving image mode as shown in the display section 218 in FIG. 13. In the moving image mode, as shown in FIG. 13, a displayed color of the moving image mode button 202 changes, and a recording button 221*b* is further displayed on a portion under the display section 218. In addition, a setup button 222*b*, for example, is displayed on the right hand side of the recording button 221*b*. At this time, the response program 48*b* displays, on the display section 218, an image acquired by means of the camera 12 and inputted through camera control program 48*c*. The recording button 221*b* is a button to be activated when the user issues instructions to record an image currently displayed on the display section 218. The setup button 222*b* is a button to be activated when performing various types of setups in the moving image mode. When this button is activated, a setup screen in the moving image mode is displayed.

In step S72, the response program 48*b* determines whether or not the recording button 221*b* has been activated. When it is determined that the recording button 221*b* has been activated, the process goes to step S73.

In step S73, the response program 48*b* controls the camera control program 48*c*, and starts the recording (video recording as a moving image) of an image within a field of view of the camera 12 so as to be stored in a predetermined area within the storage section 48.

Figure 14:
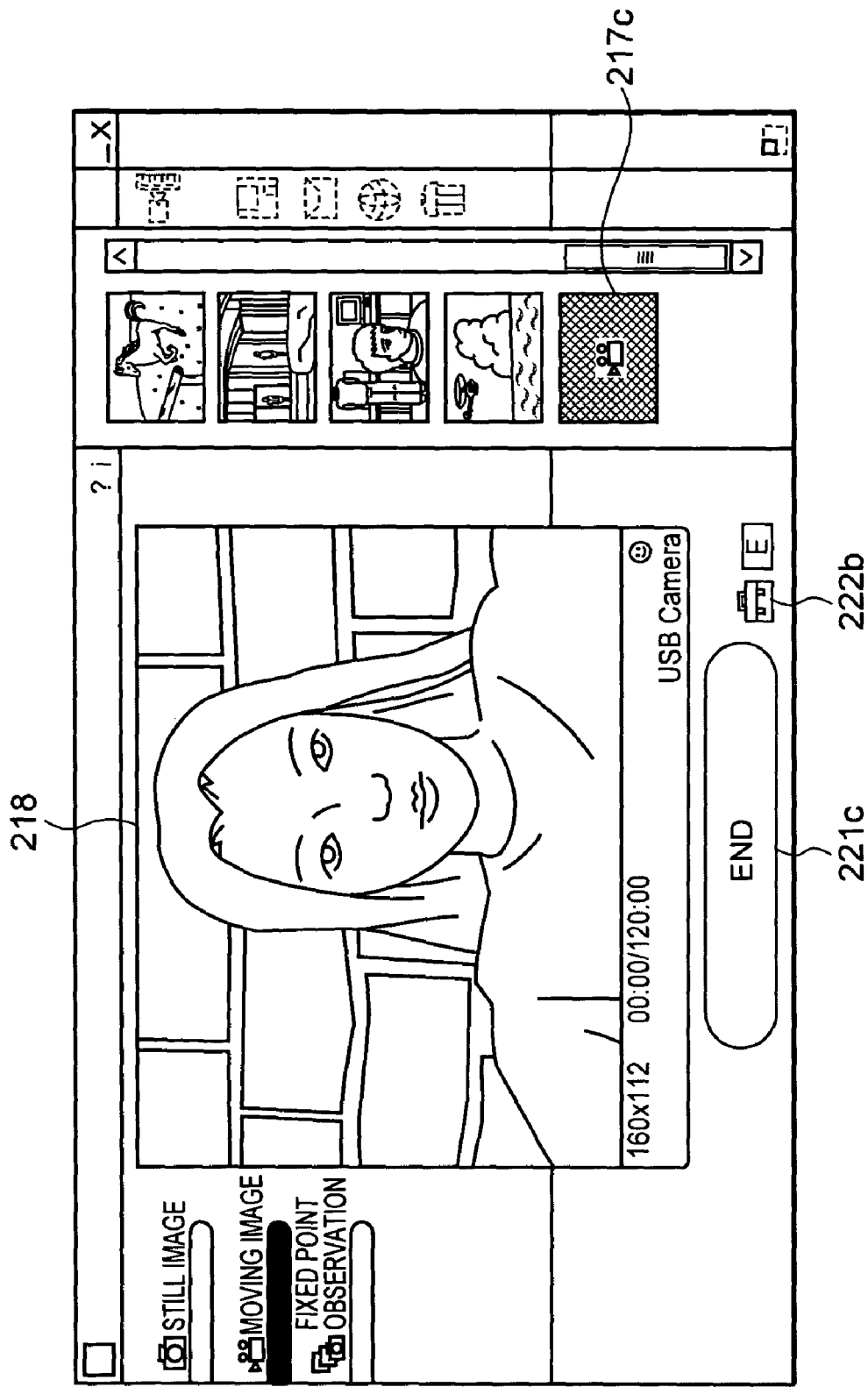
FIG. 14 shows an example of image display according to a preferred embodiment of the present invention.

In step S74, the response program 48*b* displays a new thumbnail image 217*c* corresponding to a currently captured image (moving image) under the thumbnail image 217*a* which has been the latest image, as shown in FIG. 13, on the thumbnail image list 217 as shown in FIG. 14. At this time, as shown in FIG. 14, the response program 48*b* displays only a "recording" mark, in the thumbnail image 217*c*, indicating that it is under recording, and changes a display under the display section 218 such that the recording button 221*b* is replaced with an end button 221*c*.

In step S75, the response program 48*b* determines whether or not the end button 221*c* has been activated and repeats the process until the end button 221*c* is activated. When the end button 221*c* is activated, the process goes to step S76.

Figure 15:
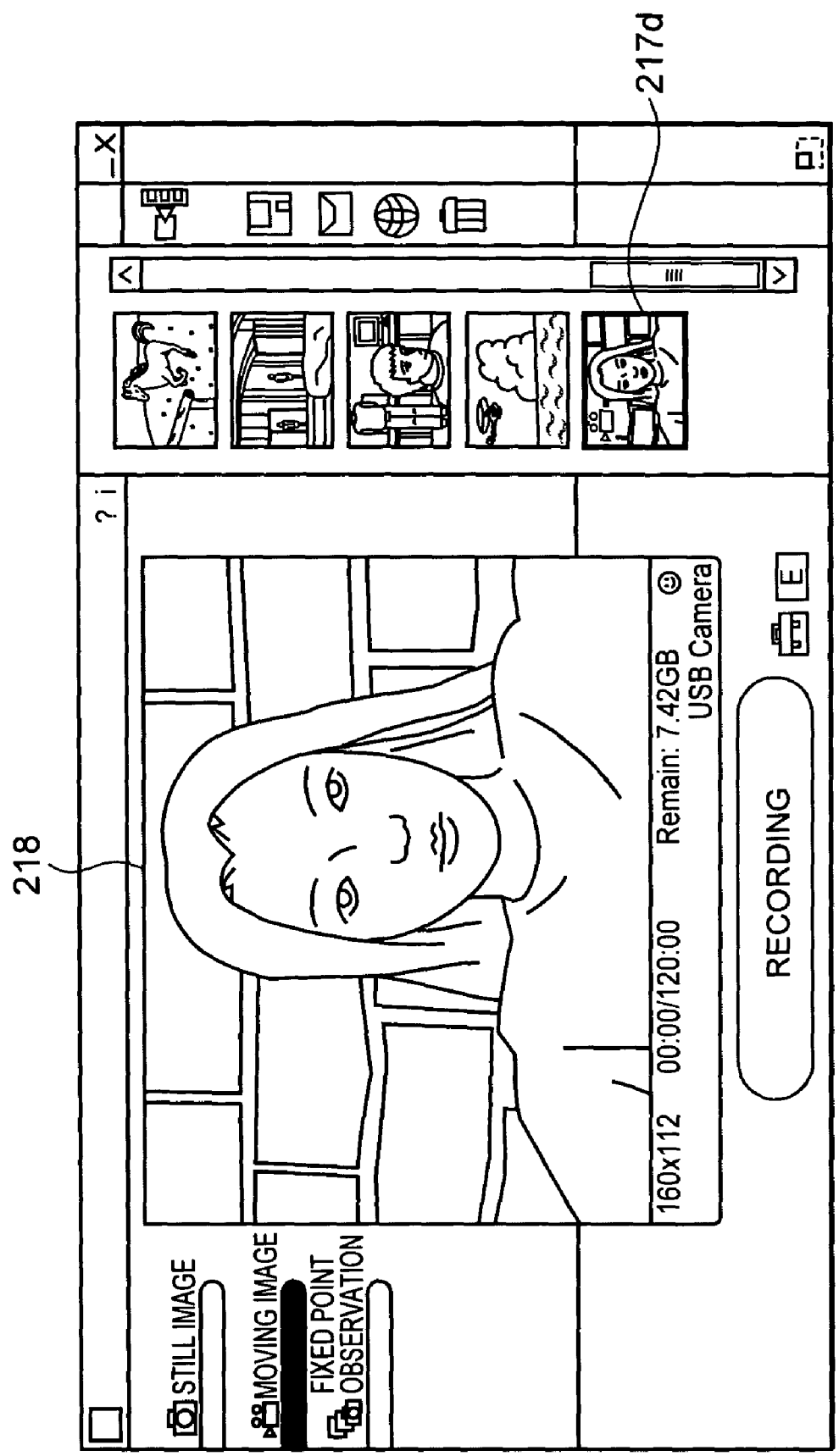
FIG. 15 shows an example of image display according to a preferred embodiment of the present invention.

In step S76, the response program 48*b* controls the camera control program 48*c* and terminates the recording so as to store images. In step S77, as shown in FIG. 15, the response program 48*b* replaces the thumbnail image 217*c* indicating only the "recording" mark with the thumbnail image 217*d* which identifies the recorded moving image so as to be displayed. At this time, as shown in FIG. 15, the thumbnail image 217*d* is displayed such that a moving image mark (a mark like a 8 mm movie camera) indicating that it is a moving image is attached to an upper left portion of the thumbnail image 217*d*. By displaying it in this way, the image being managed as the thumbnail image may be determined at a glance whether it is a still image or a moving image.

In step S72, when it is determined that the recording button has not been activated, the response program 48*b* determines, in step S78, whether or not the setup button 222*b* has been activated. Having determined that it has been activated, the process goes to step S79.

In step S79, the response program 48b displays the setup screen in the moving image mode. In step S80, the response program 48b determines whether or not instructions to terminate the setup in the moving image mode have been issued and repeats the process until the instructions to terminate the setup in the moving image mode are issued. For example, when the instructions to terminate the setup in the moving image mode are issued, the moving image mode process has ended and the process returns to the process of the flow chart of FIG. 6.

Now, the description returns to the process of the flow chart in FIG. 6.

In step S4, when it is determined that the moving image mode is not selected, the response program 48b determines whether or not the fixed point observation mode has been selected, that is, it is determined whether or not the fixed point observation mode button 203 has been activated. For example, when it is determined that the fixed point observation button 203 has been activated, the response program 48b determines that it is in the fixed point observation mode, and the process goes to step S6, so that the fixed point observation mode process is performed.

Referring now to a flow chart of FIG. 16, a process in the fixed point observation mode will be described.

Figure 17:
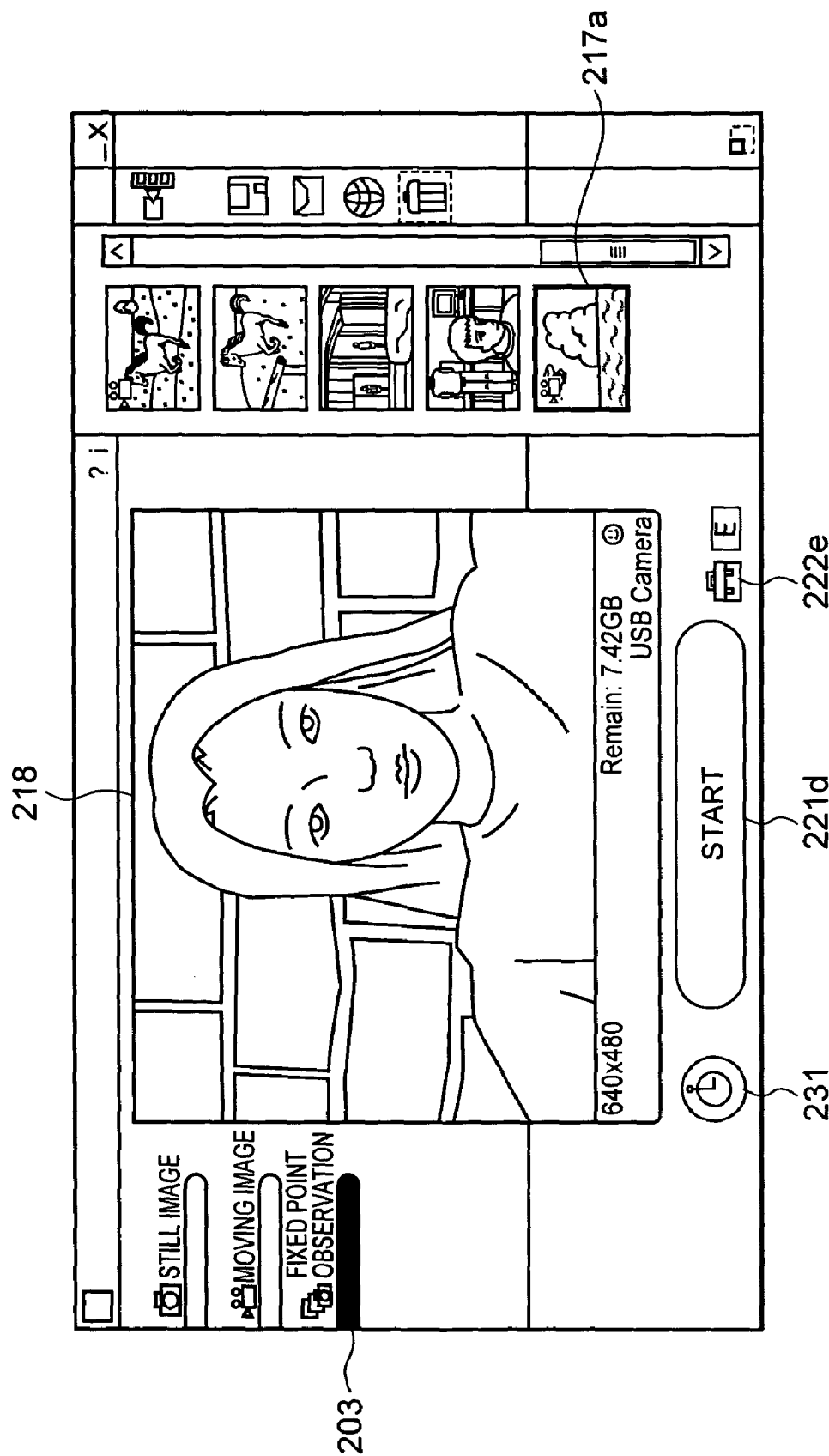
FIG. 17 shows an example of image display according to a preferred embodiment of the present invention.

In step S91, the response program 48b displays the image in the fixed point observation mode as shown in FIG. 17. In the fixed point observation mode, as shown in FIG. 17, a displayed color of the fixed point observation mode button 203 changes, and the start button 221d is further displayed on a portion under the display section 218. In addition, a setup button 222e, for example, is displayed on the right hand side of the start button 221d. At this time, the response program 48b displays, on the display section 218, an image acquired by means of the camera 12 and inputted through camera control program 48c. The start button 221d is a button to be activated when the user issues instructions to perform the fixed point observation of an image displayed on the display section 218. The setup button 222e is a button to be activated when performing various types of setups in the fixed point observation mode. When this button is activated, a setup screen in the fixed point observation mode is displayed. Moreover, a reservation button 231 is displayed on the left hand side of the start button 221d. The reservation button 231 is a button to be activated by the user, when carrying out in advance a reservation setup of the image capturing by means of the fixed point observation.

In step S92, the response program 48b determines whether or not the start button 221d has been activated. When it is determined that the start button 221d has been activated, the process goes to step S93.

Figure 18:
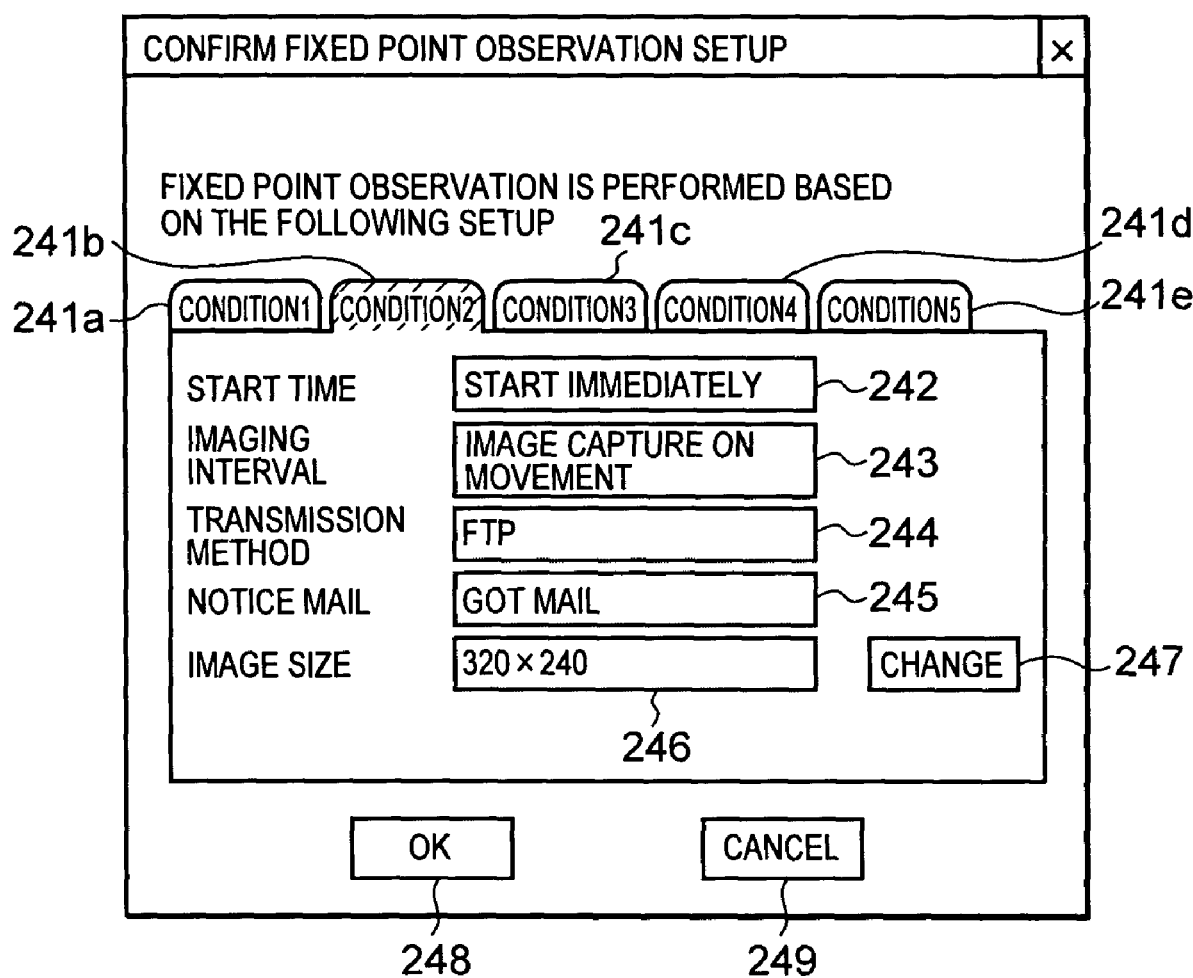
FIG. 18 shows an example of image display according to a preferred embodiment of the present invention.

In step S93, the response program 48b displays a verification screen (dialog box) as shown in FIG. 18. In the verification screen of FIG. 18, tabs 241a to 241e are provided for every condition to set up intervals for imaging when the fixed point observation is performed, and each content of the setup is shown. As the content of the setup, a start time display box 242, an imaging interval display box 243, a transmission method display box 244, a notice mail check display box 245, and an image size display box 246 are provided. The start time display box 242 is a box for indicating time to start the fixed point observation of a condition 2, and therefore can set "starting immediately" other than the time. The imaging interval display box 243 is a box for indicating the imaging interval of the condition 2, and may set "image captured at regular time intervals", "image captured on movement", "image captured when brightness suddenly changes", "image captured when red object comes into a field of view", or "image captured when any subject moves to the left", for example. The transmission method display box 244 is a box for indicating a destination to which an image captured by the fixed point observation is transmitted (uploaded) so that information set to "FTP", "image management server", etc. is displayed. The notice mail check display box 245 is a box for indicating whether or not notice mail is transmitted when the fixed point observation image is uploaded, so that "Got Mail" or "No Mail" is displayed. The image size display box 246 shows a size of an image uploaded as the fixed point observation image.

The contents of the setup of the condition 2 are shown in FIG. 18. In this case, "starting immediately" is displayed in the start time display box 242; "image captured on movement" is displayed in the imaging interval display box 243; "FTP" in the transmission method display box 244; "Got Mail" in the notice mail check display box 245; "320×240" is displayed on the image size display box 246. Start Time is "starting immediately"; Imaging Interval is "image captured on movement"; Transmitting Method is "FTP"; Notice Mail is "Got Mail"; and it is shown that Picture Size is "320×240." When the tabs 241a through 241e are clicked, the above-mentioned setup information data respectively corresponding to conditions 1 through 5 are displayed. The conditions will be described later.

Further, the change button 247 is a button to be activated by the user to change these setup information data. An O.K. button 248 is a button to be activated when using the setup information data as they are, without changing them. A cancel button 249 is a button to be activated by the user, when rendering the fixed point observation operation itself cancelled.

In step S94, the response program 48b determines whether or not the O.K. button 248 has been activated. For example, when it is determined that the O.K. button 248 has not been activated, it is determined whether or not the cancel button 249 has been activated in step S95. For example, when it is determined that the cancel button 249 has not been activated, the process goes to step S96.

In step S96, the response program 48b determines that the change button 247 has been activated, and displays the fixed point observation setup screen, so that the fixed point observation mode is set up. Upon completion of setup processing in the fixed point observation mode in step S96, the response program 48b stores the setup information as the setup data 48d and transmits it to the image management server 17 to which the fixed point observation image is uploaded in step S97. In other words, for example, check information of the notice mail in the setup information etc. is information on whether or not mail is transmitted when the image management server 17 receives an upload from the PC 11, so that the image management server 17 is notified in advance.

In step S98, the response program 48b determines whether or not it is timing to capture an image. In particular, the image analysis program 48e analyzes an image inputted through the camera 12 by means of the camera control program 48c, and the results of analysis are outputted to the response program 48b. From the analysis result, the response program 48b determines whether or not the conditions corresponding to the imaging interval (timing for imaging) of the fixed point observation image are satisfied, such as whether or not the image moved, whether or not brightness suddenly changed, whether or not the red object came into sight, whether or not any subject moved to the left, or whether or not a predetermined time elapsed. For example, when it is determined that the corresponding conditions have been satisfied, the response program 48b controls the camera control program 48c and captures an image of the camera 12 as the fixed point observation image so as to be stored temporarily in a predetermined area of the storage section 48 in step S99.

In step S100, the response program 48b determines whether or not the predetermined area of the storage section 48 where the captured image is stored has more capacity as compared with predetermined capacity (that is, more than a predetermined number of sheets). When it is determined that it has the capacity more than the predetermined one, the oldest still image among the still images captured as the fixed point observation images is deleted in step S101.

In step S102, the response program 48b uploads the captured still image to the image management server 17 or the FTP 18. At this time, with reference to the above-mentioned setup data 48d, the response program 48b transmits (uploads) it to the image management server 17 or the FTP server 18 by means of the set transmission method. At this time, the response program 48b uploads the image data to be uploaded together with the information on which timing the captured image was captured or which event caused the image to be captured.

Figure 19:
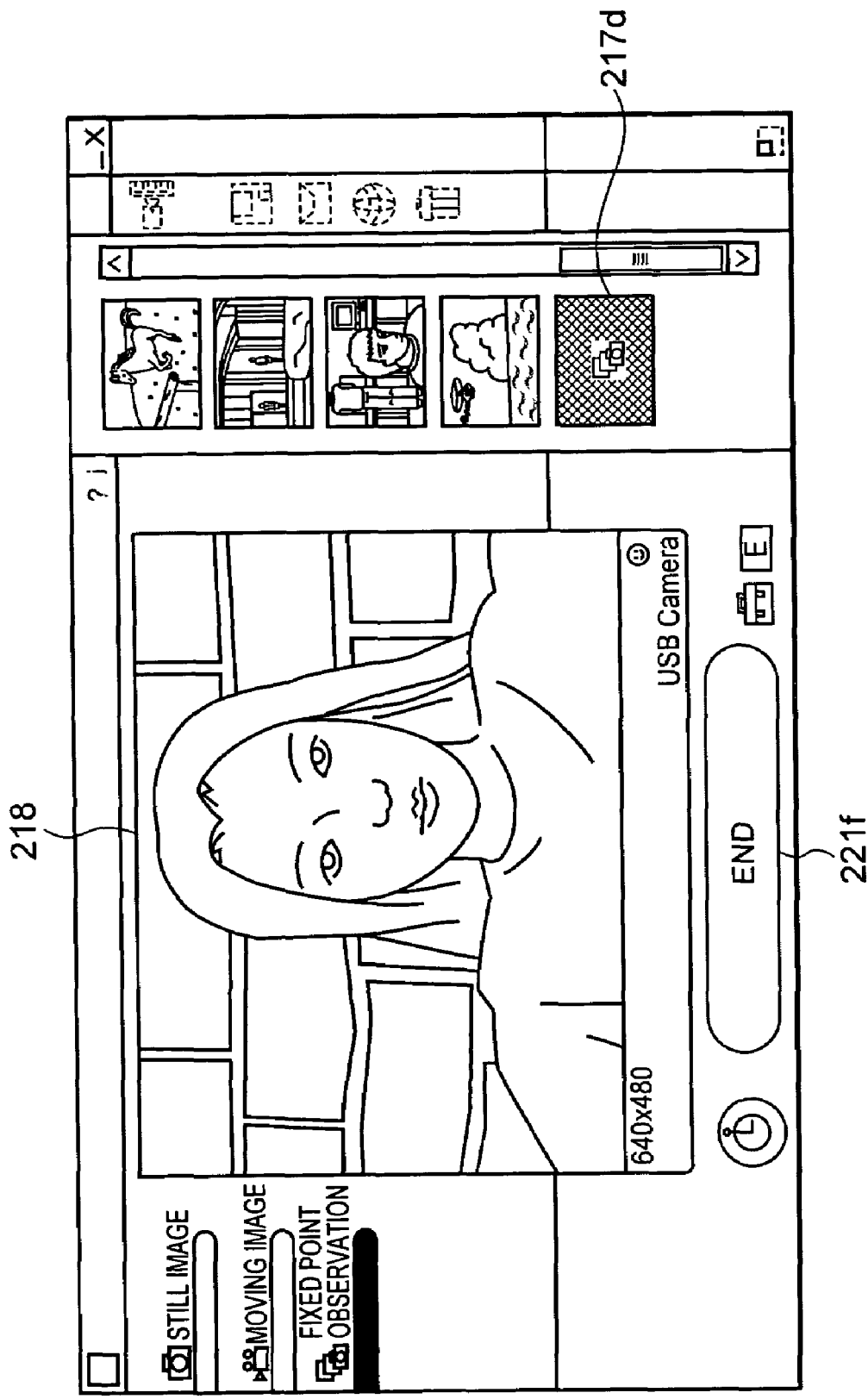
FIG. 19 shows an example of image display according to a preferred embodiment of the present invention.

In step S103, as shown in FIG. 19 the response program 48b displays, on the thumbnail image list 217, a new thumbnail image 217d corresponding to a currently captured image (fixed point observation image) under the thumbnail image 217a which has been the latest image as shown in FIG. 17. At this time, as shown in FIG. 19, the response program 48b displays, in the thumbnail image 217d, only a mark "under fixed point observation" which indicates that a fixed point observation image is being captured, and changes a display under the display section 218 such that a start button 221e is replaced with an end button 221f.

Figure 20:
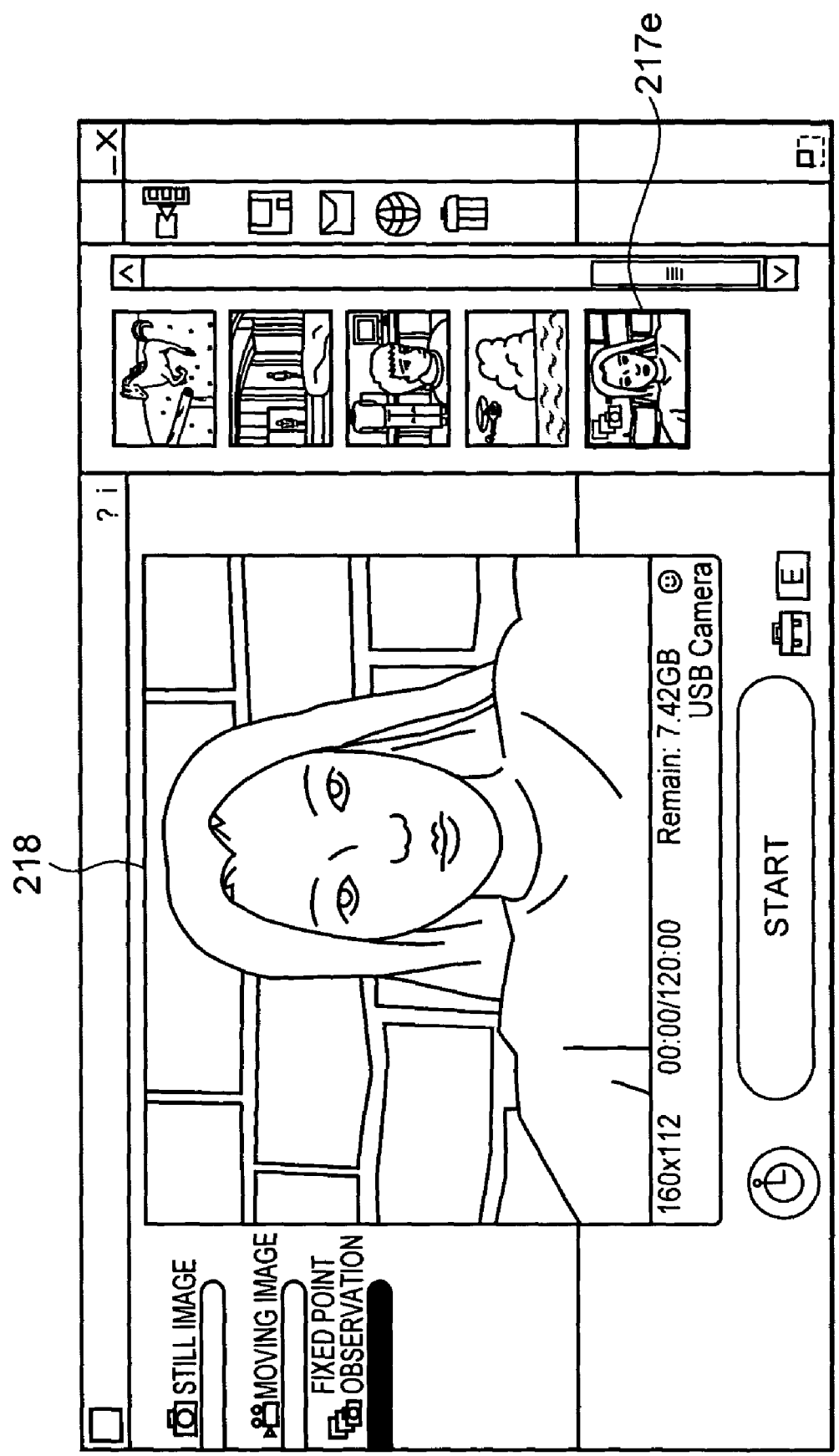
FIG. 20 shows an example of image display according to a preferred embodiment of the present invention.

In step S104, the response program 48b determines whether or not the capture of the fixed point observation image has been completed, that is, whether or not the end button 221f of FIG. 19 has been activated, or whether or not the capture time stored in the setup data 48d has elapsed, so as to determine whether or not the fixed point observation has been completed. In step S104, when it is determined that the fixed point observation has been completed, the response program 48b terminates the fixed point observation mode, in step S105, and replaces the thumbnail images 217d which has only indicated the mark "under fixed point observation" with a thumbnail image 217e which identifies the image captured by the fixed point observation so as to be displayed as shown in FIG. 20. At this time, as shown in FIG. 20, the thumbnail image 217e is displayed such that a fixed point observation mark (a mark like a camera) showing that it is a fixed point observation image is attached to the upper left portion in the thumbnail image 217e. By displaying it in this way, the image managed as the thumbnail image may be determined at a glance whether it is a still image, a moving image, or a fixed point observation image.

In step S94, when it is determined that the O.K. button 248 has been activated, processes of steps S96 and S97 are skipped, and the process goes to step S98.

In step S95, when it is determined that the cancel button 249 has been selected, processes of steps S94 to S102 are skipped, and the process goes to step S103.

In step S100, when it is determined that images have been captured not to exceed the predetermined capacity, the process of step S101 is skipped.

Figure 21:
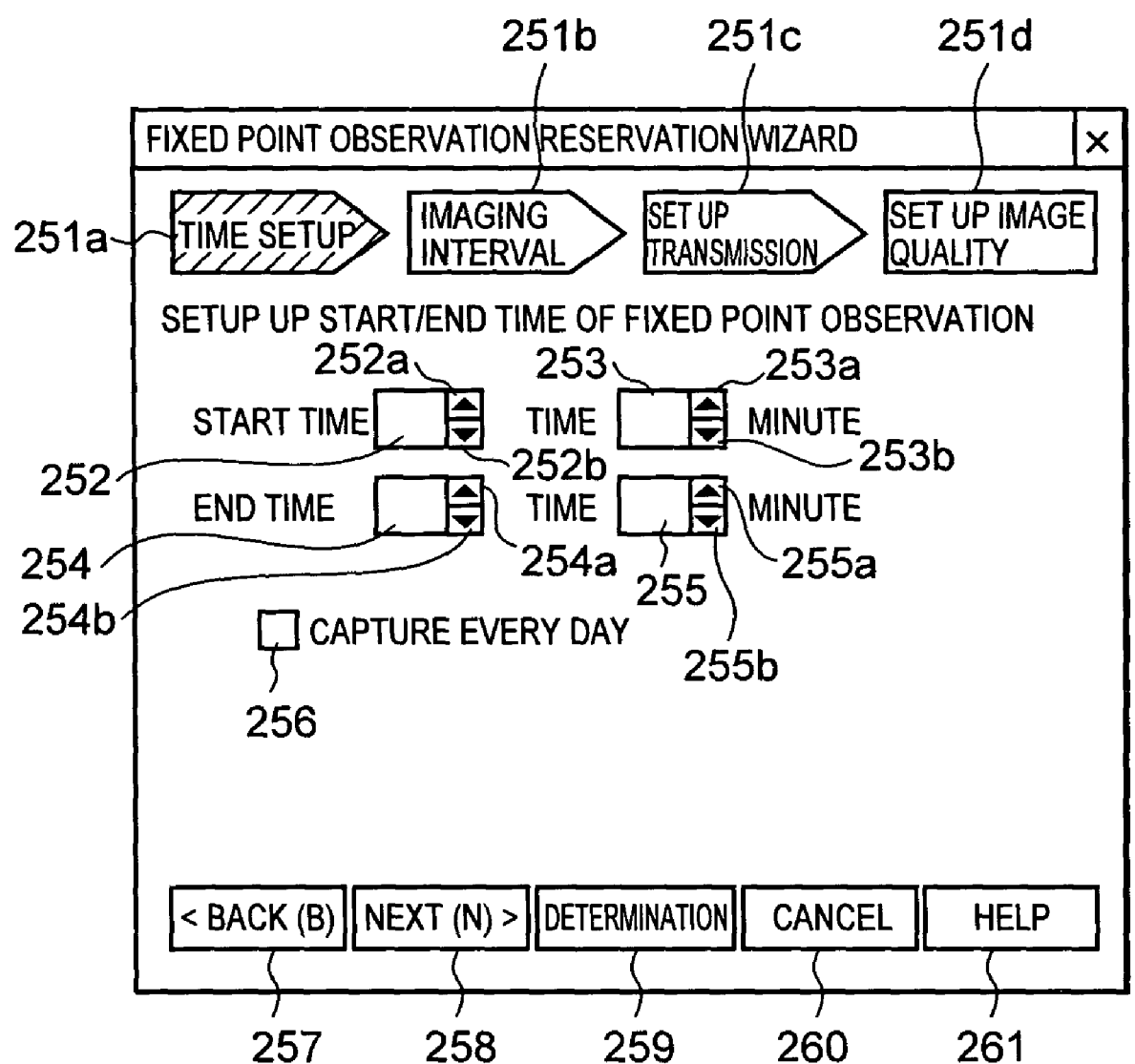
FIG. 21 shows an example of image display according to a preferred embodiment of the present invention.

In step S92, when it is determined that the start button 221d has not been activated, the response program 48b determines, in step S106, whether or not the reservation button 231 has been activated. For example, when it is determined that the reservation button 231 has been activated, the response program 48b displays a time setup screen as shown in FIG. 21 in step S107. In FIG. 21, there is shown a dialog box indicated as a fixed point observation reservation wizard. At the upper part of the dialog box, displays indicating the progress of a setup are provided. The displays are, from left to right, a time setup state display section 251a, an imaging interval state display section 251b, a transmission setup state display section 251c, and an image quality setup state display section 251d. In the current state, a color of each display may be changed. In this case, the color of the time setup state display section 251a has changed, which means that the current setup state is time setting.

Thereunder, a line "setting up start/end time of fixed point observation" is displayed, and further, a time input box 252 and a minute input box 253 of the start time are provided under the line and may be operated respectively by means of move up buttons 252a and 253a and move down buttons 252b and 253b, so that each value may be changed so as to input the start time. Under the time input box 252 and the minute input box 253 of start time, a time input box 254 and a minute input box 255 of the end time are provided and may be operated respectively by means of move up buttons 254a and 255a and move down buttons 254b and 255b, so that each value may be changed so as to input the end time.

In addition, under the time input box 254 and the minute input box 255 of the end time, a check box 256 is provided on the side of a line indicating "capture image every day", which is marked when a fixed point observation is carried out every day, at the above-mentioned start time and end time of the fixed point observation.

At the lower part of the dialog box there are shown, from left to right, a "back" button 257, a "next" button 258, a "go" button 259, a cancel button 260, and a help button 261. The "back" button 257 is a button to be activated when carrying out setup process of the dialog box before the setup process of the dialog box of FIG. 21. The "next" button 258 is a button to be activated when setting next process after completion of setup process of the dialog box as shown in FIG. 21. The "go" button 259 is a button to be activated when a setup state is determined. The cancel button 260 is a button to be activated when canceling a setting operation. The help button 261 is a button to be activated when displaying the help information about a setting operation.

For example, the start time and the end time as shown in FIG. 21 are set up, and further, when the "next" button 258 is activated, the process goes to step S108.

Figure 22:
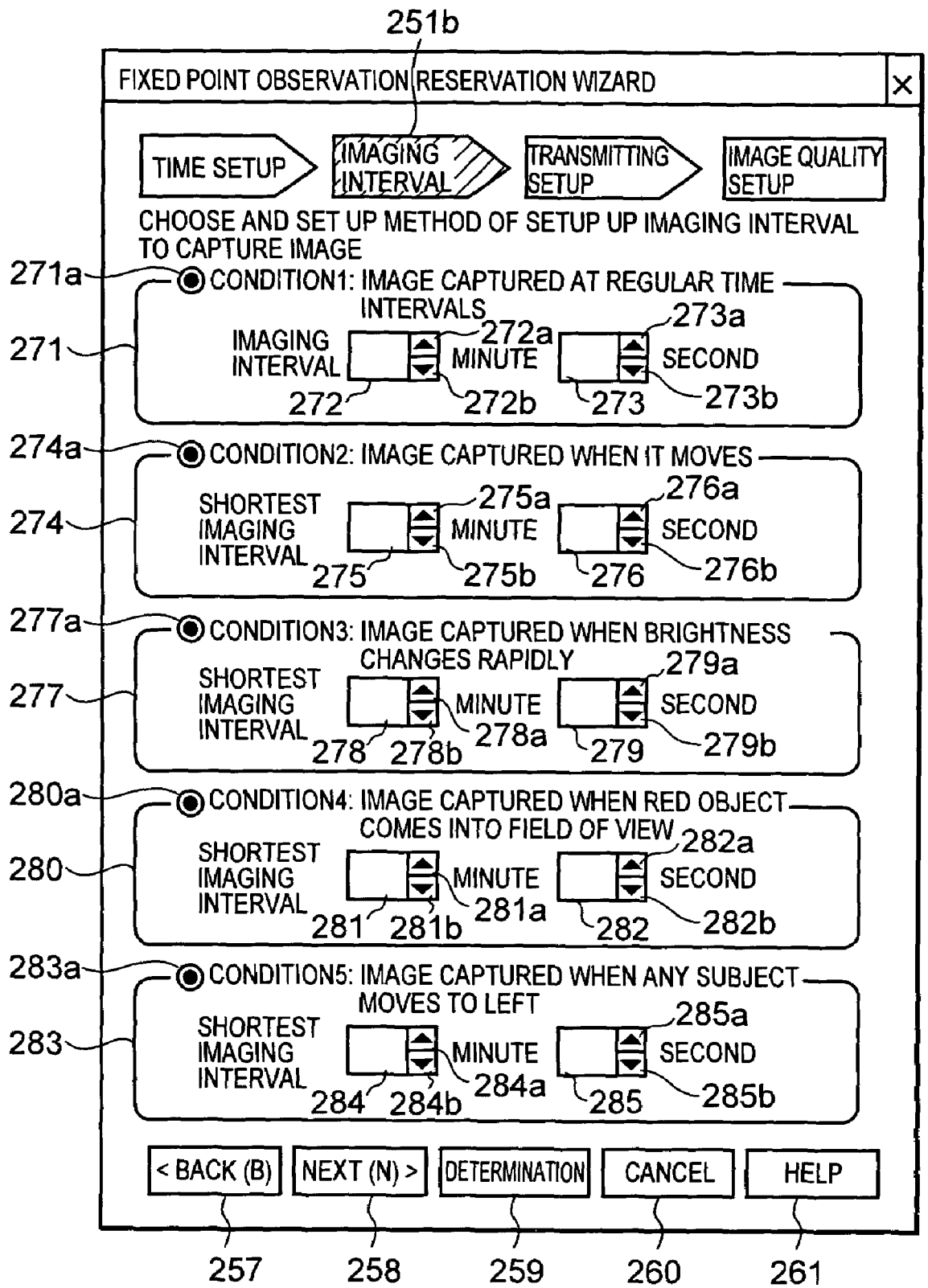
FIG. 22 shows an example of image display according to a preferred embodiment of the present invention.

In step S108, the response program 48b displays a dialog box for setting up an imaging interval as shown in FIG. 22. In FIG. 22, a color of the imaging interval state display section 251b is changed and an input box 271 for inputting conditions of the imaging interval of the condition 1, an input box 274 for inputting conditions of the imaging interval of the condition 2, an input box 277 for inputting conditions of the imaging interval of the condition 3, an input box 280 for inputting conditions of the imaging interval of the condition 4, and an input box 283 for inputting conditions of the imaging interval of the condition 5 are respectively displayed so that five types of imaging intervals which are the conditions 1 to 5 may be set up as setups of imaging intervals.

It should be understood that the five types of conditions may be set up as setups of imaging intervals in this example, however, more than five types of conditions may be set up. In addition, other conditions may be set up other than "image captured at regular time intervals"; "image captured on movement"; "image captured when brightness suddenly changes"; "image captured when red object comes into a field of view"; and "image captured when any subject moves to the left." For example, an input box for inputting conditions may be provided, or a plurality of conditions may be prepared so as to select one out of the conditions.

In this case, the conditions 1 to 5 are set up as "image captured at regular time intervals"; "image captured on movement"; "image captured when brightness suddenly changes"; "image captured when red object comes into a field of view"; and "image captured when any subject moves to the left."

What is meant by "image captured at regular time intervals" is to capture still images at regular time intervals so as to generate fixed point observation images. Therefore, in the case of the condition "image captured at regular time intervals", what is set up is the imaging intervals, so that the minute input box 272 and the second input box 273 of the imaging intervals are provided as shown in FIG. 22 and may be respectively set up by operating move up buttons 272a and 273a and move down buttons 272b and 273b. Moreover, a check button 271a is a button to be marked when enabling the setup of the condition 1, and is marked in FIG. 22, thus indicating that the setup of the condition 1 is effective.

What is meant by "image captured on movement" is to capture an image if there is a change by comparing a current image with an immediately previous image. In particular, the image analysis program 48e analyzes images inputted into the camera control program 48c through the camera 12, as a result there is a motion. In other words, the analysis result is that a change appeared between respective pixels of the current image and the immediately previous image. When the result is inputted into the response program 48b, the response program 48b controls and causes the camera control program 48c to capture a still image as a fixed point observation image.

In this case, when a continuous motion is in an image, during which still images are consecutively captured, the shortest imaging time (the shortest imaging interval) of the consecutively captured images is set up. For this reason, as shown in FIG. 22, a minute input box 275 and a second input box 276 of the shortest imaging time are provided, and may be respectively set up by operating move up buttons 275a and 276a and move down buttons 275b and 276b. Moreover, a check button 274a is a button to be marked when enabling the setup of the condition 2, and is marked in FIG. 22, thus indicating that the setup of the condition 2 is effective.

What is meant by "image captured when brightness suddenly changes" is to capture an image when a value or amount of brightness or luminance has changed by comparing an immediately previous image with a current image. In particular, the image analysis program 48e analyzes the images inputted into the camera control program 48c through the camera 12 and results in "brightness suddenly changed." In other words, for example, the analysis result shows that the difference between totals in pixel value of the immediately previous image and the current image considerably differs from a predetermined value. When the result is inputted into the response program 48b, the response program 48b controls and causes the camera control program 48c to capture a still image as the fixed point observation image.

In this case, when the brightness of the image changes continuously, during which still images are consecutively captured, so that the shortest imaging time is set up. For this reason, as shown in FIG. 22, a minute input box 278 and a second input box 279 of the shortest imaging time are prepared, and may be respectively set up by operating move up buttons 278a and 279a and move down buttons 278b and 279b. Moreover, a check button 277a is a button to be marked when enabling the setup of the condition 3, and is marked in FIG. 22, thus indicating that a setup of condition 3 is effective.

What is meant by "image captured when red object comes into a field of view" is to capture an image when a red object comes into a field of view of the current image. In particular, when an image inputted into the camera control program 48c through the camera 12 is analyzed by the image analysis program 48e and results in the red object having entered the field of view, in other words, when the analysis result indicating that a red pixel value is larger than a predetermined value is inputted into the response program 48b, the response program 48b controls and causes the camera control program 48c to capture a still image as a fixed point observation image.

In this case, if the red object remains in the field of view, since still images are consecutively captured during this time, a shortest imaging time is set up. For this reason, as shown in FIG. 22, a minute input box 281 and a second input box 282 of the shortest imaging time are provided, and may respectively be set up by operating move up buttons 281a and 282a and move down buttons 281b and 282b. Moreover, a check button 280a is a button to be marked when enabling the setup of the condition 4, and is marked in FIG. 22, thus indicating that the setup of the condition 4 is effective.

What is meant by "image captured when any subject moves to the left" is to capture an image, when any subject in an image is determined to have moved to the left by comparing the current image with the immediately previous image. In particular, the image analysis program 48e analyzes an image inputted into the camera control program 48c through the camera 12, as a result any subject is determined to have moved to the left. In other words, a position of the object in the image is captured and the analysis result indicates that the position moved leftward. When the result is inputted into response program 48b, the response program 48b controls and causes the camera control program 48c to capture a still image as a fixed point observation image.

In this case, if any subject continuously moves to the left, during which still images are consecutively captured, then the shortest imaging time is set up. For this reason, as shown in FIG. 22, a minute input box 284 and a second input box 285 of the shortest imaging time are provided, and may be respectively set up by operating move up buttons 284a and 285a and move down buttons 284b and 285b. Moreover, a check button 283a is a button to be marked when enabling the setup of the condition 5, and is marked in FIG. 22, thus indicating that the setup of the condition 5 is effective.

When the imaging interval of this image is set up and the "next" button 258 is activated, the process goes to step S109.

Figure 23:
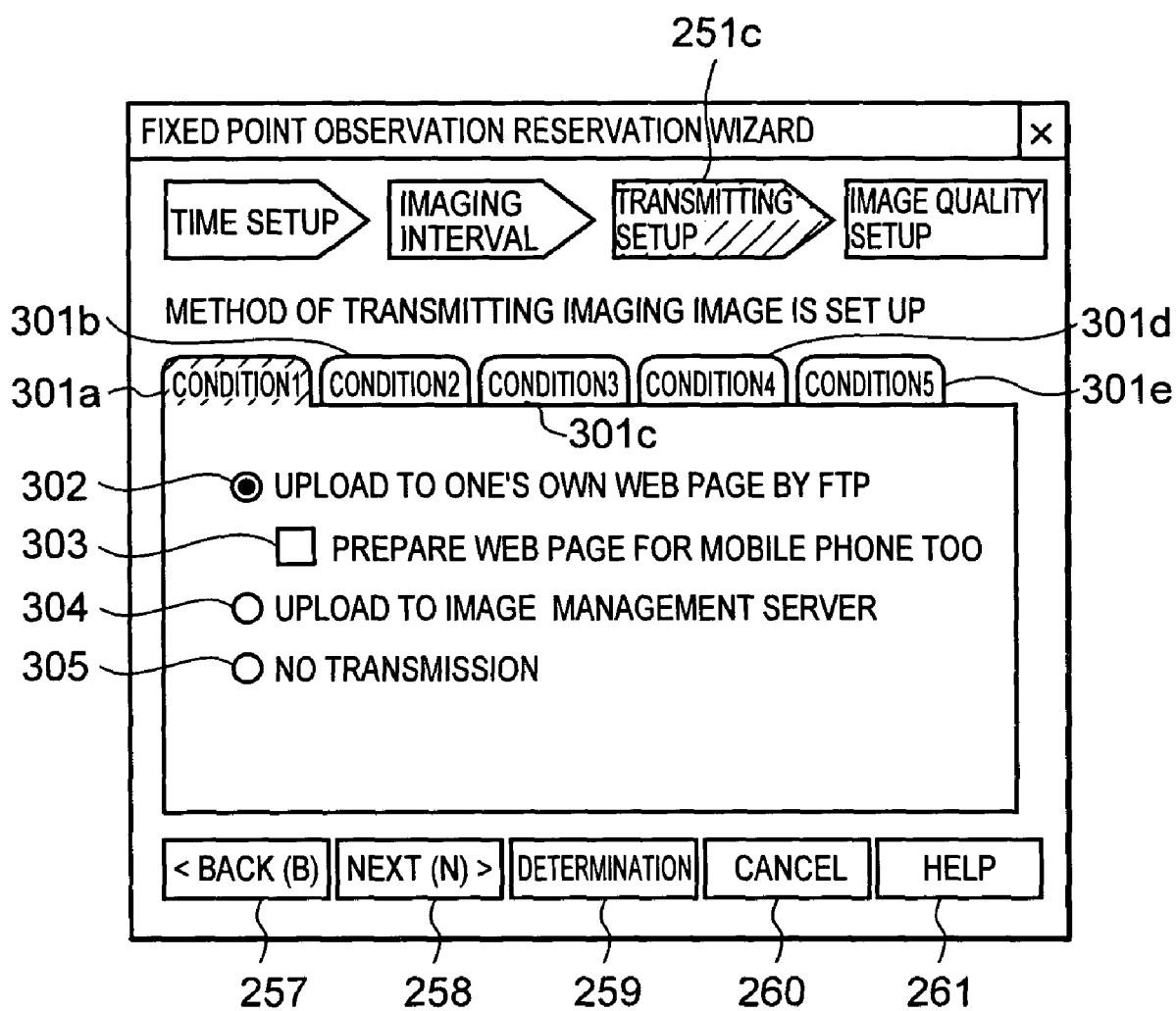
FIG. 23 shows an example of image display according to a preferred embodiment of the present invention.

In step S109, the response program 48b displays an upload (transmission) method setup screen as shown in FIG. 23.

In FIG. 23, a color of the transmission setup state display section 251c is changed and a line "method of transmitting captured image is set up" is displayed thereunder. Tabs 301a to 301e corresponding to the conditions 1 to 5 are displayed, and the conditions may be switched by selecting with the pointer. The check buttons 302, 304, 305 and a check box 303 are provided for respective conditions.

The check button 302 is displayed "upload to one's own web page by FTP" on the right hand side, and it is marked when the user chooses uploading a captured fixed point observation image to his or her own web page by FTP.

The check box 303 is marked, when uploading to one's web page by FTP is chosen (selected) and creation of a web page for a mobile phone is desired.

A line "upload to image management server" is displayed on the right hand side of the check button 304, which is marked when the user wishes to upload the captured fixed point observation image to the image management server 17.

A line "no transmission" is displayed on the right hand side of the check button 305, which is marked when the user does not transmit the captured fixed point observation image but wishes to store it only in the predetermined area of the storage section 48 of the PC 11.

It should be understood that, as to setups in the check buttons 302, 304, 305 and the check box 303, they may be separately set up about all the conditions 1 to 5 by switching the tabs 301a to 301e. In this case, since the check button 302 is marked, a still image for the captured fixed point observations is uploaded to his or her own web page by FTP.

When the setup of FIG. 23 is completed and the "next" button 258 is activated, the process goes to step S110.

Figure 24:
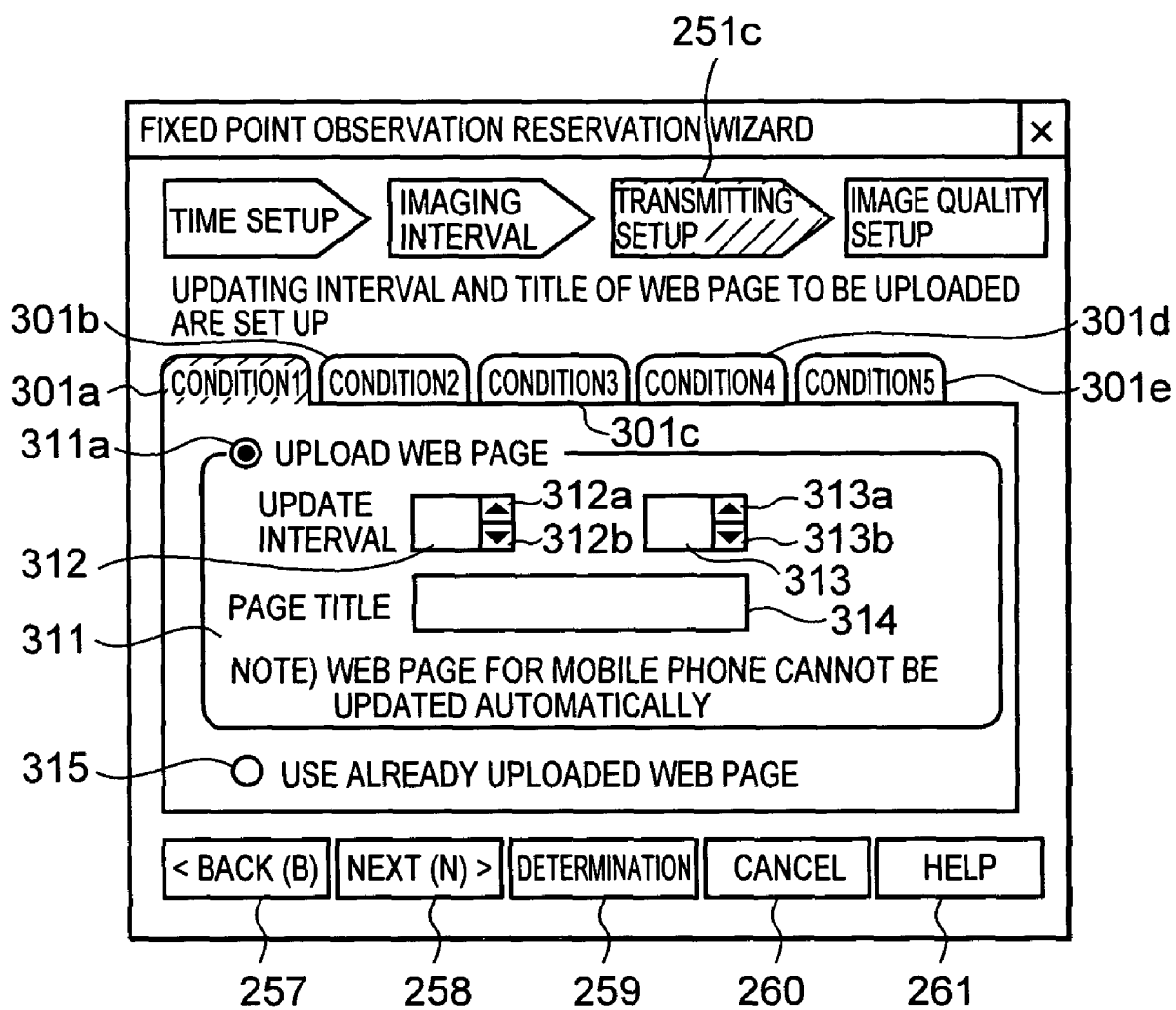
FIG. 24 shows an example of image display according to a preferred embodiment of the present invention.

In step S110, the response program 48b displays a dialog box for setting up a timing of upload as shown in FIG. 24.

In FIG. 24, the color of the transmission setup state display section 251c is changed and a line "updating interval and title of web page to be uploaded are set up" is displayed thereunder. The tabs 301a to 301e corresponding to the conditions 1 to 5 are displayed, and the conditions may be switched by selecting with the pointer. In addition, for every condition, a display box 311 indicating "upload web page", its check button 311a, and a check button 315 for choosing "use already uploaded web page" are displayed.

The check box 311a is marked when choosing the state of "uploading a web page", in other words, it is marked each time a still fixed point observation image is uploaded and it is desired to be uploaded as an individual web page. A minute input box 312 and a second input box 313 for an updating interval indicating the interval to upload the web page are provided in the display box 311, so that each value may be set up by operating move up buttons 312a and 313a or move down buttons 312b and 313b. Under the box, a page title input box 314 for inputting a page title is provided to set up a name to be attached to the web page when uploaded.

The check button 315 is marked when choosing "use already uploaded web page" in other words when wishing the already uploaded web page to be updated with a newly uploaded still fixed point observation image image.

When the setup of FIG. 24 is completed and the "next" button 258 is activated, the process goes to step S111.

Figure 25:
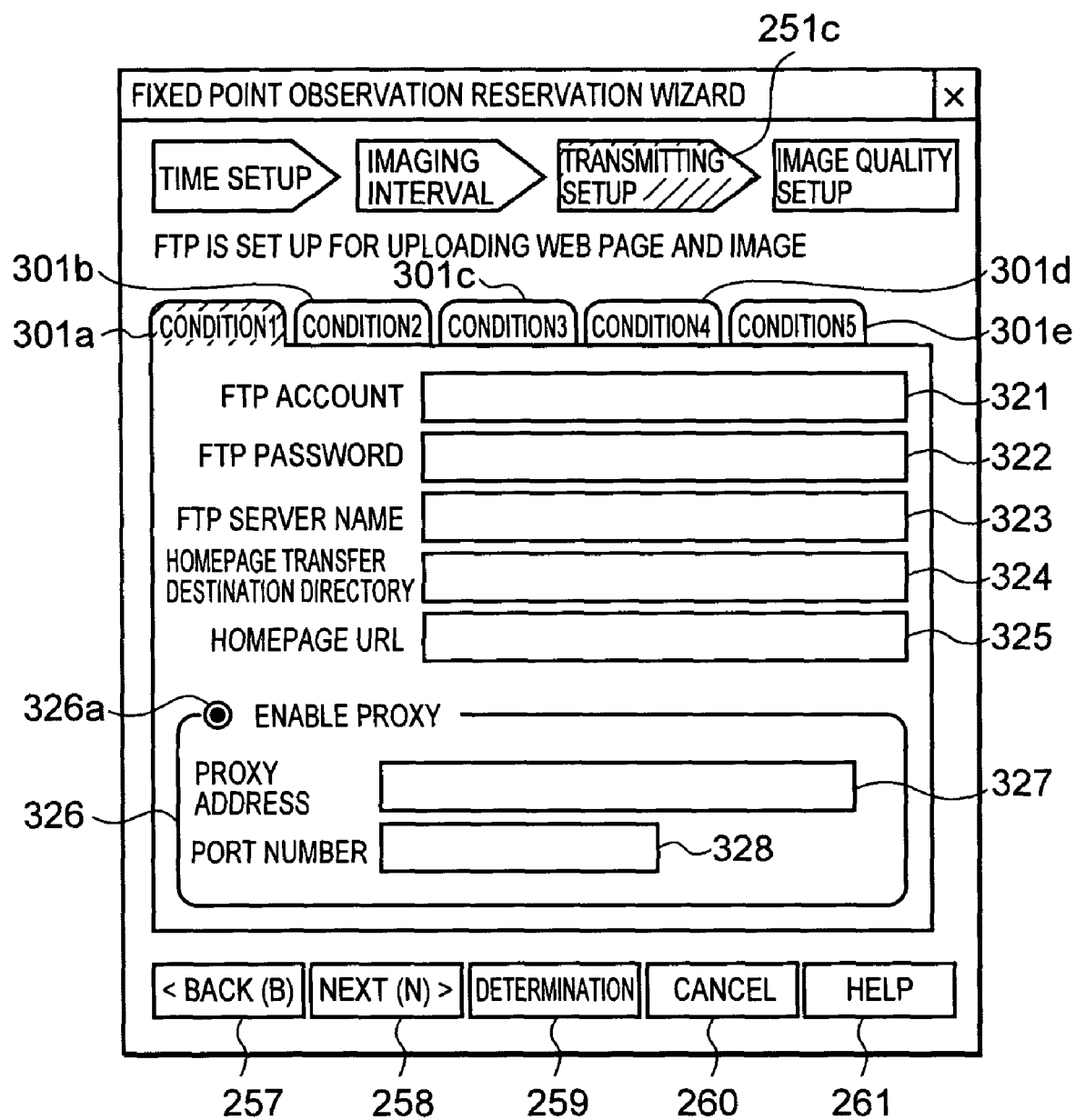
FIG. 25 shows an example of image display according to a preferred embodiment of the present invention.

In step S111, the response program 48b displays a dialog box for setting up FTP as shown in FIG. 25.

In FIG. 25, the color of the transmission setup state display section 251c is changed and a line "FTP is set up for uploading web page and image" thereunder. Tabs 301a to 301e corresponding to the conditions 1 to 5 are displayed, so that the conditions may be switched by selecting with the pointer. Further, for every condition, an FTP account input box 321 for inputting an FTP account, an FTP password input box 322 for inputting a password of FTP, an FTP server name input box 323 for inputting an FTP server name, and a transfer destination directory input box 324 for inputting a transfer destination directory of a homepage, and a homepage URL input box 325 for inputting an URL of a homepage are provided. A proxy setting box 326 indicating "enable proxy" is also displayed. In addition, a check button 326a activated when enabling proxy, a proxy address input box 327 for inputting a proxy address, and a port number input box 328 for inputting a port number are provided in the proxy setting box 326. The FTP account input boxes 321 through the port number input box 328 may be set up with respect to all conditions by switching the respective tabs 301a to 301e.

When the setup of FIG. 25 is completed and the "next" button 258 is activated, the process goes to step S112.

Figure 26:
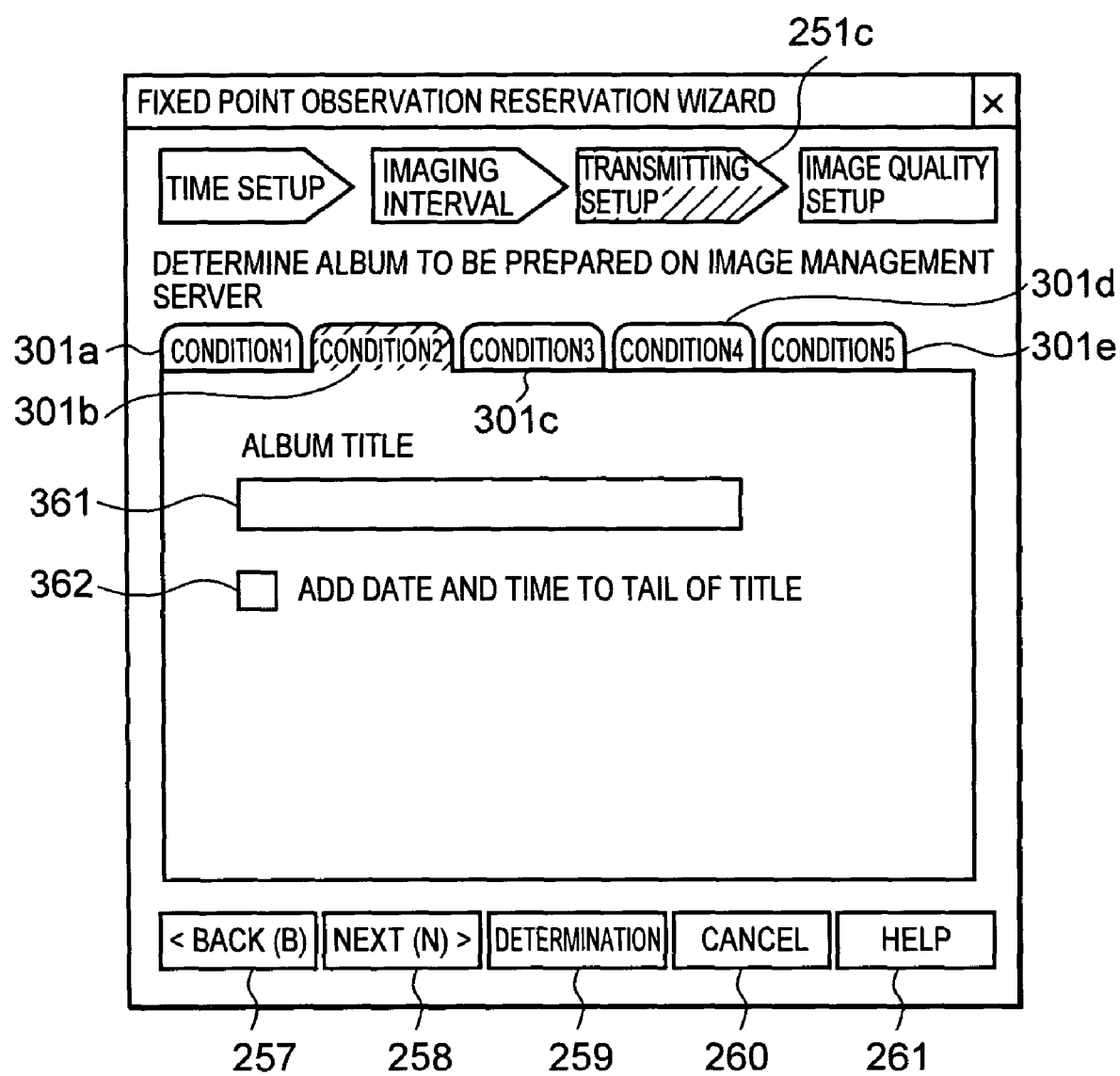
FIG. 26 shows an example of image display according to a preferred embodiment of the present invention.

In step S112, the response program 48b displays a dialog box for setting up an album to be prepared on an image management server as shown in FIG. 26.

In FIG. 26, the color of the transmission setup state display section 251c is changed and a line "determine album to be prepared on image management server" is displayed thereunder. The tabs 301a to 301e corresponding to the conditions 1 to 5 are displayed. The conditions may be switched by selecting with the pointer. In addition, for every condition, an album title input box 361 for inputting an album title of the image to be uploaded is displayed. Under the box, a line "add date and time to tail of title" is displayed and a check box is provided on the left hand side of the line. In the image management server 17, since an upload still image is managed for every album, the title of the album is inputted and set up into the album title input box 361. The album title input box 361 may be set up with respect to all conditions by switching the respective tabs 301a to 301e. Therefore, albums corresponding to the number of conditions may be set in the image management server 17.

Figure 27:
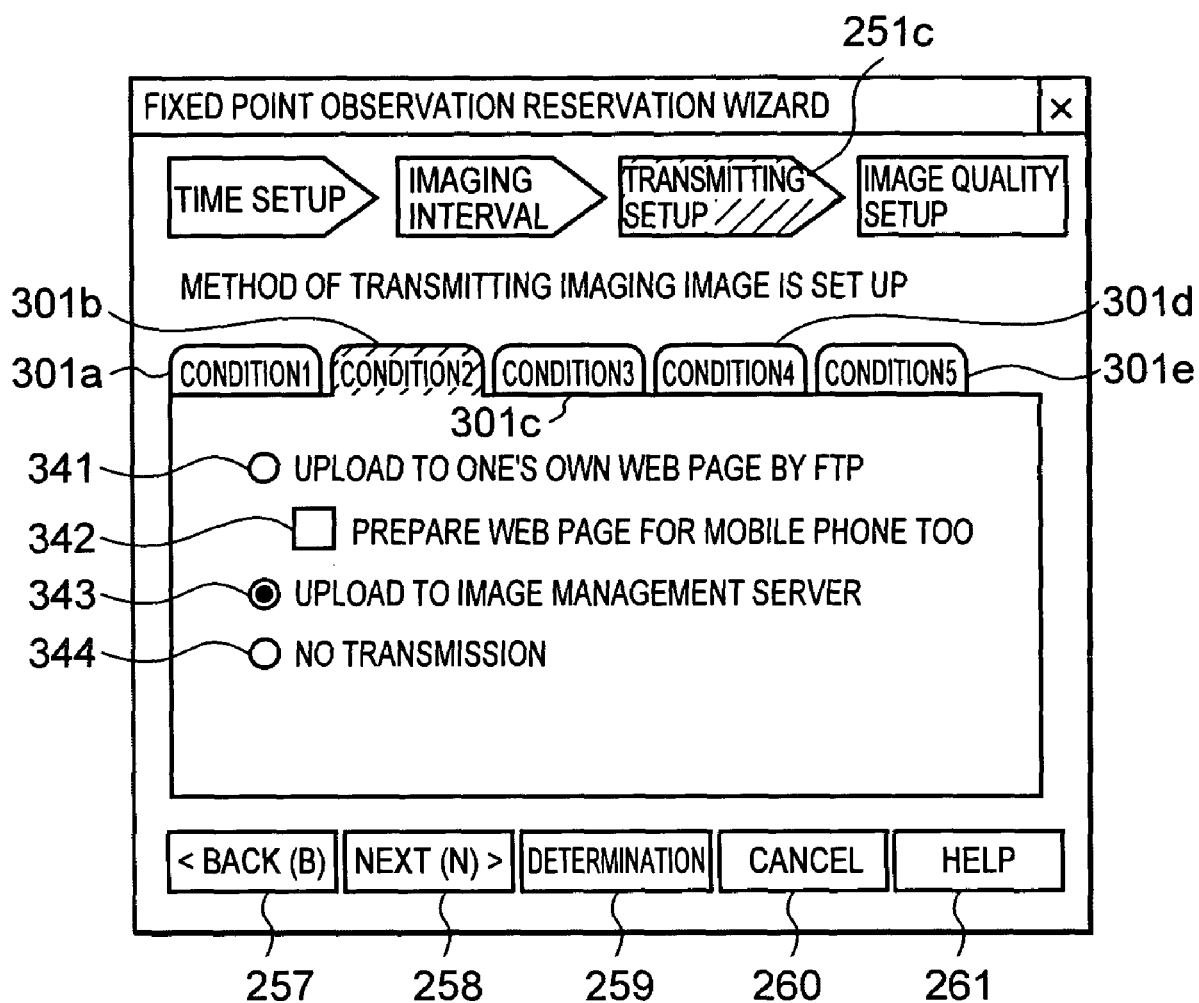
FIG. 27 shows an example of image display according to a preferred embodiment of the present invention.

It should be noted that, the input box of the album title as shown in FIG. 26 is displayed in the case of the condition where a check button 343 is marked and "upload to image management server" is chosen in the process of step S109, as shown in FIG. 27.

When the setup of FIG. 26 is completed and the "next" button 258 is activated, the process goes to step S113.

Figure 28:
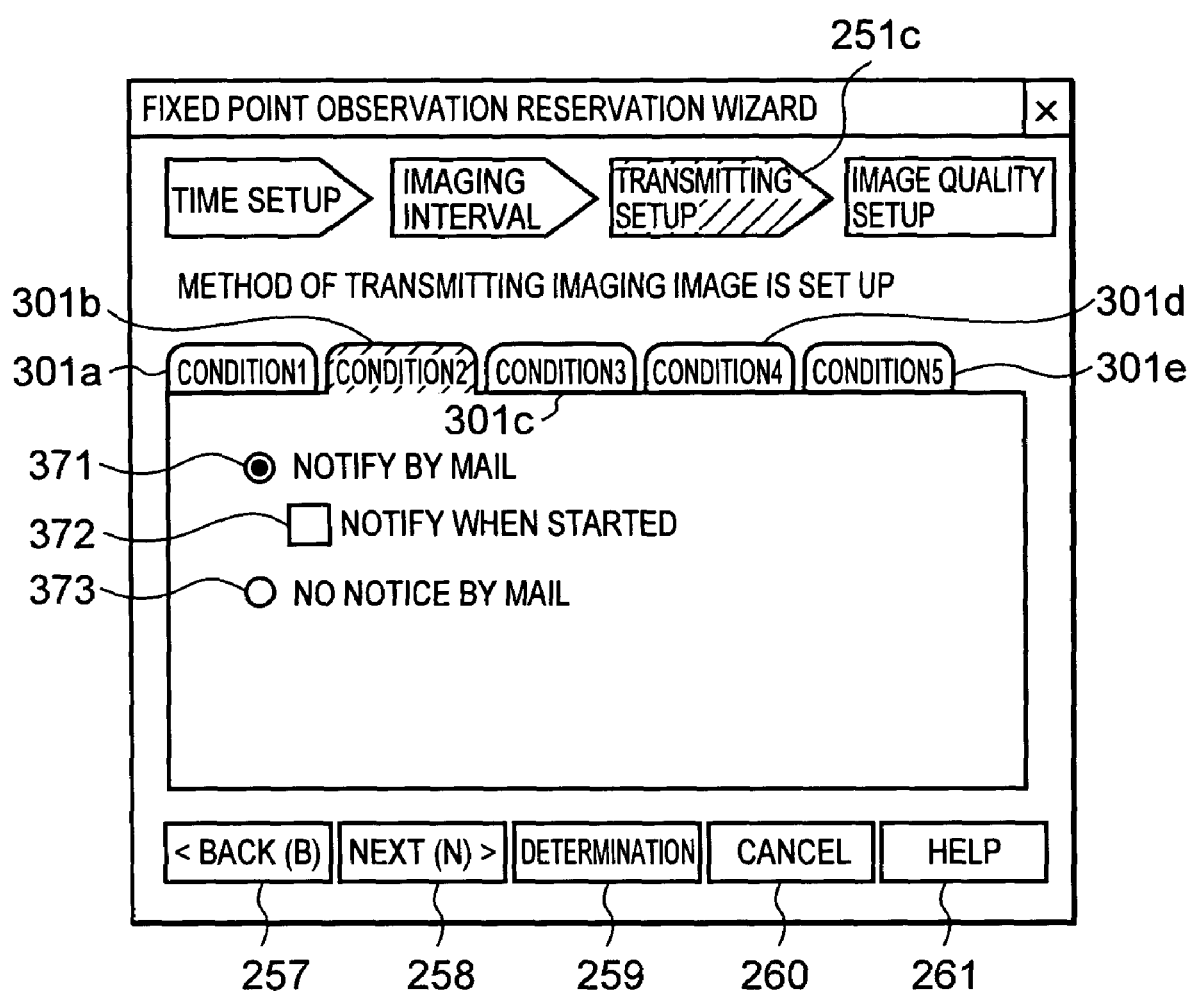
FIG. 28 shows an example of image display according to a preferred embodiment of the present invention.

In step S113, the response program 48b displays a dialog box for setting up notice mail as shown in FIG. 28. In FIG. 28, a line "select whether or not to notify start of fixed point observation by mail" is displayed, and also check buttons 371, 373 and a check box 372 are displayed. The check button 371 is provided on the left hand side of a line indicating "notify by mail", and is activated when the user wants to set it up so as to notify by electronic mail that the fixed point observation image is uploaded each time it is uploaded. Under the line there is another line "notify when started", provided on the left hand side of which is a check box 372 that is operated in the case of notifying by electronic mail that the fixed point observation has been started at the time when the check button 371 is set to ON. Moreover, the check button 373 is activated by the user when he or she wishes to set it up so as not to notify by means of electronic mail that the fixed point observation image has been uploaded. Therefore, in the case of FIG. 28, since the tab 302a is chosen, it is set up so as to be notified by electronic mail when the fixed point observation image uploaded according to the condition 2 ("image captured on movement" (see FIG. 22); "upload to image management server" (FIG. 27)) is uploaded. The tabs 301a to 301e may be changed over so as to set them up for respective conditions 1 to 5. However, the notice mail may be set up only in the case where the image management server 17 is uploaded.

When the setup of FIG. 28 is completed, and the "next" button 258 is activated, the process goes to step S114.

Figure 29:
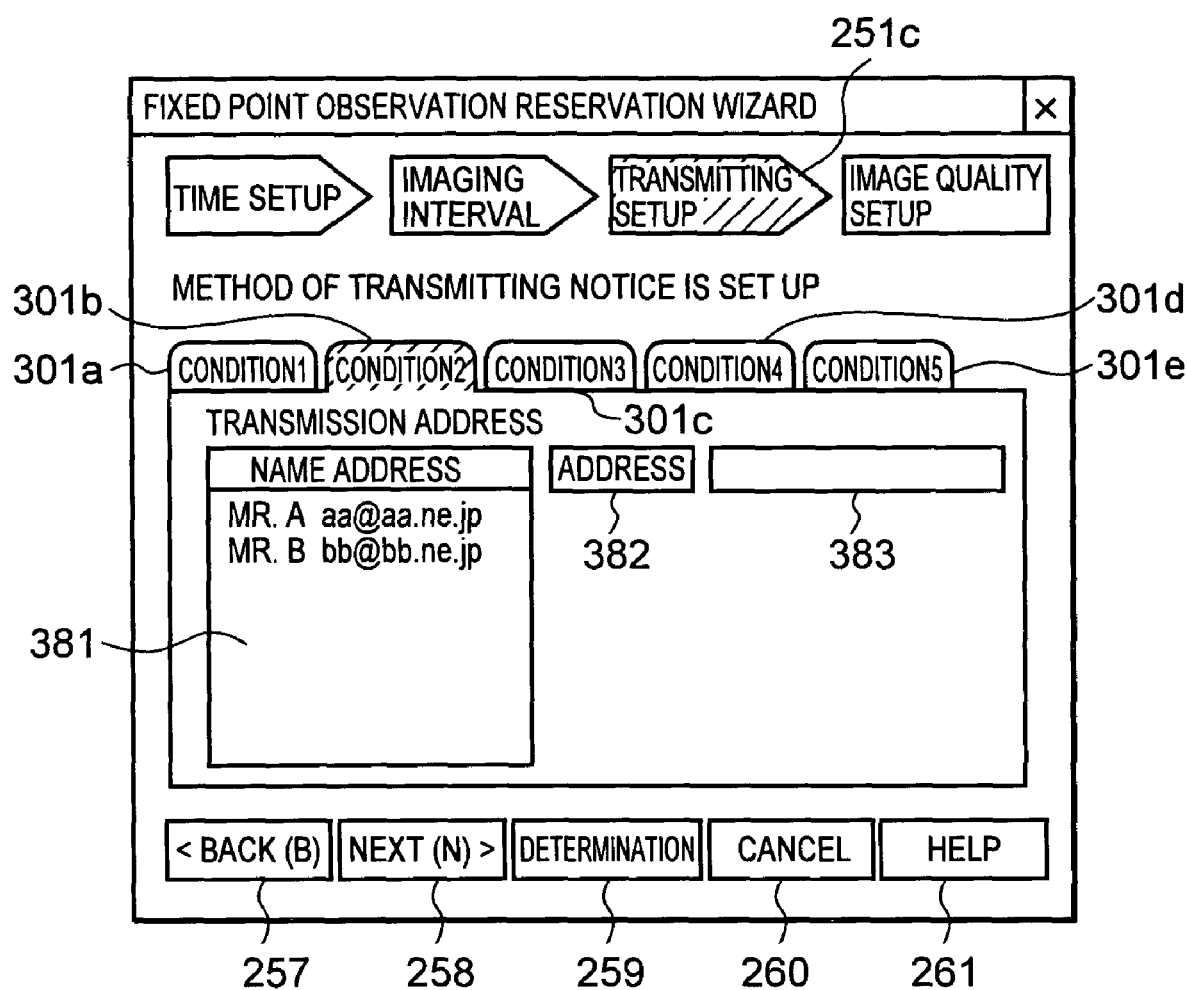
FIG. 29 shows an example of image display according to a preferred embodiment of the present invention.

In step S114, the response program 48b displays a dialog box for setting up an address as shown in FIG. 29. In FIG. 29, a line "method of transmitting notice is set up" is displayed and an address of a transmission destination may be set for each of the tabs 301*a* to 301*e*. A transmission destination's address is inputted into an address input box 383 and an address button 382 is activated, to thereby be added to an address list 381. In FIG. 29, "Mr. A aa@aa.ne.jp" and "Mr. B bb@bb.ne.jp" are displayed as transmission addresses, which indicates that the addresses to be used for communicating with Mr. A and Mr. B are registered.

However, in the process of step S113, when the check button 371 of the dialog box as shown in FIG. 28 is not turned ON, it may be in a state where the transmission addresses as shown in FIG. 29 cannot be set up. In other words, it may be in a state where an address cannot be inputted into the address input box 383.

When the setup of FIG. 29 is completed and the "next" button 258 is activated, the process goes to step S113.

Figure 30:
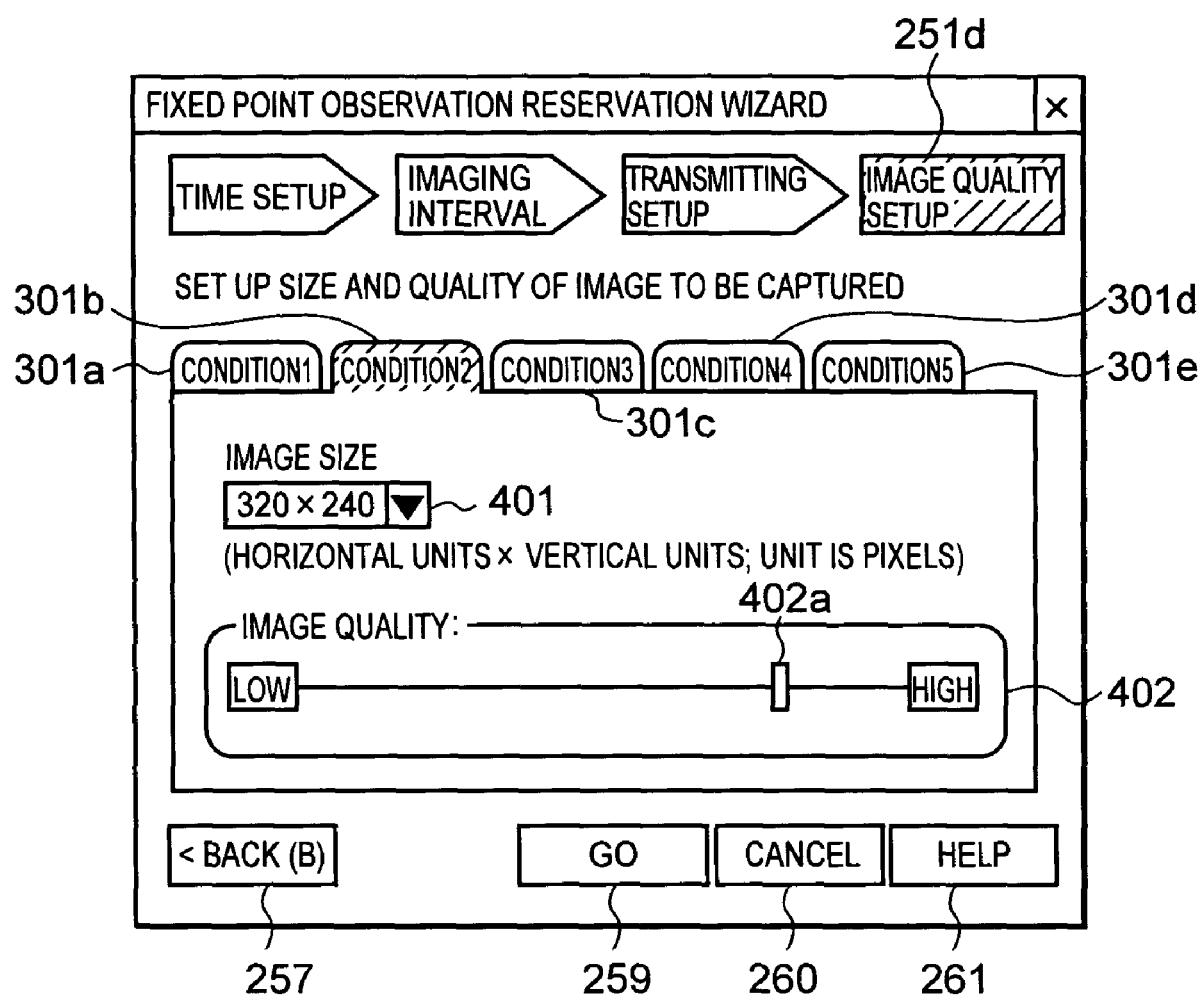
FIG. 30 shows an example of image display according to a preferred embodiment of the present invention.

In step S115, as shown in FIG. 30, the color of the image quality setup state display section 251*d* has been changed by means of the response program 48*b*, which indicates that a currently set state is an image quality setup, further, a line "set up size and quality of image to be captured" is displayed, and an image size selection button 401 and an image quality setting box 402 are displayed thereunder. The image size selection button 401 is a button to be activated when the user chooses an image size. When operated, a drop down list of image sizes, which can be chosen, is displayed, so that a desired image size may be chosen from the list. In FIG. 30, 320×240 (in pixels) is selected.

As to the image quality setting box 402, an image quality is set up by moving a knob 402*a* in the left/right direction. Thus, the image quality is rendered in a lower image quality when the knob 402*a* is moved leftward, whereas when the knob 402*a* is moved rightward, it is rendered in high definition quality.

When the setup of FIG. 30 is completed and the "next" button 258 is activated, the process goes to step S116.

In step S116, the response program 48*b* stores setup information in the setup data 48*d* and transmits the setup information to the image management server 17 which is set up as the transmission destination.

In addition, in the above description, the processes in steps S107 to S115 have been described for the case where the dialog box for each setup is set up in order, and the process is always advanced by means of the "next" button 258, however, the order may be changed or a process may be skipped by operating the "back" button 257, the "next" button 258, the "go" button 259, or the cancel button 260.

On the other hand, when it is determined that the reservation button 231 has not been activated in step S106, the response program 48*b* determines whether or not the setup button has been activated in step S117. For example, when it is determined that the setup button 221*e* has been activated, the process goes to step S118.

In step S118, the response program 48*b* displays the setup screen in the fixed point observation mode. It should be noted that the information which can be set up by means of the setup screen in the fixed point observation mode is similar to the setup data which can be set up according to the processes in steps S108 to S115.

In step S119, the response program 48*b* determines whether or not the setup in the fixed point observation mode has ended, and the process is repeated until it is determined that the setup has ended. When it is determined that the process has been completed, or when it is determined that the setup button has not been activated in step S117, the process in the fixed point observation mode has ended.

Now, the description returns to the flow chart of FIG. 6.

In step S6, when it is determined that the fixed point observation mode has not been selected, or the fixed point observation mode button 203 has not been activated, the response program 48*b* determines in step S8 whether or not the save button 212 has been activated. In step S8, when it is determined that the save button 212 has been activated, the response program 48*b* determines in step S9 whether not the still image has been chosen. For example, when the thumbnail image to which neither the moving image mark nor the fixed point observation mark is attached is selected from thumbnail images currently displayed on the thumbnail image list 217, it is determined that the still image has been chosen, and the process goes to step S10.

In step S10, the response program 48*b* stores the information on the selected still image in the predetermined area of the storage section 48 as a file of the JPEG system. In other words, a still image is temporarily stored in the predetermined area of the storage section 48 when the still image is captured, however, through a saving process it is saved as a file of the JPEG system and not in the temporary state (a JPEG file stored in the JPEG format into the predetermined area of the storage section 48 specified in advance is copied to a predetermined area of another storage section 48 through a saving process by pressing the save button 212).

In step S9, when it is determined not to be a still image, the response program 48*b* determines in step S11 whether or not a moving image is chosen, or whether or not a thumbnail image including the moving image mark is chosen from the thumbnail images displayed on the thumbnail image list 217. For example, when it is determined that the thumbnail image to which the moving image mark is attached, the process goes to step S12.

In step S12, the response program 48*b* stores the moving image data temporarily stored in the predetermined area of the storage section 48 corresponding to the selected thumbnail image in the storage section 48 as a moving image file of the MPEG1 format. In other words, the moving image is temporarily stored in the predetermined area of the storage section 48 when it is captured, however, through a saving process it is saved as a file of the MPEG1 system and not in the temporary state (a MPEG1 file stored in the MPEG1 format into the predetermined area of the storage section 48 specified in advance is copied to a predetermined area of another storage section 48 through a saving process by pressing the save button 212).

In step S11, when it is determined that the moving image has not been chosen, in other words, the still image and the moving image are not chosen, so that it is considered that the fixed point observation image is chosen (the thumbnail image to which the fixed point observation mark is attached is chosen). In step S13, the response program 48*b* displays the dialog box for selecting a save method, as shown in FIG. 31.

Figure 31:
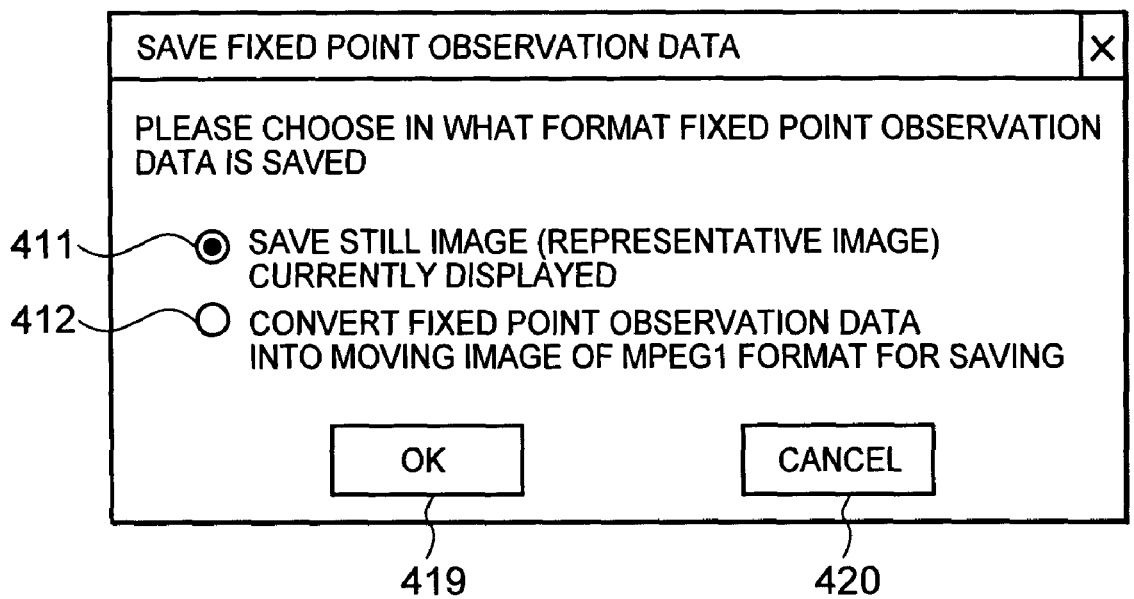
FIG. 31 shows an example of image display according to a preferred embodiment of the present invention.

As shown in FIG. 31, the dialog box for selecting the save method displays a line "please choose in what format fixed point observation data is saved" in its uppermost row. Thereunder a check button 411 is provided on the left hand side of a line displaying "save still image (representative image) currently displayed", and under the line a check box 412 is provided on the left hand side of another line displaying "convert fixed point observation data into moving image of MPEG1 format for saving it." Under the another line, an O.K. button 413 and a cancel button 414 are provided.

The check button 411 is a button to be activated when the process of saving the still image (representative image) currently displayed is desired. In this case, only the representative image out of the images recorded as the fixed point observation images (images chosen as the thumbnail images) is stored.

The check button 412 is activated when the process of converting the fixed point observation data into the moving image of MPEG1 system to be saved is desired. In this case, the check button 411 is rendered in the ON state. When one of the states is chosen, and the O.K. button 413 is activated, the process goes to step S14.

In step S14, the response program 48b determines whether the process of converting the fixed point observation data into the moving image of MPEG1 format to be saved is chosen, or whether or not the check button 412 was turned ON. In this case, the check button 411 is turned ON, and the process goes to step S15.

In step S15, the response program 48b saves only the representative image (the image chosen as the thumbnail image) by the JPEG system as data of the fixed point observation image.

In step S14, when the process of converting the fixed point observation data into the moving image of the MPEG1 format to be saved is chosen, or when the check button 412 is turned ON, the process goes to step S16.

Figure 32:
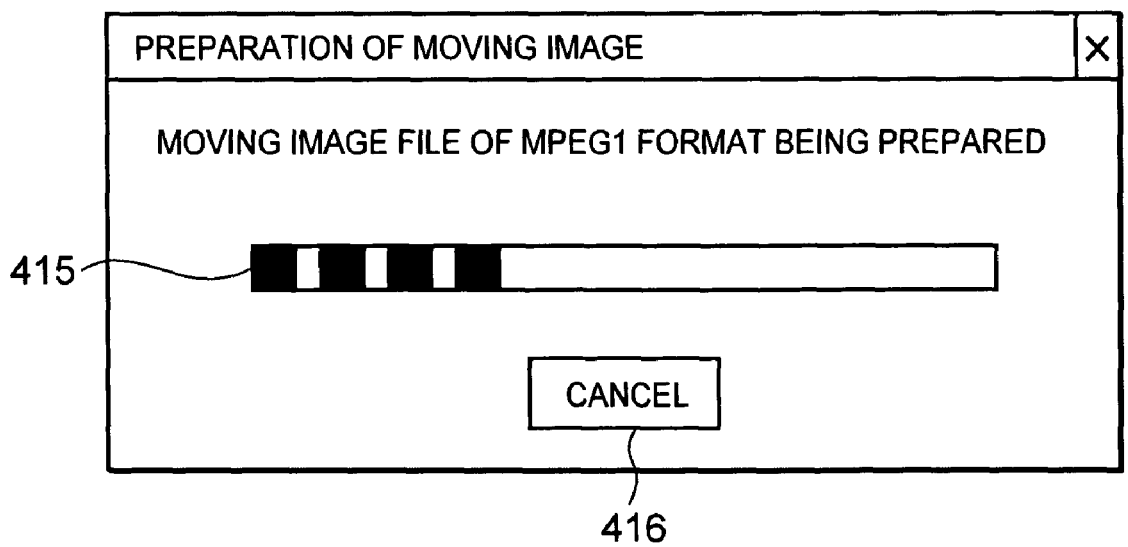
FIG. 32 shows an example of image display according to a preferred embodiment of the present invention.

In step S16, the response program 48b controls the encoder 48f so as to convert the fixed point observation data comprising a plurality of still images into the moving image of the MPEG1 system. At this time, as shown in FIG. 32, the response program 48b displays a dialog box indicating that it is during the process of converting the data into the moving image file. In FIG. 32, a bar 415 for indicating a degree of progress is displayed. The bar is extended rightward according to the degree of progress of conversion processing, and consequently when the bar is extended to a right end so as to indicate completion of the conversion processing, so that the display in the dialog box as shown in FIG. 32 is deleted. It should be noted that the bar is displayed with black squares in FIG. 32.

In step S17, the response program 48b saves the fixed point observation data corresponding to the selected thumbnail image in the predetermined area of the storage section 48 in the MPEG1 format.

Figure 33:
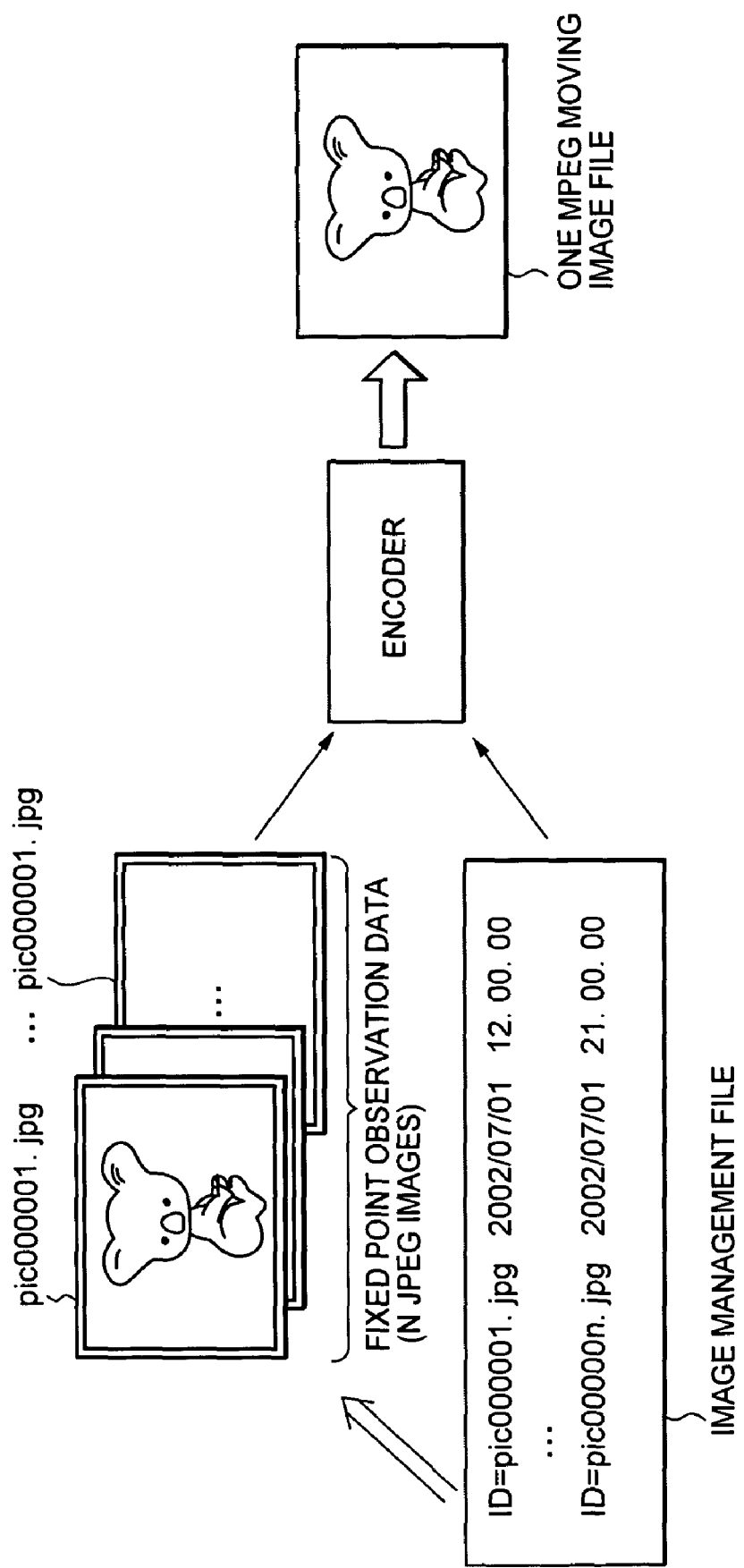
FIG. 33 shows a diagram describing the processing of conversion of a fixed point observation image to moving image according to a preferred embodiment of the present invention.

Now, the process of converting the fixed point observation image comprising a plurality of still images into a moving image will be described. As shown in FIG. 33, the fixed point observation image comprises a data management file for managing the plurality of still images by means of file names and the fixed point observation data having still images corresponding to the file name. Therefore, based on this data management file and the fixed point observation data, the encoder 48f converts the fixed point observation images into the moving image. In this case, the still images are in JPEG and the moving image is in the MPEG format, however, the still images may be any data format other than JPEG, and may be Tiff (Tagged Image File Format), or gif (Graphics Interchange Format) format. The moving image may be not only MPEG1 but also Flash.

The still images, the moving image, and the fixed point observation images managed by the response program 48b are managed as the data management file. The data management file comprises the image management file described in xml (Extensible Markup Language) format and a unified management file for unifying them.

Now, with reference to FIG. 34, a structure of the image management file will be described.

The first line is described as being "<?xml version="1.0"?>" and the version of xml is described. The second line is described as being "<nagara application="AA program"" and is described as being "AA program" as an application software name. Moreover, a section is constituted by the second line and nineteenth line description ("</nagara>).

The third line is described as being "version="1.0 (version of AA program)"", and "the version of AA program" is described. The fourth line is described as being "type="imaging mode (still, movie, ttk)"", the captured mode is described, and when the captured image is a still image, in the case of a moving image, and in the case of the fixed point observation, "still", "movie", and "ttk" are respectively described.

The fifth line is described as being "id=sequential number for image management files" which is, regardless of the captured mode, the sequential number assigned uniformly to every image management file, and the unified management file to be described later manages the image management file by means of the number. The sixth line is described as being "<caption/>" so as to indicate a title in the image management file. The seventh line is described as being "<objects>" so as to indicate that an object is inserted in a range up to the fifteenth line.

The eighth line is described as being "<object id="sequential numbers by imaging unit for still image and moving image files">". As for the still image and moving image it is always "0". As for the fixed point observation data, the still images captured by means of the sequential number are unified. In other words, the <object> section from the eighth line to the fourteenth line is added by the number of sheets of the fixed point observation data.

In the ninth line, there is described as "<file> path to captured still image and moving image file</file>", so that a full path to the captured still image and moving image files which are saved through the directory set up in advance is described. In the tenth line there is described as "<type> file type (image, movie)</type>." When information indicative of the type of the captured image is the still image, it is described as "image", and in the case of the moving image, it is described as "movie."

The eleventh line is described as being "<format> file format (jpeg, mpeg etc.)</format>" so that the data format of the file is described. For example, when it is a still image, it is described as JPEG (jpeg in the case of xml description), and as for the moving image, MPEG1 (mpeg in the case of xml description) is be described. The twelfth line is described as being "<date> captured date </date>" so that the captured date is described. The thirteenth line is described as being "<time> captured time </time>" so that the captured time is described.

In the sixteenth line there is described as being "<thumbnail>", and is described as being "</thumbnail>" in the eighteenth line, which indicates that the sixteenth line through the eighteenth line constitute a section. In the seventeenth line there is described as being "<file> path to image file displayed on thumbnail image list </file>." Upon completion of imaging, the representative image is displayed on the thumbnail image list 217 of a main window. This image is obtained by reducing the original image in size, and is created in another directory. As to this description, the full path to the file which is reduced in size from the original image and created in the another directory is described.

Now, with reference to FIG. 35, a structure of the unified management file will be described.

The first line is described as being "<?xml version="1.0"?>" similar to that shown in FIG. 34, and the version of xml is described. The second line is described as being "<ngrMangager>" and the section is constituted by the description of the second line and tenth line ("</ngrMangager>"). The third line is described as being "<nextid> (used for numbering sequential number for image management files)</nextid>", and a number employed as the sequential number for the image management files is described. The fourth line is described as being "<ngrlist path="path to save destination directory of image management file">" and the path indicating a position of the directory of the save destination of the image management file is described. A section of the fourth line through the ninth line is formed by means of the description "</ngrlist>" in the ninth line. In the fifth line there is described as being "<ngr href="image management file name"", so that the name of the image management file is described. The sixth line describes as "type="type of image file managed by image management file(image, movie)"", and as a type of the image file being managed by the image management file, in the case of the still image, "image" is described or in the case of the moving image, "movie" is described. In the seventh line, there is described as being "create="creation date & time of image management file"", so that the information on date & time that the image management file was created is described. In the eighth line, there is described as being "id="sequential number for image management files"/>", so that the sequential number for the image management files is described.

Each image management file as shown in FIG. 34 may be unified by the unified management file as shown in FIG. 35. Although the basic structure of the image management file may be managed by the still image (image) or the moving image (movie), since the fixed point observation image comprises a plurality still images, the description from the eighth line to the fourteenth line as shown in FIG. 34 is repeated by the number of the constituted still images as shown in FIG. 36.

In FIG. 36, it is shown that a description is repeated 101 times starting with a description from the fifth line to the eleventh line up to a description from the thirteenth line to the nineteenth line, where the number of times is based on<object id=0> (the fifth line) through <object id=100> (the thirteenth line). In other words, it is shown by the description from the fifth line to the eleventh line that an image corresponding to id=0 exists in "C:¥xxx¥AA program¥FPO¥FPO00000.jpg" according to a description of "<file> C:¥xxx¥AA program¥FPO¥FPO00000.jpg</file>" in the sixth line. Moreover, it is shown that the image is a still image according to a description of "<type> image </type>", and is a file of the JPEG format according to a description of "<format> jpeg </format>." In addition, it is shown that the still image is created at 10:53:05 on Aug. 6, 2002 according to descriptions of "<date>2002/08/06</date>", and "<time>10:53:05</time>."

Similarly, it is shown by the description from the thirteenth line to the nineteenth line that an image corresponding to id=100 exists in "C:¥xxx¥AA program¥FPO¥FPO00100.jpg" according to a description of "<file>C:¥xxx∓AA program∓FPO¥FPO00100.jpg</file>" in the fourteenth line. Moreover, it is shown that the image is a still image according to the description of "<type>image </type>", and is a file in JPEG format according to the description of "<format>jpeg </format>." In addition, it is shown that the still image is created at 10:53:45 on Aug. 6, 2002 according to descriptions of "<date>2002/08/06</date>", and "<time>10:53:45</time>."

Therefore, in the case of FIG. 36, it is considered that the 101 still images constitute the fixed point observation image.

Based on the data management file comprising the above-mentioned image management file and the above-mentioned unified management file, the encoder 48*f* converts the plurality of still images which constitute the fixed point observation image into a moving image so as to display them in chronological order at regular time intervals. In other words, as shown in FIG. 36, as to the image management file of the fixed point observation images, each of the images from <object id=0> (the fifth line) to <object id=100> (the thirteenth line) has recorded the information of date and time such as "<date>2002/08/06</date>" and "<time>10:53:05</time>" in the ninth and tenth lines, "<date>2002/08/06</date>" and "<time>12:53:45</time>" in the sixteenth and seventeenth lines. Based on this information, the still images recorded in the sixth line and the fourteenth line are arranged and displayed in chronological order so as to constitute the fixed point observation images, so that the encoder 48*f* converts an image displayed by displaying the still images one by one based on the image management data into a form of a moving image.

Now, the description returns to the flow chart of FIG. 6.

Figure 7:
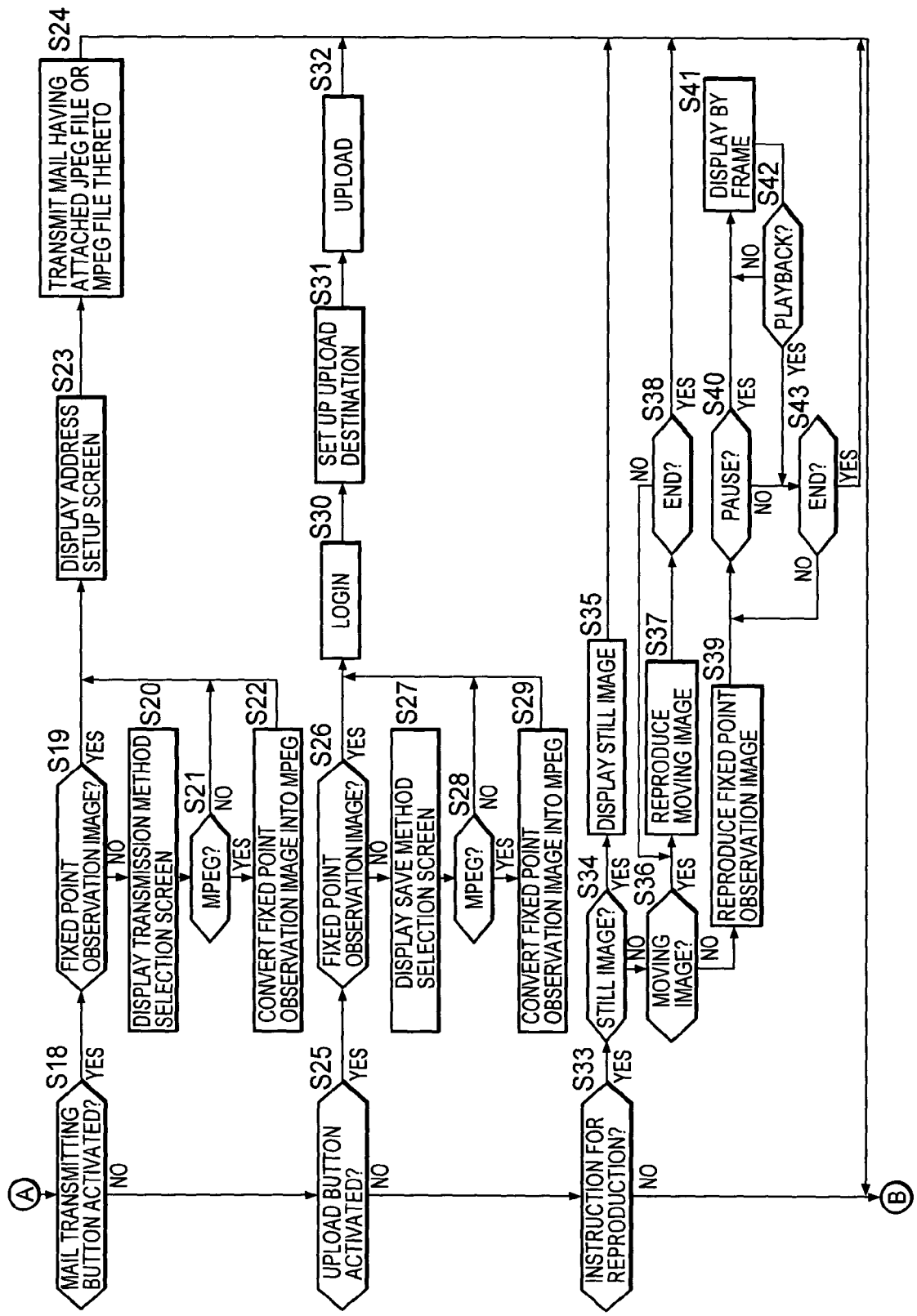
FIG. 7 shows a flowchart describing the image processing of the PC of FIG. 2.

In step S8, when it is determined that the save button 212 has not been activated, the response program 48*b* determines whether or not the mail transmitting button 213 has been activated in step S18 (see FIG. 7). For example, when it is determined that the mail transmitting button has been activated, the process goes to step S19.

In step S19, the response program 48*b* determines whether or not the fixed point observation image is chosen. For example, when the thumbnail image to which the fixed point observation mark is attached is selected out of the thumbnail images displayed on the thumbnail image list 217, it is determined that the fixed point observation image has been chosen, and the process goes to step S20.

Figure 37:
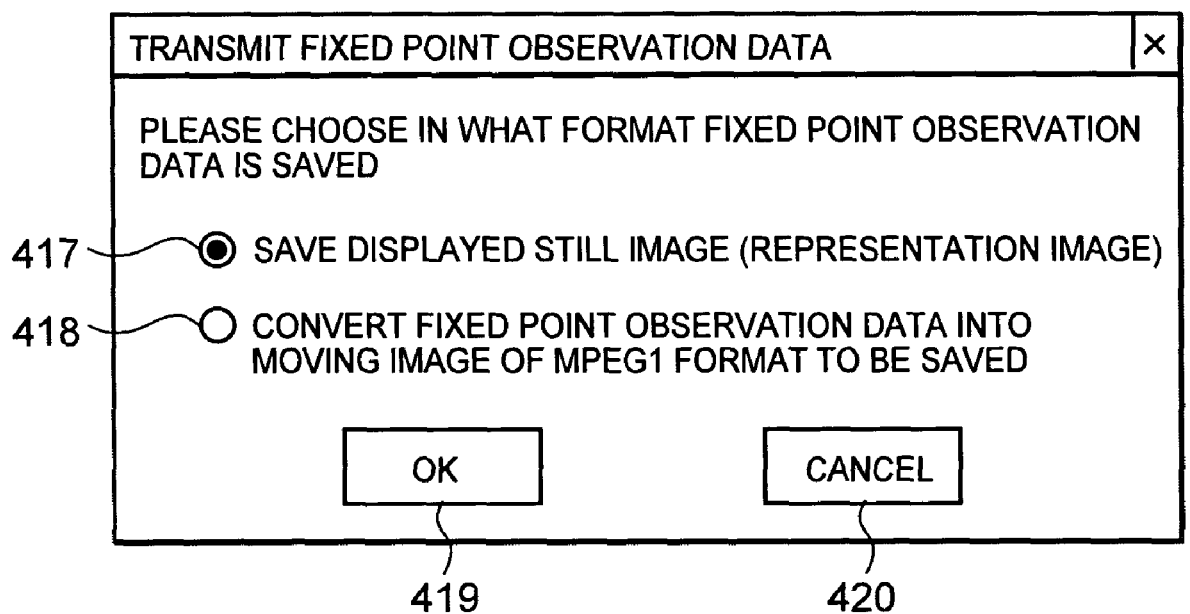
FIG. 37 shows an example of image display according to a preferred embodiment of the present invention.

In step S20, the response program 48*b* displays a dialog box for choosing a transmission method of the fixed point observation data, as shown in FIG. 37. In FIG. 37, check buttons 417, 418, an O.K. button 419, and a cancel button 420 are displayed. In addition, the check buttons 417, 418, the O.K. button 419, and the cancel button 420 have functions similar to those of the check buttons 411, 412, the O.K. button 413, and the cancel button 414 as shown in FIG. 31, and so will not be described in any further detail.

In step S21, the response program 48*b* determines whether or not to save the fixed point observation image in MPEG1 format, that is, whether or not the check button 418 is marked. When it is determined that the saving in MPEG1 format is desired, or that the check button 418 is turned ON, the process goes to step S22.

In step S22, the response program 48*b* converts the fixed point observation image into MPEG1 format. It should be noted that its conversion method is similar to that of processing in step S16 of the flow chart of FIG. 6, its description will not be repeated.

In step S19, when the fixed point observation image is not chosen, that is, it is determined that the still image or the moving image is chosen, the processes from step S20 to S22 are skipped. Further, in step S21, when it is not converted into MPEG1 format, the process in step S22 is skipped.

In step S23, the response program 48*b* displays a dialog box for setting up an address. It should be noted that the dialog box for setting up the address is a dialog box which comprises the address list 381, the address button 382, the address input box 383, etc. as shown in FIG. 29.

In step S24, the response program 48b controls and causes the mail program 48g to transmit the selected still image (JPEG) (including the still image of the representative fixed point observation image image), or the moving image (MPEG1) (including the fixed point observation image converted into the moving image) as an attached file to the address set up by means of the process in step S23.

In step S18, when it is determined that the mail transmitting button 213 has not been activated, the response program 48b determines in step S25 whether or not the upload button 214 has been activated. In step S25, when it is determined that the upload button 214 has been activated, the process goes to step S26.

Since processes from step S26 to step S29 are similar to those from step S19 to S22, the description of these steps will not be repeated herein.

In step S30, the response program 48b logs into an upload destination, and the image management server 17, or the FTP server 19. At this time, the user designates the upload destination and inputs a predetermined ID and a predetermined password.

In step S31, the response program 48b sets up an upload. In other words, for example, when performing an uploading to the image management server 17, an album may be set up, or when performing an upload to the FTP server 19, whether or not to use a portable web page may be set up.

In step S32, the response program 48b uploads the selected still image (JPEG) (including the still image of the representative fixed point observation image image), or the moving image (MPEG1) (including the fixed point observation image converted into the moving image) to the image management server 17 or the FTP server 19 together with the information set up by means of the process in step S27.

In step S25, when it is determined that the upload button 214 has not been activated, the response program 48b determines in step S33 whether or not reproduction instructions have been issued, that is, whether or not any thumbnail image displayed on the thumbnail image list 217 has been double-clicked. For example, when it is determined that the reproduction instructions have been issued, the process goes to step S34.

In step S34, the response program 48b determines whether or not instructions to reproduce the still image have been issued, that is, whether or not the thumbnail image which does not have the moving image mark or the fixed point observation mark has been double-clicked among the thumbnail images displayed on the thumbnail image list 217. In step S34, when it is determined that the instructions to reproduce the still image have been issued, for example, the process goes to step S35.

Figure 38:
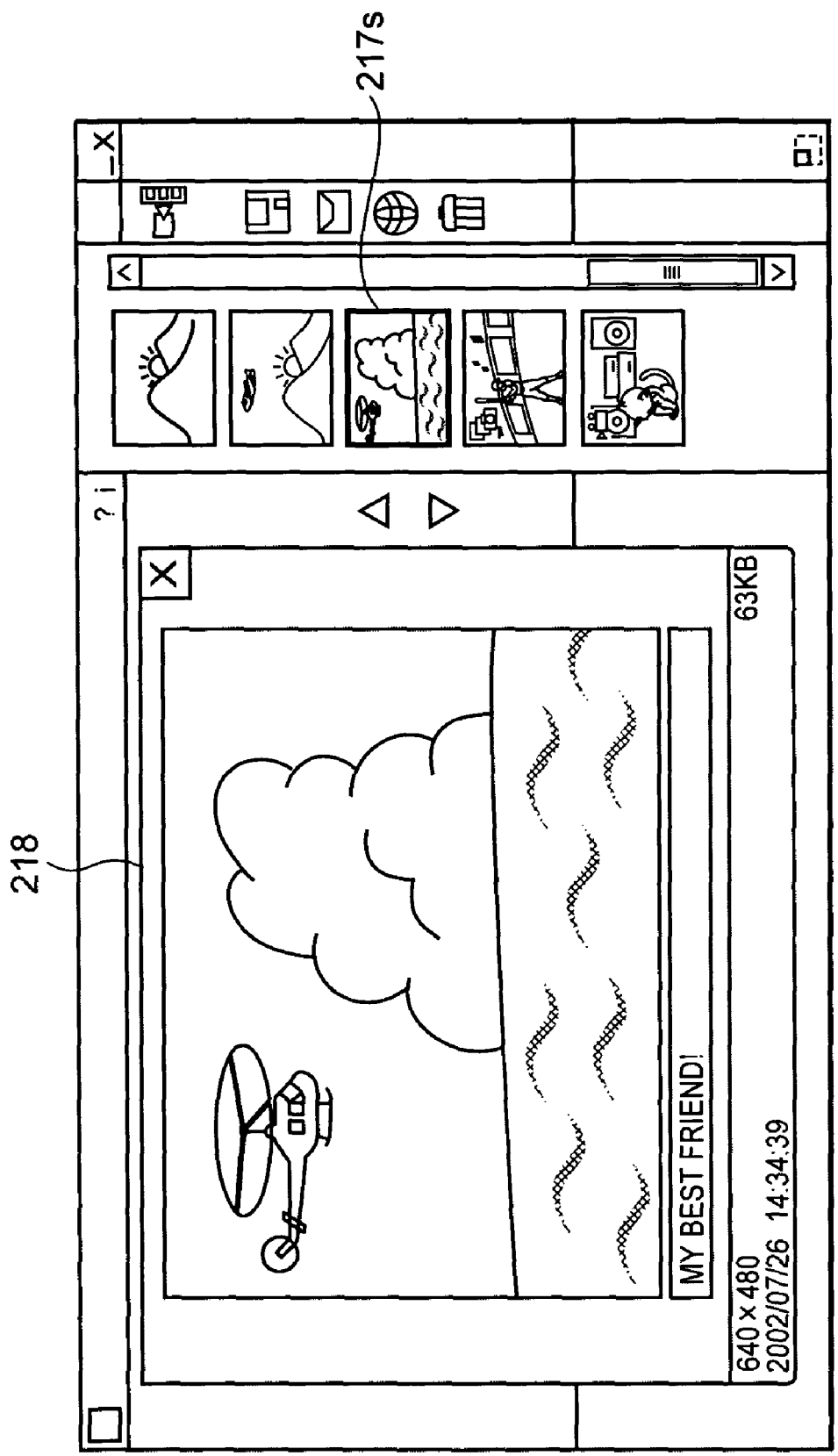
FIG. 38 shows an example of image display according to a preferred embodiment of the present invention.

In step S35, the response program 48b controls the display section 218 so as to display the still image as shown in FIG. 38, for example. In other words, in FIG. 38, a thumbnail images 217s is selected and double-clicked, so that the corresponding still image is displayed on the display section 218.

In step S34, when it is determined not to be a still image, the response program 48b determines in step S36 whether or not the instructions to reproduce the moving image have been issued, that is, whether or not the thumbnail image having attached thereto the moving image mark has been double-clicked among the thumbnail images displayed on the thumbnail image list 217. In step S36, when it is determined for example that the instructions to reproduce the moving image have been issued, the process goes to step S37.

Figure 39:
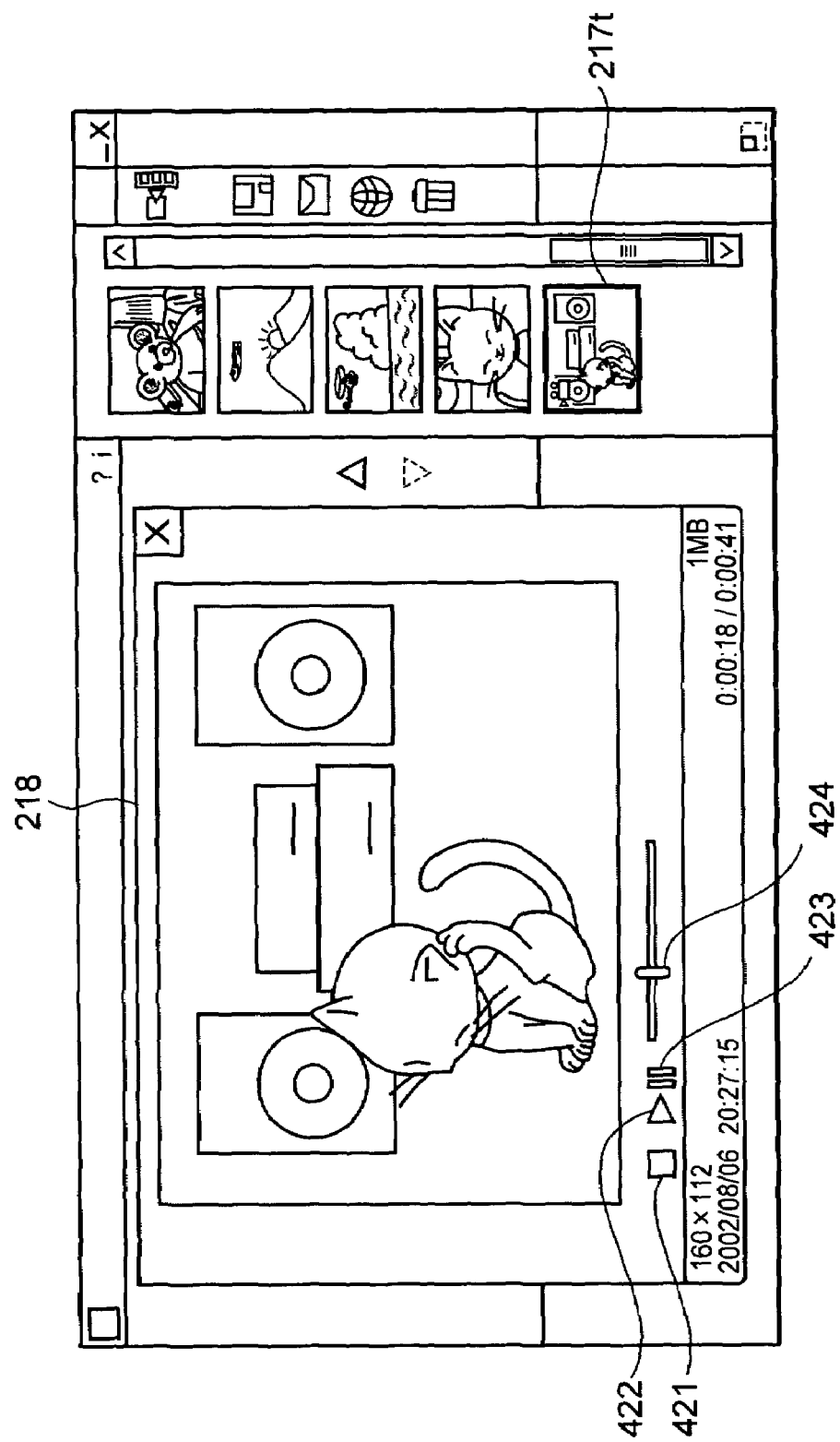
FIG. 39 shows an example of image display according to a preferred embodiment of the present invention.

In step S37, the response program 48b reproduces the moving image, as shown in FIG. 39, for example. In other words, in FIG. 39, a thumbnail image 217t to which the moving image mark is attached is selected and double-clicked, so that the corresponding moving image is displayed (reproduced) on the display section 218. At this time, a stop button 421, a reproduction button (422), a pause button 423 (the reproduction button 422 and the pause button 423 may function as one button, for example, perform the pause function during reproduction, and perform the function of the reproduction button during a stop or a pause), and a knob 444 are displayed. The selected moving image is displayed on the display section 218 and its reproduction is started as a moving image. At this time, if it is desired to stop the display, the stop button 421 is activated. Moreover, after the display of the moving image is stopped by the stop button 421, when instructing to reproduce it again, the reproduction button 422 is activated. In addition, the pause button 423 is activated so as to suspend the reproduction of the moving image. The knob 444 progresses from left to right according to the reproduction of the moving image to thereby indicate in which position in time the image being currently reproduced is within a file of moving images. Moreover, the moving image may be reproduced at desired timing by carrying knob 444 forward or backward (moving it in the right/left direction) with the pointer etc.

In step S38, the response program 48b determines whether or not instructions to terminate the reproduction have been issued, in other words, whether or not an operation of terminating the reproduction such as an operation by means of the stop button 421 etc. has been carried out or whether or not the reproduction of the moving image has finished, and the moving image continues to be reproduced by means of the process in step S37 until either of them terminates the reproduction.

In step S38, when it is determined that the reproduction of the moving image has been ended, the process returns to step S2.

Figure 40:
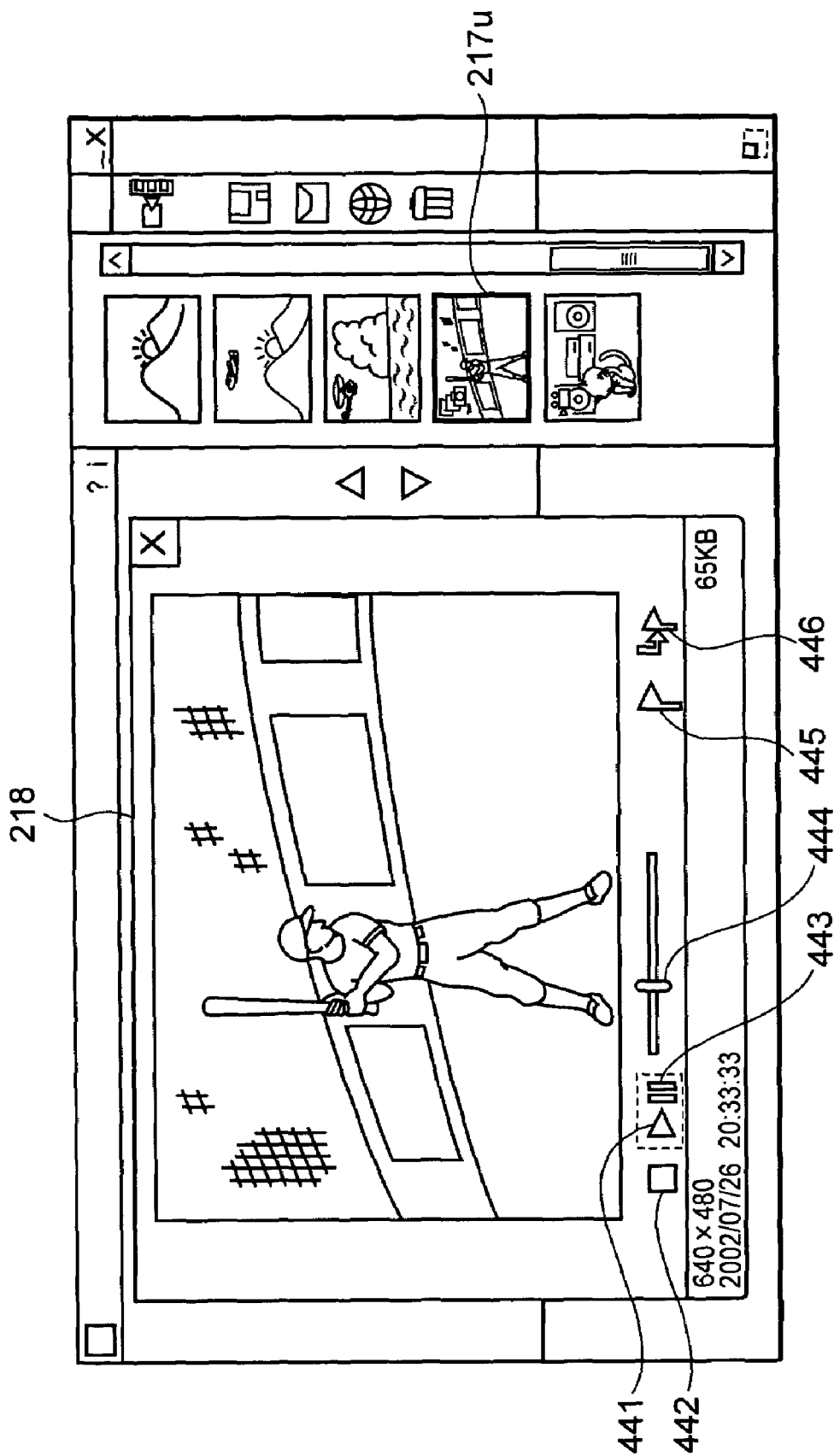
FIG. 40 shows an example of image display according to a preferred embodiment of the present invention.

In step S36, when it is determined that the instructions to reproduce the moving image has not been issued, it is determined that instructions to reproduce the fixed point observation image have been issued, the response program 48b reproduces, in step S39, the fixed point observation image as shown in FIG. 40, for example.

In other words, in FIG. 40, a thumbnail image 217u to which the fixed point observation mark is attached is selected and double-clicked, so that the corresponding fixed point observation image is displayed (reproduced) on the display section 218. Since the fixed point observation image comprises the plurality of still images as described above, the fixed point observation image displayed on the display section 218 are the still images each constituting one fixed point observation image which are displayed in chronological order at predetermined regular time intervals. It should be understood that the time intervals at which the still images constituting the fixed point observation image are displayed may be freely set up.

At this time, a stop button 441, a reproduction button (442), a pause button 443 (the reproduction button 442 and the pause button 443 may function as one button, for example, perform the pause function during reproduction, and perform the function of the reproduction button during a stop or a pause), a knob 444, a representative image selection button 445, and a representative image jump button 446 are displayed. The selected fixed point observation image is displayed on the display section 218, and its reproduction is started. At this time, if it is desired to stop the display, the stop button 441 is activated. Moreover, after the display of the fixed point observation image is stopped by the stop button 441, the reproduction button 442 is activated for instructing to reproduce the fixed point observation image again.

In addition, the pause button 443 is activated when causing the reproduction of the fixed point observation image to pause. The knob 444 moves from left to right according to the reproduction of the fixed point observation image to thereby indicate in which position in time the image being currently reproduced is within the fixed point observation image. Moreover, the knob 444 may be carried forward or backward (moved in the right/left direction) with the pointer etc., so that a desired fixed point observation image may be reproduced.

In addition, the representative image selection button 445 is activated when in the pause state and when setting the still image as the representative image in the file of fixed point observation images. Moreover, the representative image jump button 446 is activated when in the pause state, and when it is desired to jump from a currently displayed image to the representative image.

Figure 41:
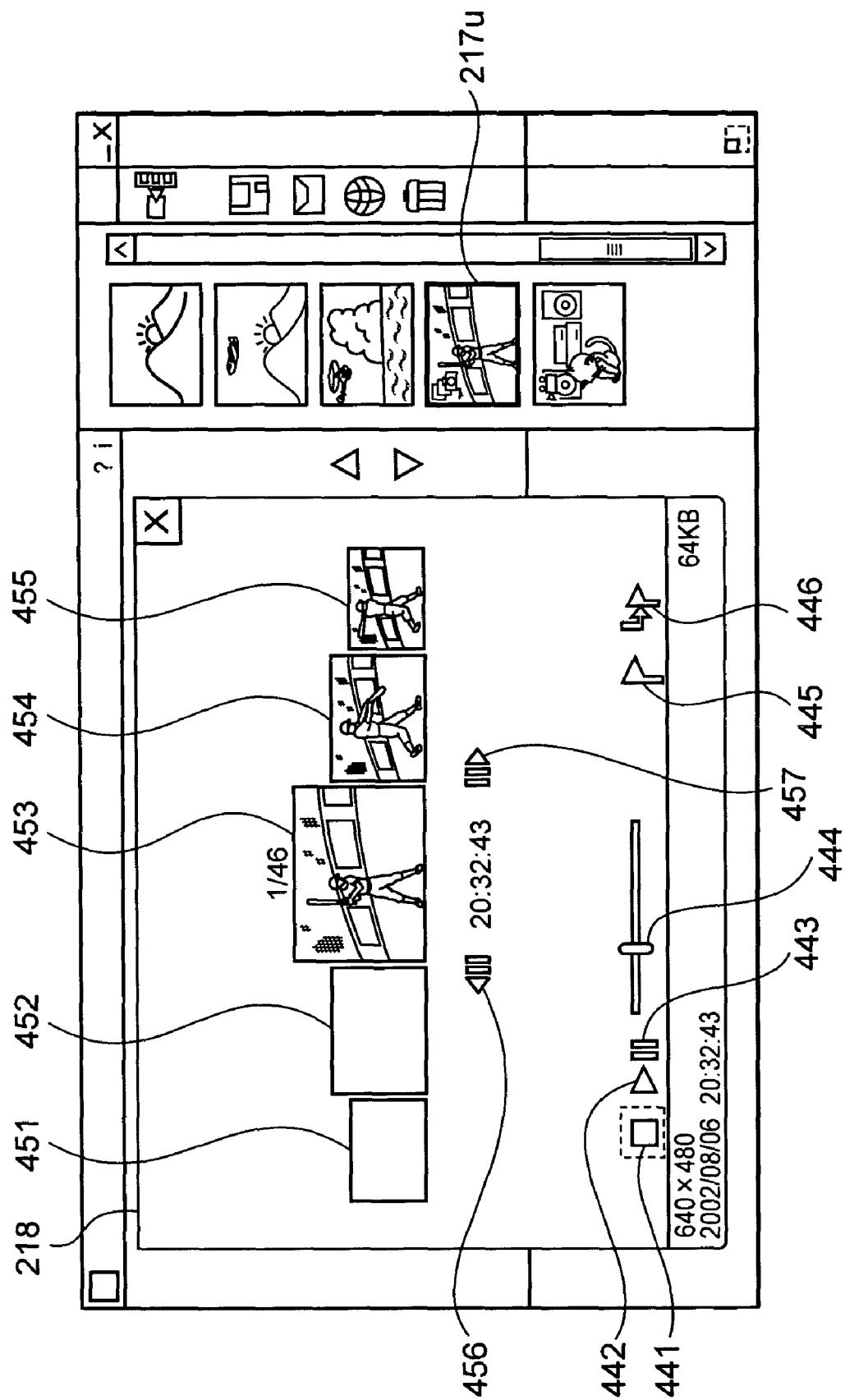
FIG. 41 shows an example of image display according to a preferred embodiment of the present invention.

In step S40, the response program 48b determines whether or not the pause has been operated. For example, when it is determined that the pause button 443 has been activated, the fixed point observation images are temporarily stopped to be displayed frame by frame as shown in FIG. 41 in step S41. What is meant by "display frame by frame" is to display the still image which has paused in the center, two previous still images prior to the centralized still image, and two later still images as shown in FIG. 41. In other words, in FIG. 41, a still image 453 is a still image at timing when the pause instructions are issued. In the figure, one that is on the left side of the still image 453 is a still image 452 prior thereto by one frame in time. A still image 451 still prior thereto by one frame is displayed. Moreover, a still image 454 on the right hand side of the still image 453 in the figure is a still image by one frame later, and a still image 455 is a still image by one frame later, still further. In addition, the still image 453 which is instructed to pause is centralized, the still images 452, 451 are gradually reduced in size leftward, and the still images 454, 455 are gradually reduced in size rightward, so that the current still image 453 may be set to a legible size, as shown in FIG. 41.

It should be understood that, in FIG. 41, the still image 453 is a still image to be a head of fixed point observation images, so that it is the same as the representative image displayed as the thumbnail image 217u to which the fixed point observation mark is attached. Further, as there are no two previous still images to display, solid color screens are displayed in the display areas 451 and 452, in the figure.

Moreover, an expression indicating a number of frames of the fixed point observation images is displayed above the still image 453. In this case, the expression is "1/46" which indicates that a total number of still images of the fixed point observation images is 46 and that the still image 453 is the head. Moreover, the time when the still image was captured is displayed under the still image 453. In this case, there is displayed "20:32:43", which shows that the still image 453 was taken at 20:32:43.

In addition, a frame backward button 456 is provided on the left side of the captured date and time, and a frame forward button 457 is also provided. The frame backward button 456 is a button to be activated when retracting the still image to pause by one still image. For example, in FIG. 41, when the frame backward button 456 is activated, the still image 453 shift to the position of the still image 454, so that the still image 452 is displayed the position where the still image 453 is. Other still images shift similarly. Further, the frame forward button 457 is a button to be activated when stepping a still image to pause by one still image. For example, when the frame forward button 457 as shown in FIG. 41 is activated, the still image 453 shifts to the position of the still image 452, so that the still image 454 is displayed the position where the still image 453 is, and other still images shift similarly.

Figure 42:
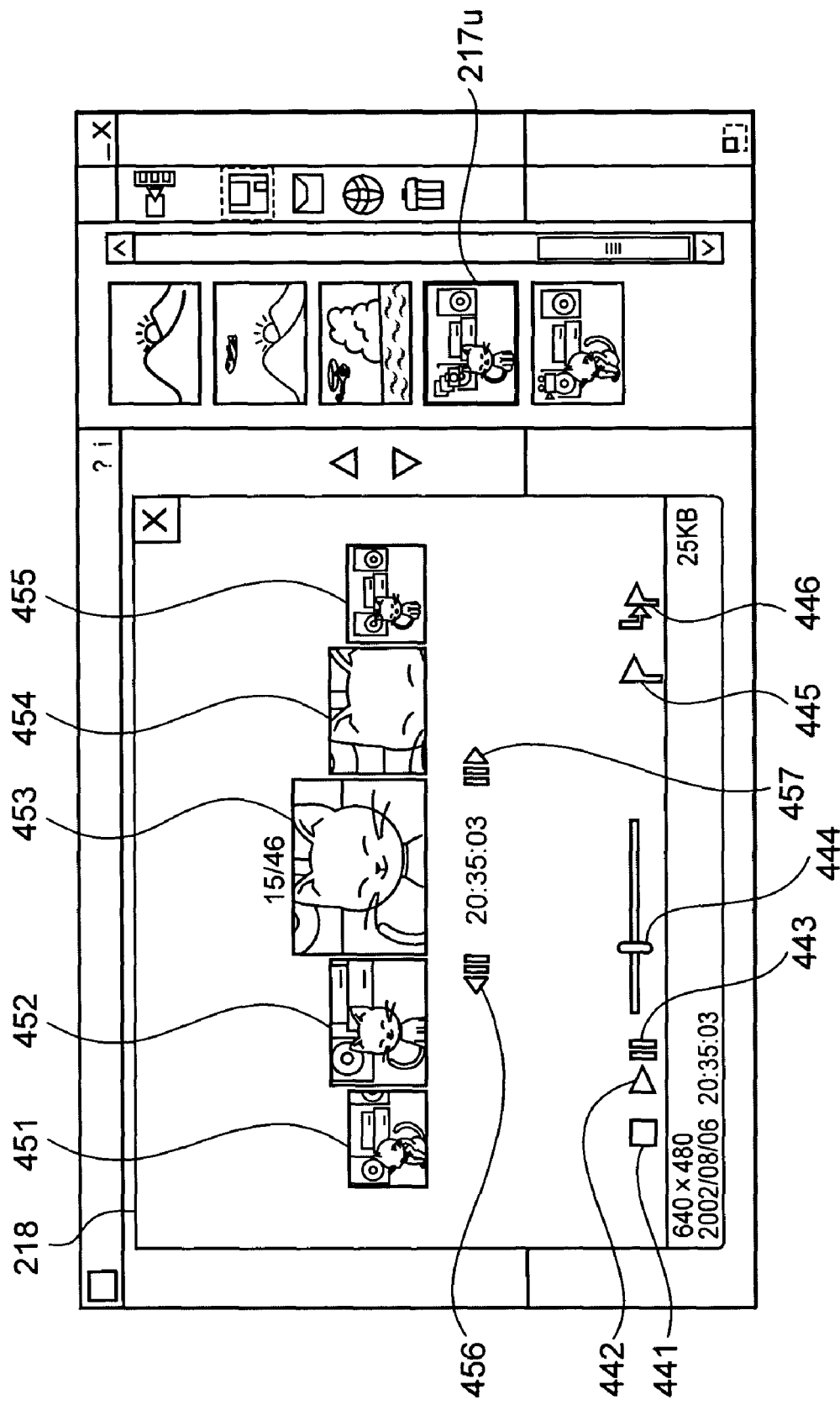
FIG. 42 shows an example of image display according to a preferred embodiment of the present invention.
Figure 43:
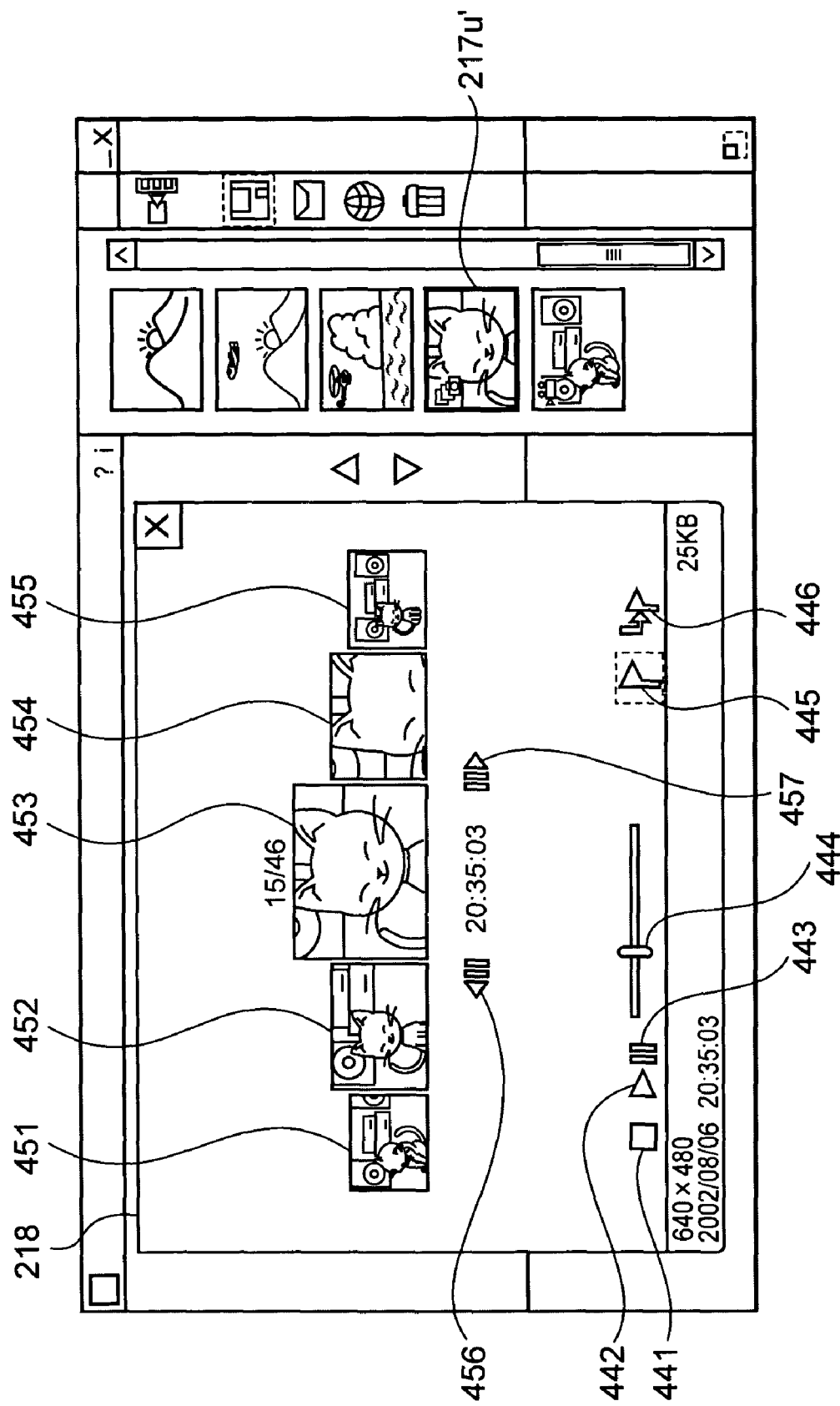
FIG. 43 shows an example of image display according to a preferred embodiment of the present invention.

In addition, for example, in a state as shown in FIG. 42, when pause instructions are issued and the representative image selection button 445 is selected as mentioned above, in place of the thumbnail image 217u, the image corresponding to the selected still image 453 is chosen as the representative image, as shown in FIG. 43, and consequently replaced with the thumbnail image 217u'.

In step S42, the response program 48b determines whether or not the reproduction instructions have been issued, that is whether or not the reproduction button 422 has been activated and repeats the display frame by frame until the reproduction button 422 is activated.

In step S42, when it is determined that the reproduction instructions have been issued, the response program 48b determines in step S43 whether or not termination instructions have been issued, or whether or not the fixed point observation image is finished. When it is determined not to be finished, the process returns to step S40. In other words, the reproduction of the fixed point observation image is continued until the termination instructions are issued (or until the reproduction of the fixed point observation image is completed). In step S43, when it is determined that the termination instructions have been issued, the process returns to step S2, and the processes thereafter are repeated.

According to the above processes, it is possible to unify by means of GUI the handling of not only the still image or the moving image but also the fixed point observation image which comprises the plurality of still images, as well as displaying methods during reproduction. In other words, with respect to the fixed point observation image handled by means of GUI, it is possible to handle it, similar to the still image and the moving image, by expressing the image as a thumbnail image displaying one of the so-called representative images among a plurality of still images. Moreover, it is possible to reproduce image by displaying and confirming the images frame by frame consecutively at the time of reproduction, to thereby allow it to be treated in a similar way to the still images and the moving images.

Moreover, since the fixed point observation image can be saved as a moving image or a still image, it is possible to transmit generated moving images and still images by electronic mail. Further, even a terminal device which is not equipped with software for reproducing the fixed point observation image may reproduce the fixed point observation image as a usual moving image or a usual still image.

Now, with reference to the flow chart of FIG. 44, an image management process by means of the image management server 17 will be described.

In step S131, the response program 108a of the image management server 17 determines whether or not the setup data has been received. For example, when setup data has been received from the PC 11 by means of the process in step S114 of FIG. 16, it is determined that the setup data having been received, so that the process goes to step S132.

In step S132, the response program 108a performs an authentication process, and stores the received setup information in the setup DB 108b in step S133. The setup data includes information on the address of the notice mail set up for each condition, so that types of events indicating a timing to transmit the notice mail, and the transmission address of corresponding notice mail are recorded on a setup DB, as shown in FIG. 45. In FIG. 45, the types of events include "given time elapsed" (the condition 1 in FIG. 22), "moved" (the condition 2 in FIG. 22), "brightness suddenly changed" (the condition 3 in FIG. 22), "red object came into sight" (the condition 4 in FIG. 22), and "object moved from right to left" (the condition 5 in FIG. 22), each of which is stored in a transmission destination. In the case of FIG. 45, when a fixed point observation image is captured and uploaded according to the event of "given time elapsed", notice mail is transmitted to User A and User B. Moreover, when a fixed point observation image is captured and uploaded according to the event of "moved", notice mail is transmitted to User B and User C. In addition, when a fixed point observation image is captured and uploaded according to the event of "brightness suddenly changed", notice mail is transmitted to User A and User C. Moreover, when a fixed point observation image is captured and uploaded according to the event of "red object came into sight", notice mail is transmitted to User D and User E. In addition, when a fixed point observation image is captured and uploaded according to the event of "object moved from right to left", notice mail is transmitted to User B, User C, and User D.

In step S134, the response program 108a determines whether or not a setup for immediately transmitting notice mail exists. In other words, as shown in FIG. 28, when a check box which sets up a state of "notify when started" has been marked, it may be the case where it is a timing when a fixed point observation is started, i.e., the setup data is transmitted and also the notice mail may be transmitted, so that it is determined whether or not the setup data is so set up. For example, when the check box 372 is marked and it is determined to transmit the notice mail immediately, the response program 108a controls and causes the mail program 108e to transmit the notice mail in step S135.

According to such processes, the notice mail may be transmitted at the same time the fixed point observation is started.

In step S131, when it is determined that the setup data has not been received, the response program 108a determines in step S136 whether or not an image has been uploaded from the PC 11. For example, when it is determined to have been uploaded, the process goes to step S137.

In step S137, the response program 108a performs an authentication process with respect to the PC 11 which is going to perform upload. In step S138, the response program 108a stores the image uploaded from the PC 11 in the image DB 108c.

In step S139, the response program 108a determines whether or not the uploaded image is a fixed point observation image. For example, when it is the fixed point observation image, the process goes to step S140.

In step S140, the response program 108a confirms an event of the uploaded image. That is, the response program 108a confirms the event of imaging which is attached to the uploaded image.

In step S141, with reference to the setup DB 108b as shown in FIG. 45, the response program 108a transmits the notice mail to the transmission address corresponding to the event of the confirmed imaging. In other words, in the case of FIG. 45, when the uploaded image, for example, is the still image which constitutes the fixed point observation image captured upon lapse of the given time, User A and User B are chosen as transmission destinations and the notice mail having described an URL through which the fixed point observation image is recorded is transmitted to User A and User B.

In step S139, when it is determined not to be a fixed point observation image, the processes in steps S140 and S141 are skipped.

In step S136, when it is determined that there is no upload, the response program 108a determines in step S142 whether or not the access to the album has been requested by the PC 13. If it is the case, the process goes to step S143.

In step S143, the response program 108a performs the authentication process with respect to the PC 13 which has requested the access to the album.

In step S144, the response program 108a confirms a User-Agent attached to the access request for the album. The User-Agent is a signal which identifies the type of a terminal device which has requested the access (for example, the signal may identify either the PC 13, the mobile phone 14, the PDA 15, the network camcorder 16, or etc.)

In step S145, based on the confirmed User-Agent, the image conversion program 108d is controlled and caused to convert the image data according to the type of terminal device which is asked for the access thereto, and transmits the converted image data to the PC 13 which is asked for the access to the album in step S144.

Now, with reference to a flow chart of FIG. 46, an image displaying process of the PC 13 will be described.

In step S151, the response program 78b determines whether or not the notice mail has been sent from the image management server 17. For example, when the notice mail has been received by means of the process in step S138 of the flow chart as shown in FIG. 44, it is determined that the notice mail has been received, so that the process goes to step S152.

In step S152, the response program 78b receives the transmitted notice mail, and stores the URL through which the image (album) recorded in the mail is uploaded.

In step S151, when it is determined that the notice mail has not been received, the response program 78b determines in step S153 whether or not the user has asked to display the image stored through the URL of the notice mail. When it is determined that the user has operated to display the image stored through the URL of the notice mail and asked for the uploaded image, the process goes to step S154.

In step S154, the response program 78b accesses the image management server 17, and performs the authentication process. In other words, the process corresponding to step S141 in the flow chart of FIG. 44 is carried out.

In step S155, the response program 78b requests to display the album as well as the User-Agent indicating the type of its own terminal device. In other words, this case relates to the process in the PC 13, so that the User-Agent may be information indicating that it is a PC.

Figure 44:
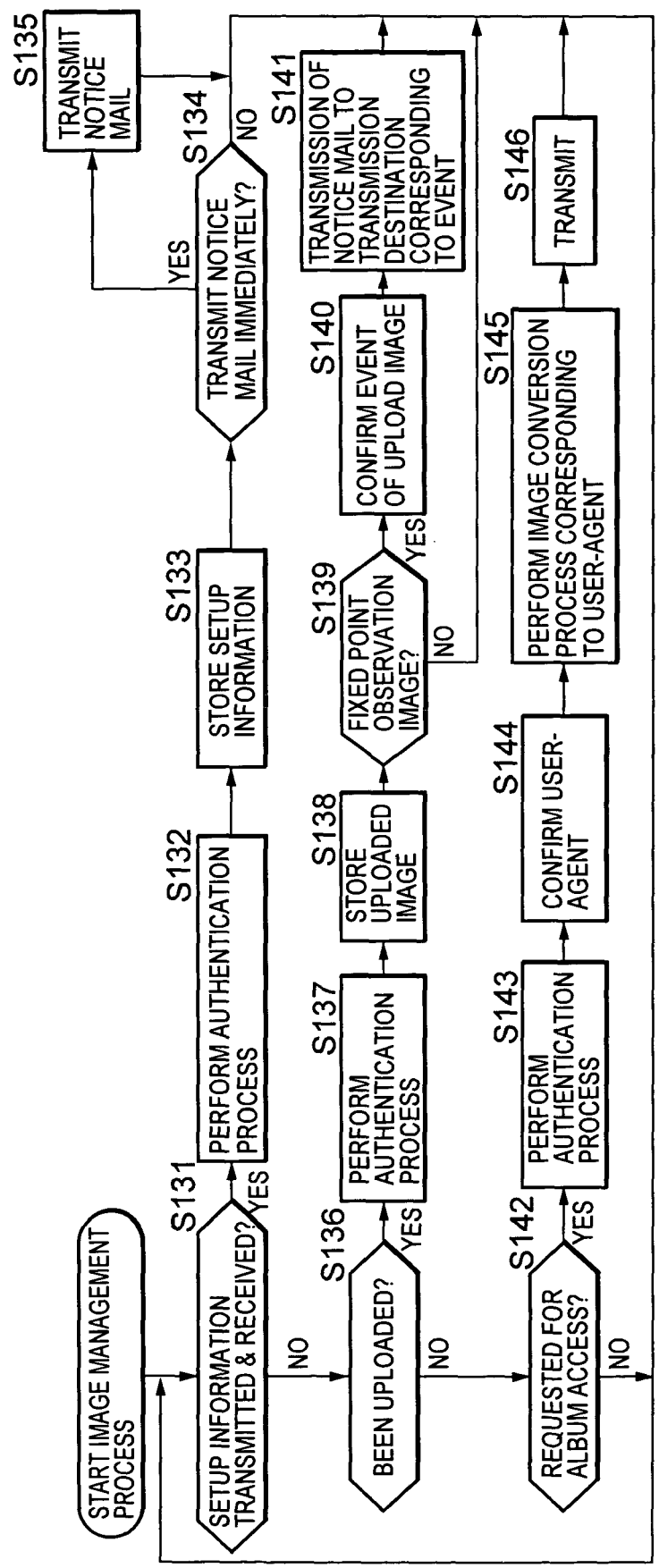
FIG. 44 shows a flowchart describing the processing of image management according to a preferred embodiment of the present invention.

At this time, in the process of step S143 in FIG. 44, the image management server 17 recognizes that the terminal device which requests an album from the information on User-Agent is a PC, the image conversion program 108d converts the album into that of an image size to be displayed by means of a PC (for example, one that can be displayed with 24 bits full color, 800×600 (image size in unit pixels) by means of the PC 13) so as to be transmitted in step S143.

Figure 47:
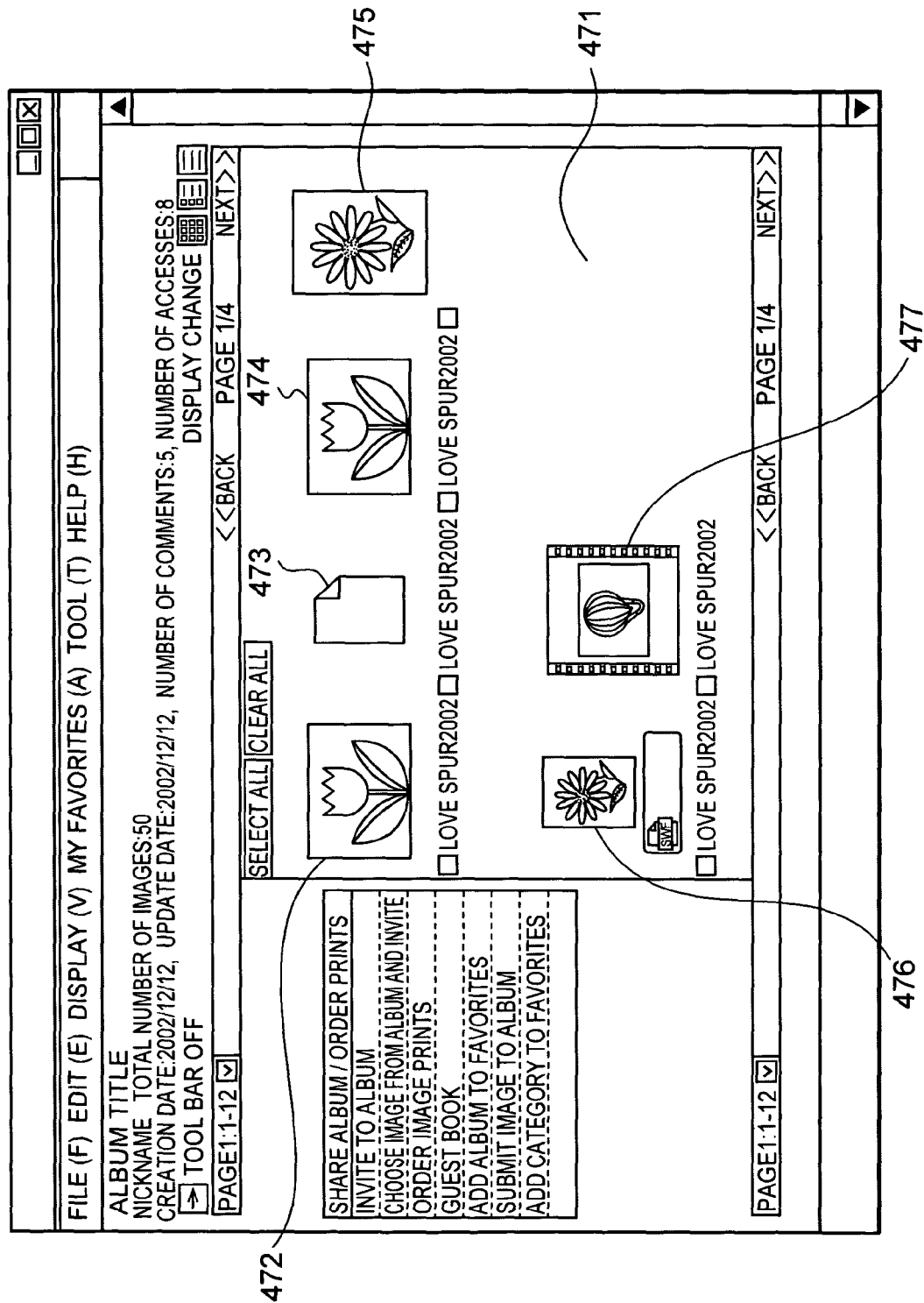
FIG. 47 shows an example of image display according to a preferred embodiment of the present invention.

In step S156, the response program 78b of the PC 13 receives the album converted into the image to be displayed with the PC 13, and controls the browser program 78a so as to display the album as shown in FIG. 47, for example. In FIG. 47, the images registered to the album are displayed as the thumbnail images 472 through 477 on a list display section 471. When any of them is selected, a still image, a moving image, or a fixed point observation image corresponding to the selected thumbnail image is displayed. In FIG. 47, when the thumbnail images 472, 474, 475 are selected, still images are displayed. Further, when the thumbnail image 476 is selected, the moving image in Flash as described under the thumbnail image is reproduced. In addition, as for the thumbnail image 477 having a film-like border, the image which is converted from the fixed point observation image into the moving image is displayed.

Figure 46:
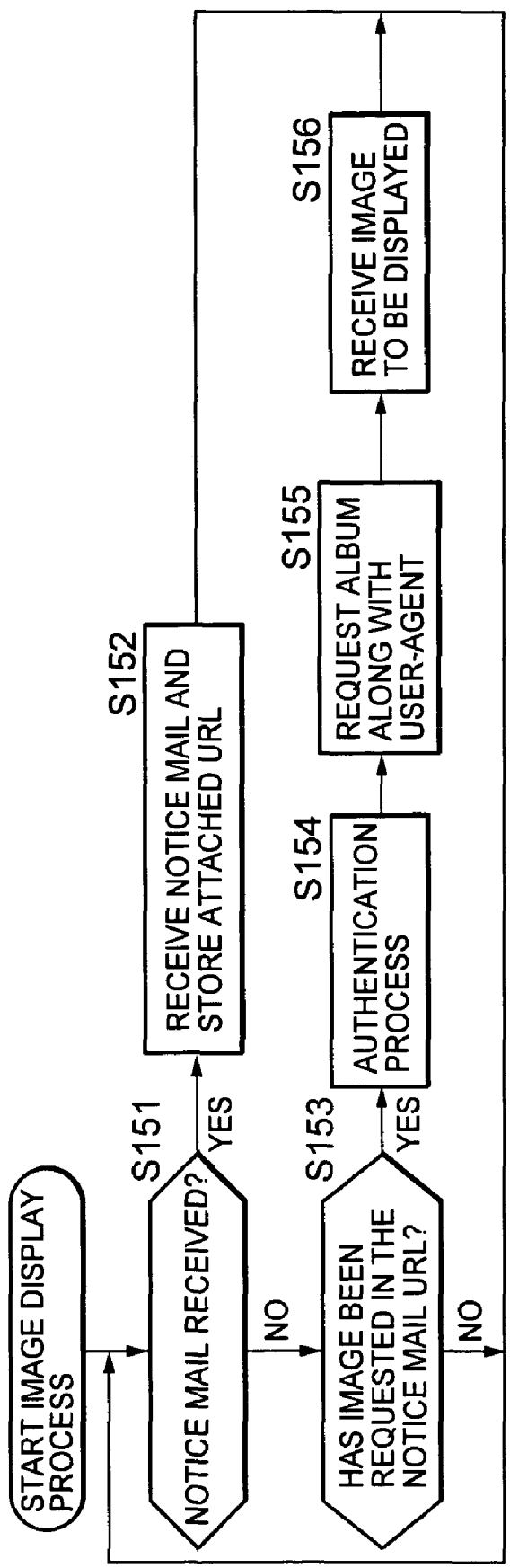
FIG. 46 shows a flowchart describing the processing of image display according to a preferred embodiment of the present invention.

Still further, although the case where the PC 13 requests an image has been described above, when the mobile phone 14, for example, processes the flow chart of FIG. 46 similarly, the mobile phone 14 itself is shown as a mobile phone, in step S155, through the User-Agent. Thus, in the process of step S142 in the flow chart of FIG. 44, the image management server 17 causes the image conversion program 108d to convert the image into that of a size to be displayed on a display section of the mobile phone 14 (for example, 256 colors, 120×110, 144×134, or 118×128 (in pixels), etc.), so as to be transmitted to the mobile phone 14 in step S143.

Figure 49:
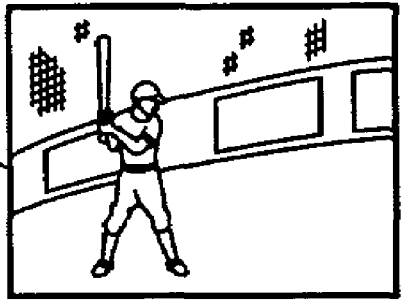
FIG. 49 shows an example of image display according to a preferred embodiment of the present invention.

The mobile phone 14 displays the display images as shown in FIG. 48 and FIG. 49 in the process of step S156, for example. In other words, in FIG. 48, when selectors 501a through 501i for selecting images named respectively 1 through 9 among all the images (in FIG. 48, 52 images in total) registered to the album are displayed and any selector is selected, an image 511 corresponding to the selected image name is displayed as shown in FIG. 49.

Similarly, when the image of the album is requested by the PDA 15, the response program 108a causes the image conversion program 108d to convert the image stored in image DB 108c into the image of a size to be displayed in the display section of the PDA 15 (for example, 320×320 (in pixels)) and transmits it.

Since, by means of the above processes, the image may be distributed according to a structure of the device which requests distribution of the image. When a device which distributes the still image, the moving image, or the fixed point observation image notifies that the image is uploaded, the device may only show the location as one URL. Further, a device which is distributed with an image may display the optimal image with respect to the display capability of its own terminal device has, without being conscious of the size of the image.

In the above examples, although the image (the still image, the moving image, and the fixed point observation image) captured by the PC 11 is distributed to the PC 13 (or the mobile phone 14, the PDA 15, or the network camcorder 16) through the image management server 17, it may be distributed from the PC 11 directly to the PC 13 (or the mobile phone 14, the PDA 15, or the network camcorder 16). In this case, a server for managing the image is considered not to exist. In case the PC 11 and the PC 13 communicate directly, the image captured in real time can be distributed by means of an instant messaging service, a request may be further transmitted from the PC 13 which receives the distribution, etc. to the PC 11 to be caused to carry out corresponding imaging. What is meant by the instant messaging service is a service provided by means of a system in which terminal devices using the same software on the Internet can mutually check whether or not the other is on-line. When they are on-line, they can have a chat or communicate data in real time.

Figure 50:
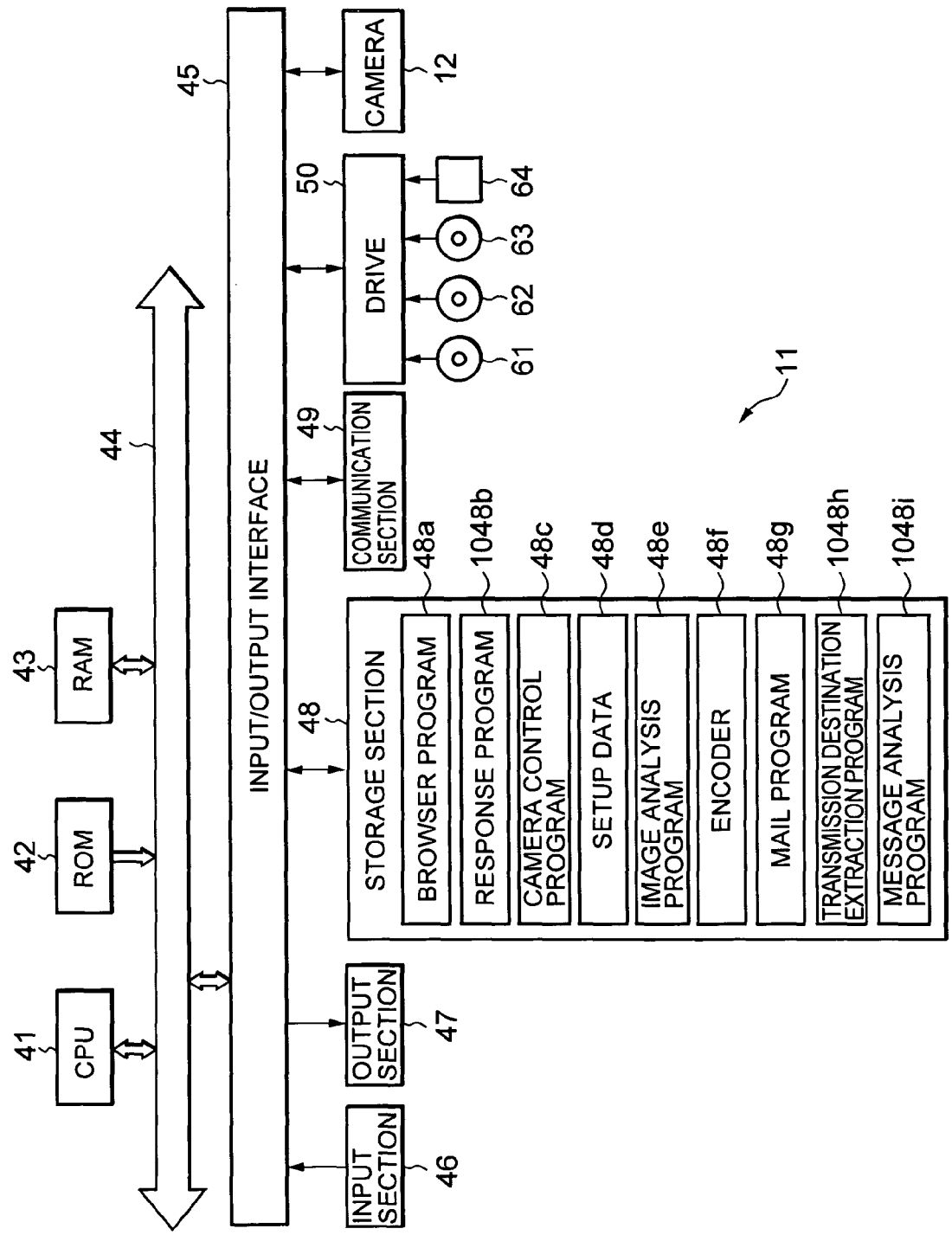
FIG. 50 shows a schematic block diagram of a structure of the PC11 utilizing an instant messaging system.

FIG. 50 shows a structure of the PC 11 corresponding to the instant messaging service. Although its fundamental structure is similar to that of the PC 11 as shown in FIG. 2, a response program 1048b is provided in place of the response program 48b. The function of the response program 1048b is basically similar to that of the response program 48b, and may transmit/receive an instant message to/from the PC 13 through the network camcorder 16, through a communication server 20 (FIG. 52) which offers the instant messaging service. In this case, the instant message may have an image (including a still image or a moving image) attached thereto, so as to be transmitted/received. By using the instant messaging service, the response program 1048b may read the setup information on the notice mail of the setup data 48d, so as to transmit notice mail in place of the above-mentioned notice mail.

A transmission destination extraction program 1048g is further provided so as to analyze to which partner the currently captured image is transmitted according to the analysis result of the image analysis program 48e.

Further, a message analysis program 1048i is provided. When there is a request for imaging in the instant message received from the PC 13 through the network camcorder 16, by analyzing the contents of the request and carrying out a statistics process, the message analysis program 1048i determines, for example, statistically the most frequently requested process to be provided to the camera control program 48c and causes the camera 12 to carry out the corresponding imaging. In particular, for example if the results of analysis of messages show that the most frequent request is statistically "Want camera to be rotated rightward", the message analysis program 1048i outputs for the camera control program 48c instructions to rotate the camera 12 rightwardly.

Figure 51:
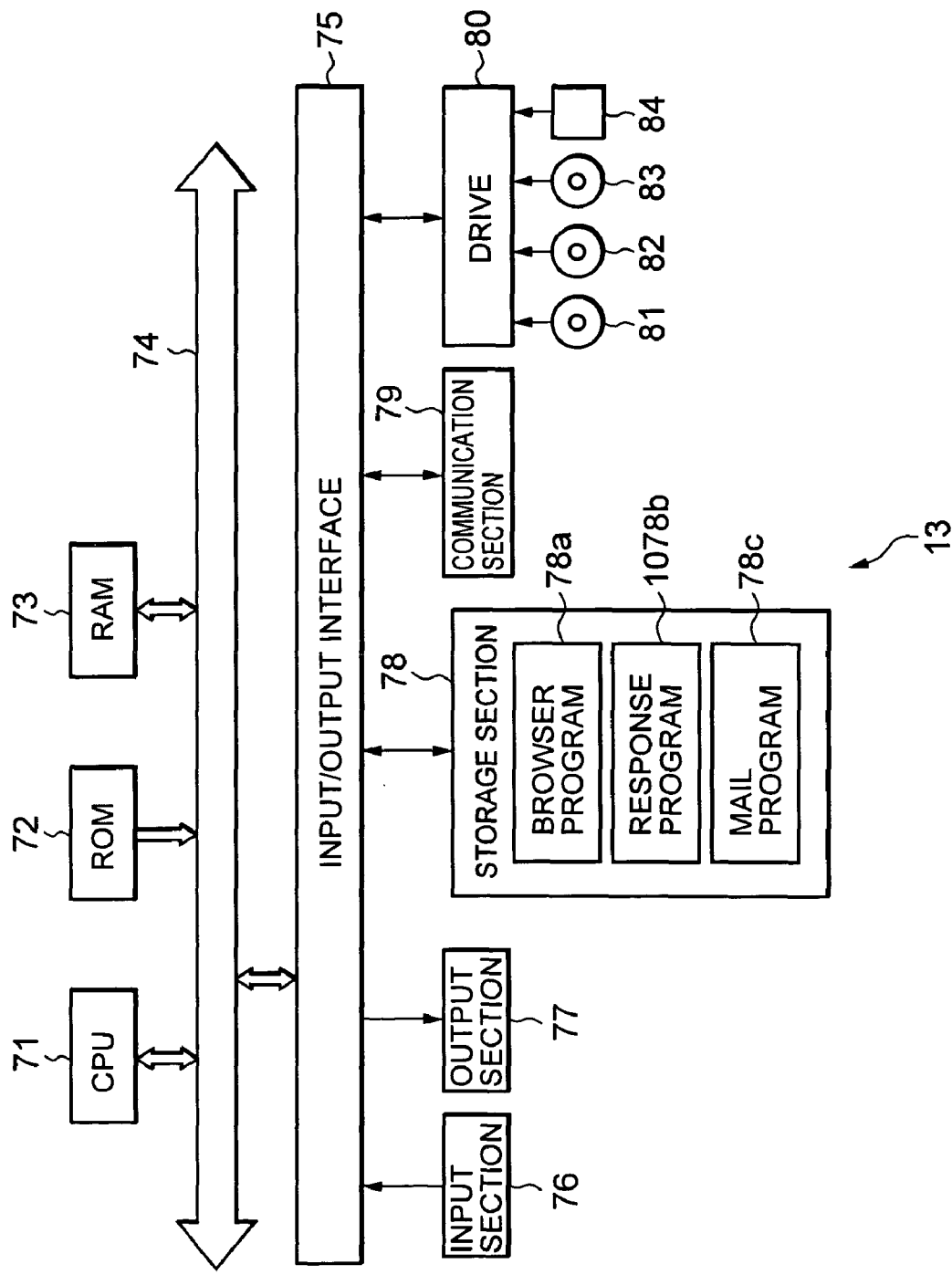
FIG. 51 shows a schematic block diagram of a structure of the PC13 utilizing an instant messaging system.

Now, with reference to FIG. 51, a structure of the PC 13 corresponding to the instant messaging service will be described. In place of the response program 78b, a response program 1078b is provided. Although a basic function of the response program 1078b is similar to that of response program 78b, it may further transmit/receive the instant message to/from other devices, such as the PC 11, through the communication server 20, which provides the instant messaging service, as described above.

In addition, since the mobile phone 14 through the network camcorder 16 has a fundamental structure similar to that of the PC 13, the description thereof will be omitted.

Figure 52:
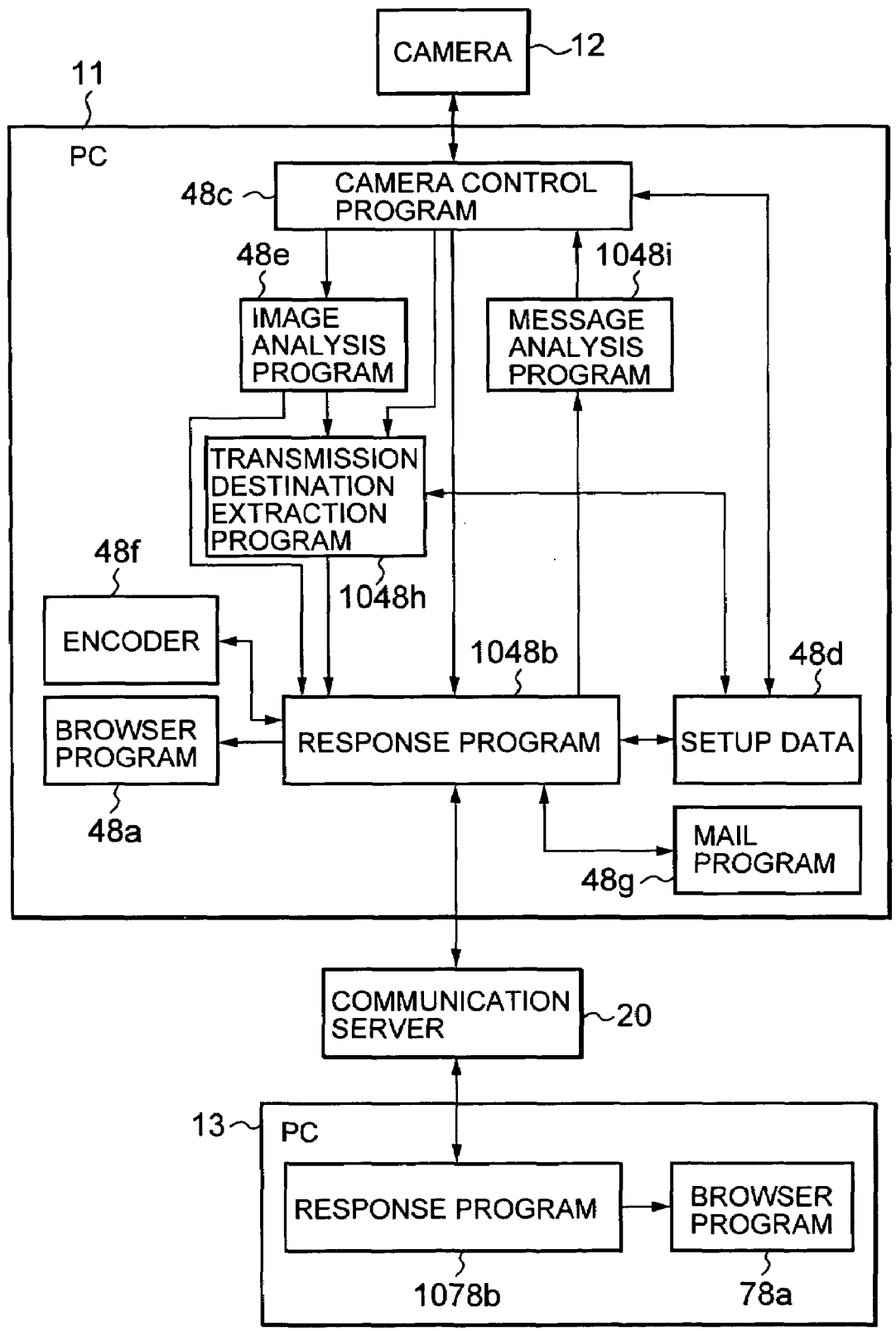
FIG. 52 shows a schematic block diagram describing the functions realized by an image distribution system an instant messaging system according to a preferred embodiment of the present invention.

Now, with reference to FIG. 52, a function realized by an image distribution system constituted by the PC's 11 and 13 as shown respectively in FIG. 50 and FIG. 51 will be described. The basic function is similar to that of the image distribution system as shown in FIG. 5, with exception that the image management server 17 is replaced by the communication server 20, which offers the instant messaging service instead, so that an instant message is communicated between the PC's 11 and 13.

In the instant messaging service, it is displayed a state in which the terminal device receives the provision of service. In other words, terminal devices capable of receiving the instant messaging service through the communication server 20 may verif mutually whether or not a dedicated application program has started.

Therefore, the users of the terminal devices can know mutually whether or not there is a partner to communicate with. When the PC 11, for example, is received the instant messaging service by using this function, at the same time other terminal devices such as the PC 13 through the network camcorders 16 may be caused to recognize information such as whether or not the fixed point observation is in operation.

Figure 53:
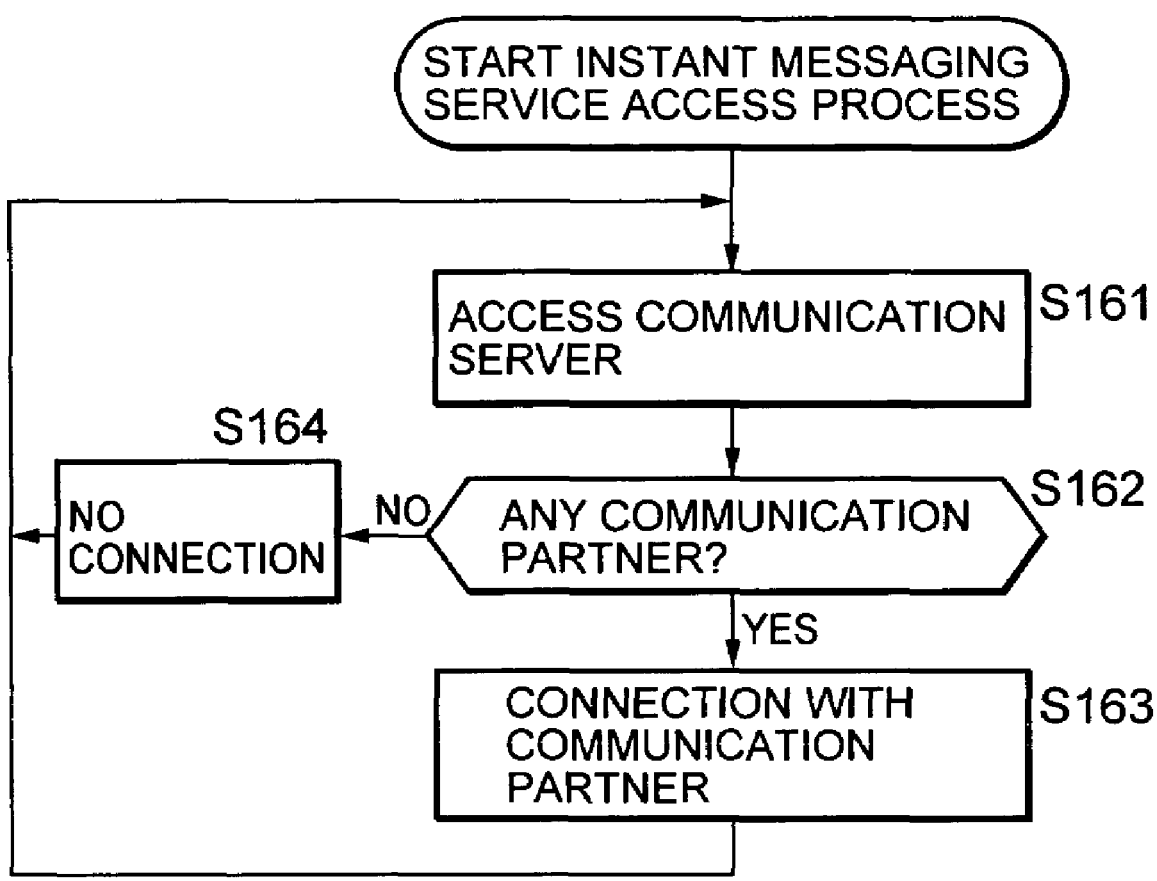
FIG. 53 shows a flowchart describing the processing of access to an instant messaging service realized by the PC 11 of FIG. 51.

With reference now to a flow chart of FIG. 53, a process for accessing the instant messaging service will be described.

In step S161, a response program 1048*a* accesses the communication server 20, then, in step S162, asks the communication server 20 whether or not there is a communication partner. For example, when the PC 13 has also accessed the communication server 20, and has received a response from it that a communication partner exists, the PC 13 is, in step S163, communicated with the communication partner through the communication server 20. In other words, in this case, the PC 11 is connected with the PC 13. Moreover, in step S162, when there is a response from it that there is no communication partners, the PC 11 becomes unconnected in step S164. According to the above process, while the connection state is being maintained, the processes in step S161 to S163 are repeated. While a non-connection state is continued, the processes in steps S162, S162, and S164 are repeated.

It is assumed that, in the following description, the instant messaging service is accessed (accessing the communication server 20), the PC 13 exists as an available communication partner and is connected.

Figure 54:
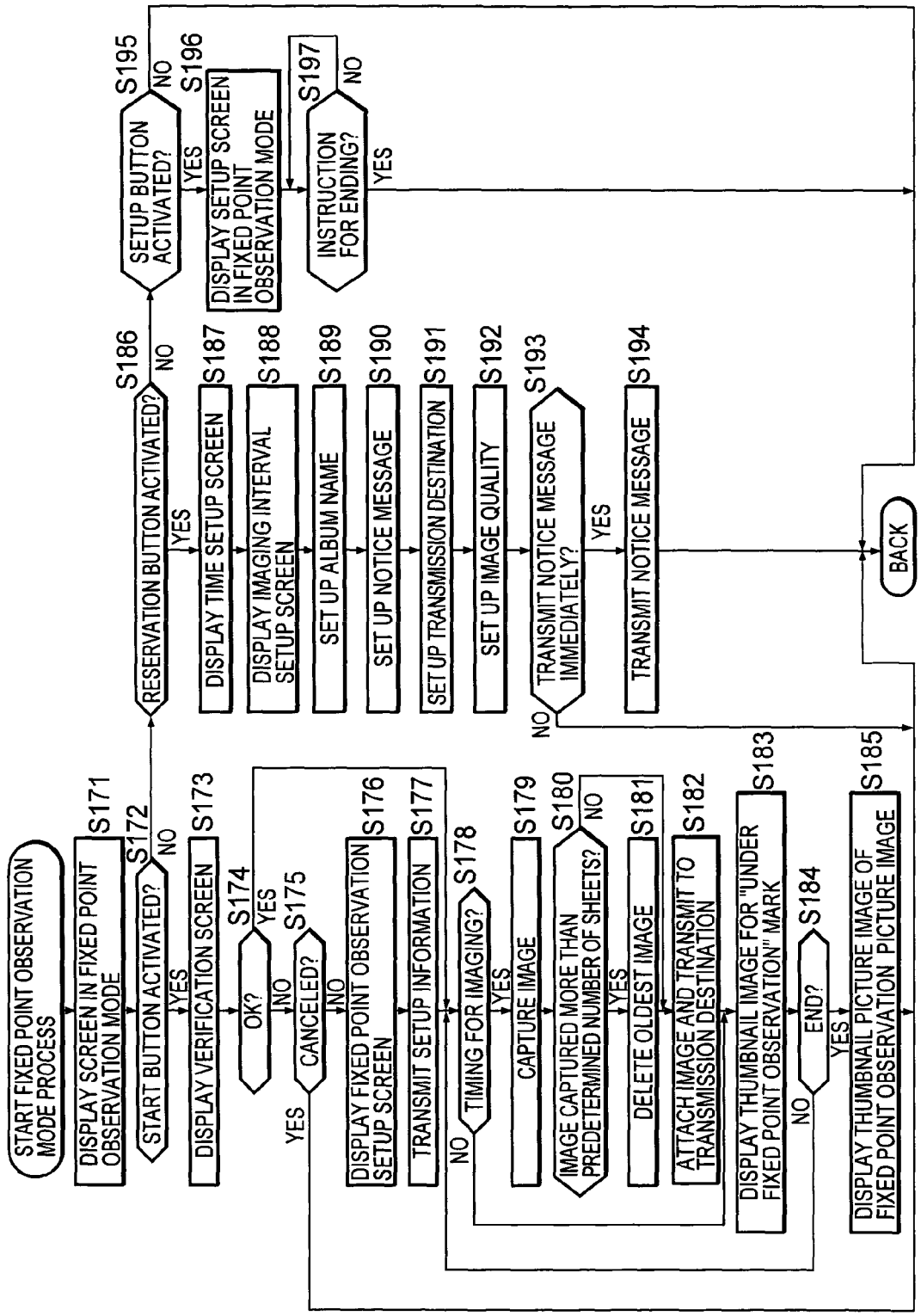
FIG. 54 shows a flowchart describing the processing of the fixed point observation mode realized by the PC 11 of FIG. 51.

With reference to a flow chart of FIG. 54, according to the above structure, there is described a process when directly distributing the image observed by the PC 11 at a fixed point by means of the fixed point observation mode process to the PC 13 together with an instant message.

Figure 16:
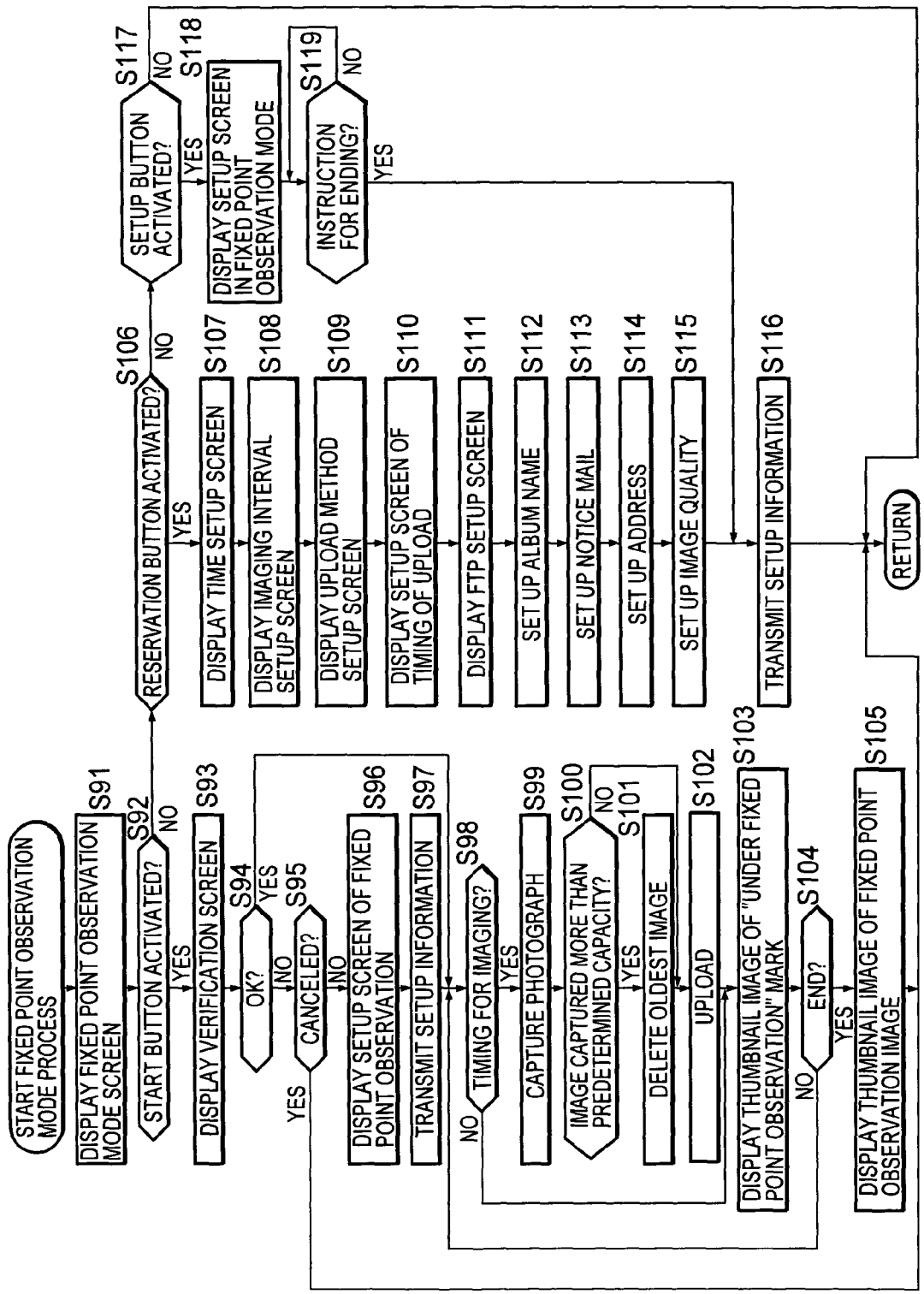
FIG. 16 shows a flowchart describing the processing of the fixed point observation mode according to a preferred embodiment of the present invention.

It should be noted that, in FIG. 54, the processes in steps S171 to S181, the processes in steps S183 to S189, the process in step S192, and the processes in steps S195 to S197 are similar to those in steps S91 to S101, those in steps S103 to S108, that in step S112, those in steps S115 to S119, in FIG. 16, so that the description thereof will not be repeated.

In step S182, based on the information on the partner recorded on the setup data 48*d*, the response program 1048*b* attaches the image captured through the communication server 20 to the instant message so as to transmit it to the PC 13. At this time, the image to be transmitted is the uploaded still image, so that it also transmits the information on the corresponding album.

In step S190, the response program 1048*b* sets up information regarding whether or not there is a notice message, which is fundamentally similar to the above-mentioned notice mail, so that a text by the instant message is transmitted instead of mail.

In step S191, the response program 1048*b* sets up the transmission destination on the instant messaging service. In addition, the setup of the partner on the instant messaging service is similar to a setup of an electronic mail address.

In step S193, the response program 1048*b* determines whether or not the notice message is set up to be transmitted immediately. In other words, as shown in FIG. 28 (although the setup of the notice mail is shown in FIG. 28, the setup of the notice message is similar to that of the notice mail), when the check box 372 is marked to set up "notify when started", it is a setup in which a notice message is transmitted at a setup timing. For example, the check box 372 is in a state where it is marked, i.e., when it is set up so as to transmit the notice message immediately, the process goes to step S194.

In step S194, the response program 1048*b* transmits the notice message to the transmission destination.

Moreover, in step S193, when it is determined that set up is not ready to transmit the notice message immediately, the process in step S194 is skipped.

Now, with reference to a flow chart of FIG. 55, a process in which the PC 13 receives the instant message will be described.

In step S201, the response program 1078*b* determines whether or not the instant message has been received, and repeats the process until it is received. For example, when the instant message to which the image is attached is received by means of the process in step S182 or step S194 of FIG. 54, it is determined that the instant message has been received and determines whether or not the image is attached in step S202. For example, when the image has been attached by means of the process in step S182, it is determined that the image has been attached, and the response program 1078*b* displays the attached image together with the notice message in step S203.

In addition, in step S202, in case only the notice message has been received by processing of step S192, for example, it is determined that the image is not attached, and the response program 1078*b* displays only the notice message in step S204.

According to the above processes, it is possible to carry out distribution in real time every time a fixed point observation image is newly captured, without requiring a server for managing images.

Further, in the image distribution system using the image management server 17, although the image management server 17 stores the transmission destination in the setup DB 108*b* for every event, the transmission destination extraction program 1048*h* may read the information on the transmission destination for each condition stored in the setup data 48*d* or, alternatively, may transmit the instant message with the image attached thereto based on the result of analysis by means of the image analysis program 48*e*.

With reference to a flow chart of FIG. 56, a procedure will be described for the fixed point observation mode, in which a transmission destination is specified by means of the transmission destination extraction program 1048*h*, and an instant message is transmitted by attaching the image when capturing a fixed point observation image.

Figure 56:
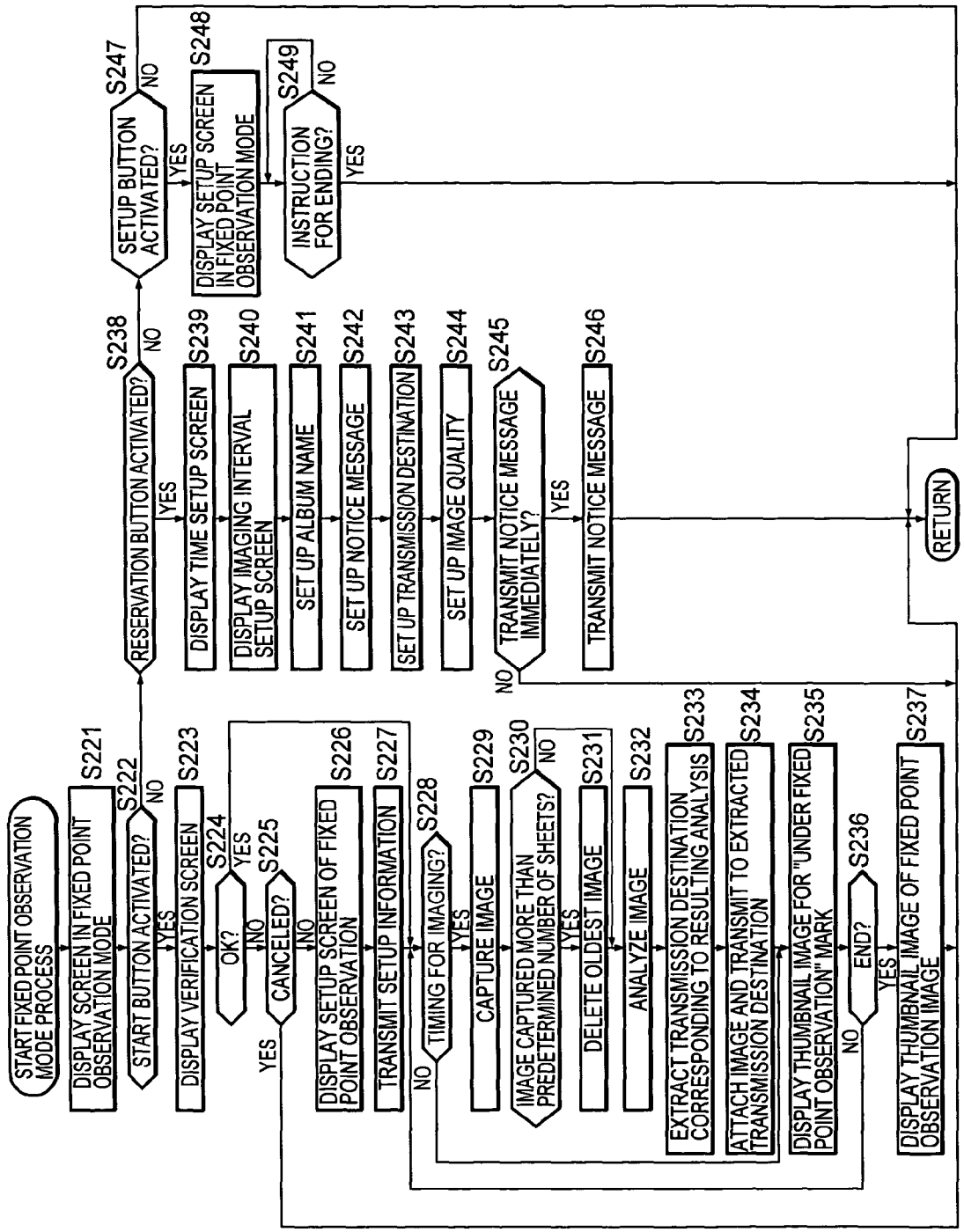
FIG. 56 shows a flowchart describing the processing of the fixed point observation mode realized by the PC 11 of FIG. 51.

It should be noted that, in the flow chart of FIG. 56, since the processes in steps S221 to S231 and the processes in steps S235 to S249 are similar to those in steps S171 to S181 and in steps S183 to S197 in the flow chart of FIG. 54, so that the description thereof will not be repeated.

In step S232, the image analysis program 48*e* analyzes the image captured with the camera 12 and inputted through the camera control program 48*c*, and outputs the analysis result to the transmission destination extraction program 1048*h*.

In step S233, the transmission destination extraction program 1048*h* accesses the setup data 48*d* so as to analyze and extract the transmission destination corresponding to the analysis result. In other words, when the setup as shown in FIG. 45 is made if the analysis result is "motion detected", for example, User A and User B are extracted as transmission destinations.

In step S234, the response program 1048*b* transmits, to the extracted transmission destinations, the instant message showing that the fixed point observation image is newly captured, attaching the captured image thereto.

Figure 55:
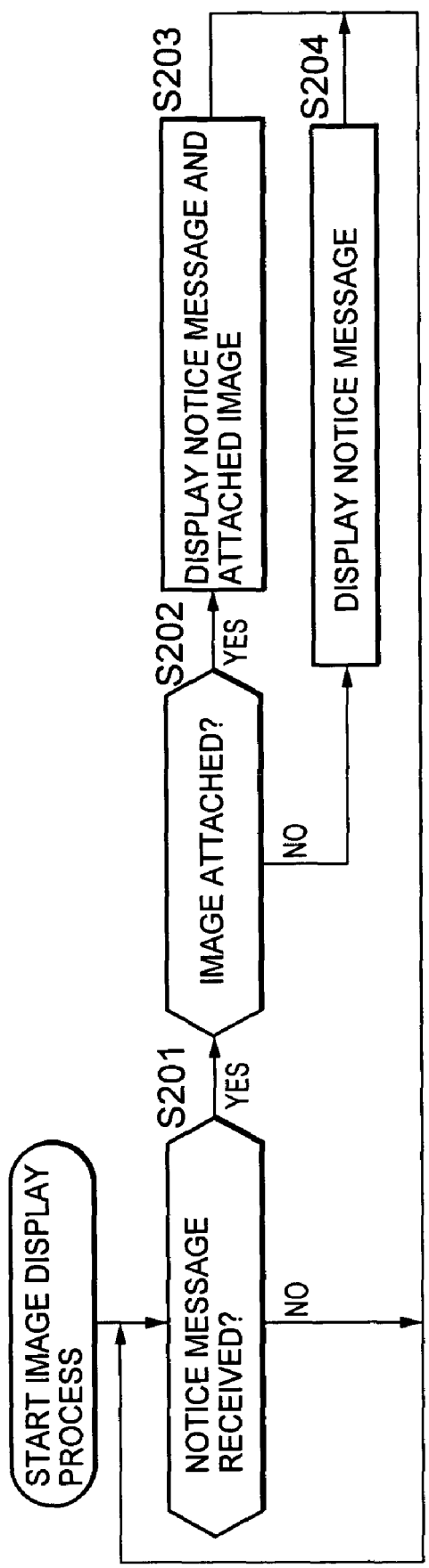
FIG. 55 shows a flowchart describing the image display processing realized by the PC 13 of FIG. 52.

In addition, the process for receiving the instant message distributed to the PC 13 is similar to that of FIG. 55, so that the description thereof will not be repeated.

According to the above processes, even in a state where there is no server for managing images, it is possible to transmit the fixed point observation image only to the partner corresponding to the event of imaging and to transmit the fixed point observation image in real time, and the user of the PC 13 distributed with an image may receive the image captured only when an event of interest occurs.

In addition, making use of the fact that the instant message is capable of communication in real time, it is possible to send a request from a side which receives the distribution of a fixed point observation (the PC 13, for example) to a side which is performing the fixed point observation (the PC 11, for example) so as to change the imaging method of the fixed point observation according to request.

Figure 57:
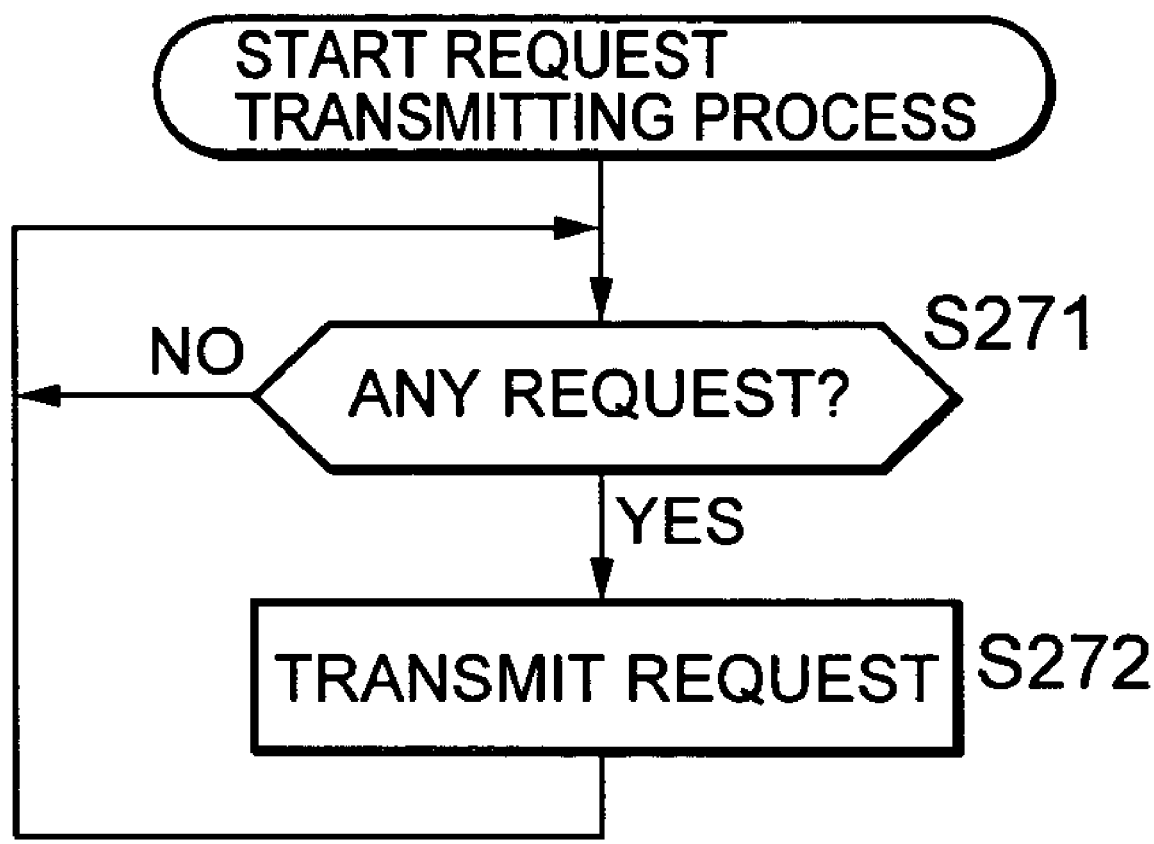
FIG. 57 shows a flowchart describing a request transmission processing realized by the PC 13 of FIG. 52.

FIG. 57 is a flow chart for describing a process when the PC 13 transmits the request.

In step S271, the response program 1078*b* determines whether or not the user has the request for the fixed point observation, and repeats the process until it receives the request. When the request is received, the response program 1078*b* transmits contents of the request as the instant message to the PC 11 in step S272.

According to this process, the request on the side distributed with the instant message may be transmitted to the PC 11 which is the side performing the fixed point observation. It should be noted that this process relates to what is received from a plurality of the PC's 13 or from a plurality of the mobile phones 14 to the network camcorders 16.

Figure 58:
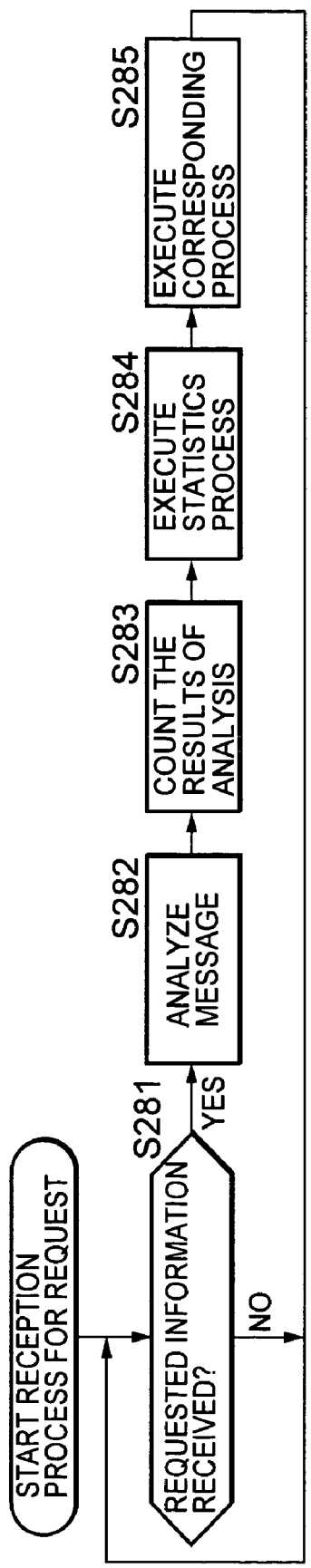
FIG. 58 shows a flowchart describing a request transmission processing realized by the PC 11 of FIG. 51.

Referring now to a flow chart of FIG. 58, a process will be described of changing the fixed point observation based on this request.

In step S281, the response program 1048*b* determines whether or not the request for the fixed point observation has been received as the instant message, and repeats the process until it is received. In step S281, when it is determined to have received the request, the message analysis program 1048*i* analyzes the contents of the request according to this message in step S282.

In step S283, the message analysis program 1048*i* counts the analysis result. That is, it counts the requested number of analyzed request such as a request for zooming further in, request for imaging to a further rightward position, etc.

In step S284, the message analysis program 1048*i* carries out statistical processing of these analysis results. For example, this statistical processing is one that obtains a ranking in descending order of number of requests.

In step S285, the message analysis program 1048*i* provides the process to be employed as a statistics result to the camera control program 48*c*, and causes the camera 12 to perform the process corresponding to the request. In other words, for example, when requests for zooming further in are the most frequent, the message analysis program 1048*i* transmits zooming instructions to the camera control program 48*c*, so that the camera control program 48*c* carries out zooming of the camera 12 based on the instructions.

According to the above processes, in the instant messaging service, it is possible to distribute the fixed point observation image while reflecting the opinion of the receiver of the image by making use of the fact that the instant message is capable of communication in real time.

Although the series of processes as described above may be performed by means of hardware, they may also be performed by means of software. When performing the series of processes by software, a program constituting the software may be installed through a recording medium into hardware dedicated thereto or a general-purpose personal computer etc. capable of performing various types of functions by installing various types of programs.

Figure 4:
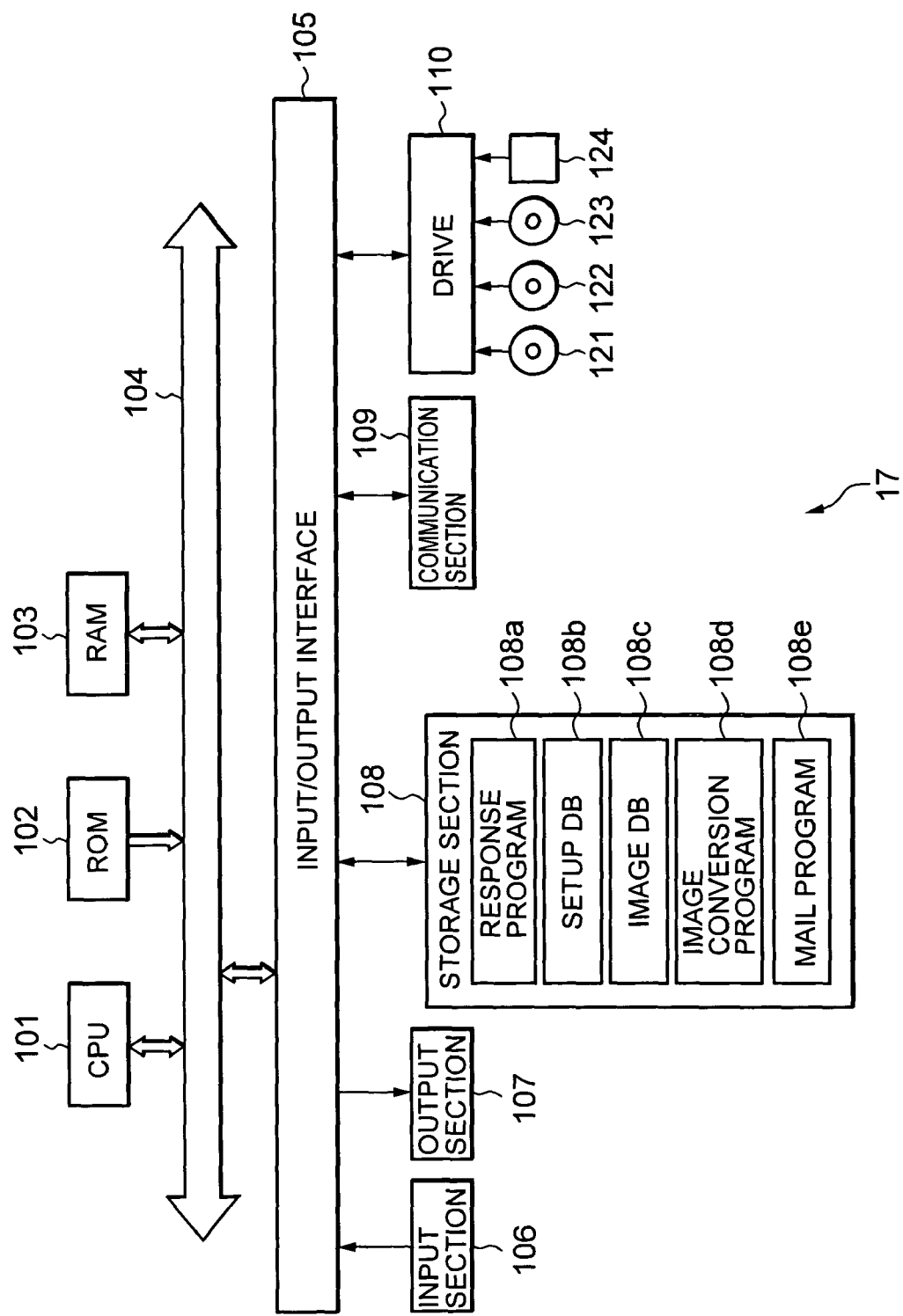
FIG. 4 shows a schematic block diagram of a structure of the image management server of FIG. 1.

As shown in FIG. 2 to FIG. 4, the recording medium may be not only the storage sections 48, 78, and 108 on which the program is recorded and which are provided to the user, being pre-installed in the PC's 11 and 13 and the image management server 17, but also package media including the magnetic disks 61, 81, and 121 (including a flexible disk), the optical disks 62, 82, and 122 (including a CD-ROM (Compact Disk-Read Only Memory), a DVD (Digital Versatile Disk)), the magneto-optical disks 63, 83, and 123 (including an MD (Mini-Disc) (registered trademark)), or the semiconductor memory 64, 84, and 124 (including Memory Stick) which are apart from a computer, distributed in order to provide the user with the program and have recorded therein the program.

It should be appreciated that, in this specification, the steps of describing programs to be recorded in the recording media may include not only processes performed in chronological order along with the order as described but also processes performed in parallel or individually and the latter are not necessarily performed in chronological order.

Further, in this specification, the system expresses a whole device constituted by a plurality of devices.

Accordingly, it should be pointed out that the present invention is not limited to the above-mentioned preferred embodiments. It is therefore to be understood by those of ordinary skill in the art that any changes, variations, combinations and sub-combinations may be practiced otherwise than as specifically described herein in the present specification without departing from the scope and spirit of the present invention.

What is claimed is:

1. An information processing apparatus comprising:
    imaging means for capturing image;
    storage means for storing image captured by said imaging means as a fixed point observation image;
    transmission means for transmitting said fixed point observation image to a server;
    transmission commanding means for commanding transmission of said fixed point observation image to said server by means of said transmission means;
    setting means for setting a distribution condition for distributing information related to said transmission of said fixed point observation image to said server; and
    controlling means for performing control based on a command from said transmission commanding means so as to transmit, along with said fixed point observation image, commanding information for distributing said information related to transmission of said fixed point observation image to said server if said distribution condition is fulfilled, when said transmission means transmits said fixed point observation image to said server.

2. The information processing apparatus according to claim 1, wherein said information related to transmission of said fixed point observation image to said server by said transmission means includes one of information indicating that said fixed point observation image has been transmitted to said server, information forecasting that said fixed point observation image will be transmitted to said server, information on a URL of said server to which said fixed point observation image is transmitted, and information on time on which said fixed point observation image will be transmitted to said server.

3. The information processing apparatus according to claim 1, wherein said distribution condition includes one of transmission of said fixed point observation image captured at an occurrence of a predetermined event to said server, and starting of a fixed point observation.

4. The information processing apparatus according to claim 3, wherein said predetermined event includes one of a lapse of a period of time, movement of a fixed point observation image, change in brightness of a fixed point observation image, a red object entering a field of view within a fixed point observation image, and a subject of a fixed point observation image moving leftwards.

5. An information processing method comprising the steps of:
  image capturing;
  storing image captured through said image capturing step as a fixed point observation image;
  transmitting said fixed point observation image to a server;
  commanding transmission of said fixed point observation image to said server by means of said transmitting step;
  setting a distribution condition for distributing information related to said transmission of said fixed point observation image to said server; and
  performing control based on a command from said commanding step so as to transmit along with said fixed point observation image, commanding information for distributing said information related to transmission of said fixed point observation image to said server if said distribution condition is fulfilled, when said transmitting step transmits said fixed point observation image to said server.

6. A computer-readable storage medium including computer program instructions wherein when executed by a computer, cause the computer to perform a method comprising:
  commanding transmission of a fixed point observation image to a server;
  setting a distribution condition for distributing information related to said transmission of said fixed point observation image to said server; and
  performing control based on a command from said commanding step so as to transmit, along with said fixed point observation image, commanding information for distributing said information related to transmission of said fixed point observation image to said server if said distribution condition is fulfilled, when said transmitting step transmits said fixed point observation image to said server.

7. An information processing system comprising:
  an information processing apparatus for transmitting a fixed point observation image and a server for receiving said fixed point observation image,
  wherein said information processing apparatus includes,
    imaging means for image capturing;
    storage means for storing image captured by said imaging means as a fixed point observation image;
    transmission means for transmitting said fixed point observation image to a server;
    transmission commanding means for commanding transmission of said fixed point observation image to said server by means of said transmission means;
    setting means for setting a distribution condition for distributing information related to transmission of said fixed point observation image to said server; and
    controlling means for performing control based on a command from said transmission commanding means so as to transmit, along with said fixed point observation image, commanding information for distributing said information related to transmission of said fixed point observation image to said server if said distribution condition is fulfilled, when said transmission means transmits said fixed point observation image to said server; and said server includes,
    receiving means for receiving a distribution condition at event of distribution of said information related to transmission of said fixed point observation image; and
    distribution means for distributing said information related to transmission of said fixed point observation image based on said distribution condition.

* * * * *